(12) United States Patent
Fischer

(10) Patent No.: US 8,176,109 B2
(45) Date of Patent: May 8, 2012

(54) CALCULATING UNIT FOR REDUCING AN INPUT NUMBER WITH RESPECT TO A MODULUS

(75) Inventor: Wieland Fischer, Munich (DE)

(73) Assignee: Infineon Technologies AG (DE)

( * ) Notice: Subject to any disclaimer, the term of this patent is extended or adjusted under 35 U.S.C. 154(b) by 1484 days.

(21) Appl. No.: 11/554,187

(22) Filed: Oct. 30, 2006

(65) Prior Publication Data

US 2007/0116270 A1    May 24, 2007

(30) Foreign Application Priority Data

Oct. 28, 2005  (DE) .......................... 10 2005 051 772
Jun. 1, 2006   (DE) .......................... 10 2006 025 673

(51) Int. Cl.
    *G06F 7/38* (2006.01)
(52) U.S. Cl. ............. 708/490; 708/270; 708/492; 380/1
(58) Field of Classification Search .................. None
    See application file for complete search history.

(56) References Cited

U.S. PATENT DOCUMENTS

| | | | |
|---|---|---|---|
| 4,281,391 A | 7/1981 | Huang | |
| 4,870,681 A | 9/1989 | Sedlak et al. | |
| 5,073,870 A | 12/1991 | Morita | |
| 6,185,596 B1 | 2/2001 | Hadad et al. | |
| 7,185,039 B2 | 2/2007 | Grinchuk | |
| 2005/0038845 A1 | 2/2005 | Fischer | |
| 2005/0149595 A1 | 7/2005 | Fischer et al. | |
| 2005/0149597 A1 | 7/2005 | Fischer et al. | |
| 2006/0010192 A1 | 1/2006 | Fischer et al. | |
| 2006/0064453 A1 | 3/2006 | Fischer et al. | |

FOREIGN PATENT DOCUMENTS

| | | |
|---|---|---|
| AU | 2003224137 | 11/2003 |
| DE | 36 31 992 | 11/1987 |
| DE | 102 05 713 C1 | 8/2003 |
| DE | 102 19 158 A1 | 11/2003 |
| DE | 102 19 161 A1 | 11/2003 |
| DE | 102 19 164 A1 | 11/2003 |
| DE | 102 60 655 B3 | 6/2004 |
| DE | 102 60 660 B3 | 6/2004 |
| EP | 1 515 226 A2 | 3/2005 |

OTHER PUBLICATIONS

Menezes, A., et al.; "Handbook of Applied Cryptography"; Section 14.5, pp. 610-613, 1996.

(Continued)

*Primary Examiner* — Lewis A Bullock, Jr.
*Assistant Examiner* — Michael D Yaary
(74) *Attorney, Agent, or Firm* — Dickstein Shapiro LLP

(57) ABSTRACT

A calculating unit for reducing an input number with respect to a modulus, wherein the input number has input number portions of different significances, wherein the input number portions represent the input number with respect to a division number, wherein the modulus has modulus portions of different significances, and wherein the modulus portions represent the modulus with respect to the division number, includes a unit for estimating a result of an integer division of the input number by the modulus using a stored most significant portion of the number, a stored most significant portion of the modulus and the number, and for storing the estimated result in a memory of the calculating unit, and a unit for calculating a reduction result based on a subtraction of a product of the modulus and a value derived from the estimated result from the number.

37 Claims, 35 Drawing Sheets

OTHER PUBLICATIONS

Fischer et al.; "Increasing the Bitlength of a Crypto-Coprocessor"; Proc. of CHES '02, Springer LNCS, vol. 2523, pp. 71-81, 2002.

Fischer et al.; "Unfolded modular multiplication"; Proc. of ISAAC '03, Springer LNCS, 2003.

Menezes, A. et al.; "Handbook of Applied Cryptography"; CRC Press, 1997.

Montgomery; "Modular Multiplication Without Trial Division"; Mathematics of Computation, vol. 44, No. 170, Apr. 1985, pp. 519-521.

Sedlak; "The RSA Cryptography Processor: The first High Speed One-Chip Solution"; Proc. of EUROCRYPT '87, Springer LNCS, vol. 293, pp. 95-105.

Bosselaers, A. et al.; "Comparison of three modular reduction functions"; Advances Cryptology—CRYPTO '93, Lecture Notes in Computer Science, vol. 773, pp. 1-12.

Koc, C.K. et al.; "Fast algorithm for modular reduction"; IEE Proc.—Comput. Digit. Tech. vol. 145, No. 4, Jul. 1998, pp. 265-271.

Walter, C.; "Faster Modular Multiplication by Operand Scaling"; Advances in Cryptology—CRYPTO '91, Lecture Notes in Computer Science, vol. 576, pp. 313-323.

Hars, Laszlo; "Long Modular Multiplication for Cryptographic Applications"; CHES 2004—Lecture Notes in Computer Science, vol. 3156, 2004, (http://www.hars.us/Papers/ModMult.pdf).

Nedjah, Nadia; "A Review of Modular Multiplication Methods and Respective Hardware Implementations"; Informatica, vol. 30, Nr. 1, The Slovene Society Informatika, Ljubljana, Slovenien, 2006, pp. 111-129.

$B = B_0 + B_1 \cdot Z + B_2 \cdot Z^2; Z = 2^i$ generally:
$A_0 = A \bmod Z;$
$A_1 = [A \text{ div } Z] \bmod Z;$
$A_2 = A \text{ div } Z^2$

FIG 1C $C = A \cdot B \mod N;$ $C = [(A \cdot B_2 \mod N) \cdot Z + A \cdot B_1 \mod N] \cdot Z + A \cdot B_0 \mod N$ (for $B_0$, $B_1$, $B_2$, only short registers are required)

FIG 1D modular multiplication

```
MM3k
input:  N = (N₂|N₁|N₀)_Z ∈ [⅔Z³, Z³[
        A = (A₂|A₁|A₀)_Z ∈ [0, N[
        B = (B₂|B₁|B₀)_Z ∈ [0, N[
output: A·B mod N ∈ [0, N[

C: = MMA_Z(A, B₂, 0; N) - N
C: = MMA_Z(A, B₁, C; N) - N
C: = MMA_Z(A, B₀, C; N)
return C
```

FIG 1E modular multiplication with addition

```
MMA_Z
input:  N ∈ [⅔Z³, Z³[
        A ∈ [0, N[
        B_i ∈ [0, Z[
        C ∈ [-N, 0]
output: A·B_i + C·Z mod N ∈ [0, N[
``` multiplication with addition $MA_Z$ input: $A \in [0, N[$
$B_i \in [0, Z[$
$C \in [-N, 0]$
output: $D := A \cdot B_i + C \cdot Z \in [-NZ, NZ[$ reduction $Red_Z$ input: $D \in [-NZ, NZ[$
$N \in \left[\frac{2}{3} Z^3, Z^3\right[$
output: $D \mod N \in [0, N[$ encryption:
$C = M^e \bmod N$ decryption:
$M = C^d \bmod N$ signature:
$S = M^d \bmod N$ verification:
$M = S^e \bmod N$ C: encrypted data
M: unencrypted data
S: signature
d: private key
e: public key
N: modulus (public)

FIG 2C

$M_{mk}$ input: $A = (A_{m-1}, \ldots, A_0)_z$
$B = (B_{m-1}, \ldots, B_0)_z$
output: $C := A \cdot B$ $C = (C_{2m-1}, \ldots, C_0)_z := 0$
for $i := 0$ to $m-1$ do
   for $j := 0$ to $m-1$ do
     $(C_{i+j+1} | C_{i+j})_z := (C_{i+j+1}, C_{i+j})_z + M_k(A_i, B_j)$
   end;
end;
return $C$

FIG 2D

$MA_K$ input: $A, B, C \in [0, 2^K[$
output: $A \cdot B + C \cdot 2^K$

MULT ADD operation

FIG 2E

$MMA_K$ input: $N \in [2^{K-1}, 2^K[$
$B \in [0, 2^K[$
$A, C \in [0, N[$
output: $A \cdot B + C \cdot 2^K \bmod N$ MULT MOD ADD operation

FIG 2F

$MM_K$ input: $N \in [2^{K-1}, 2^K[$
$A, B \in [0, N[$
output: $A \cdot B \bmod N$ modular multiplication

FIG 2G MULT MOD DIV operation
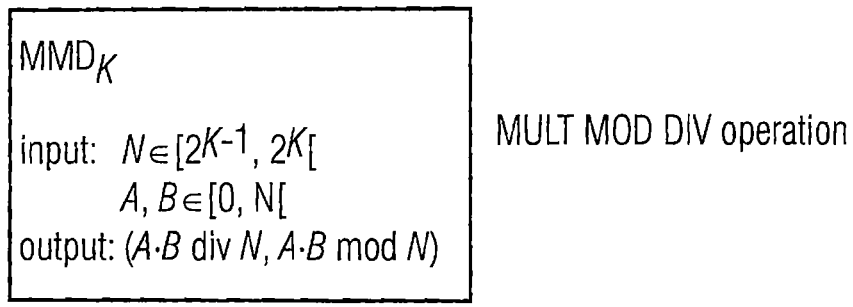
FIG 3A Mult Add operation (only short operands)
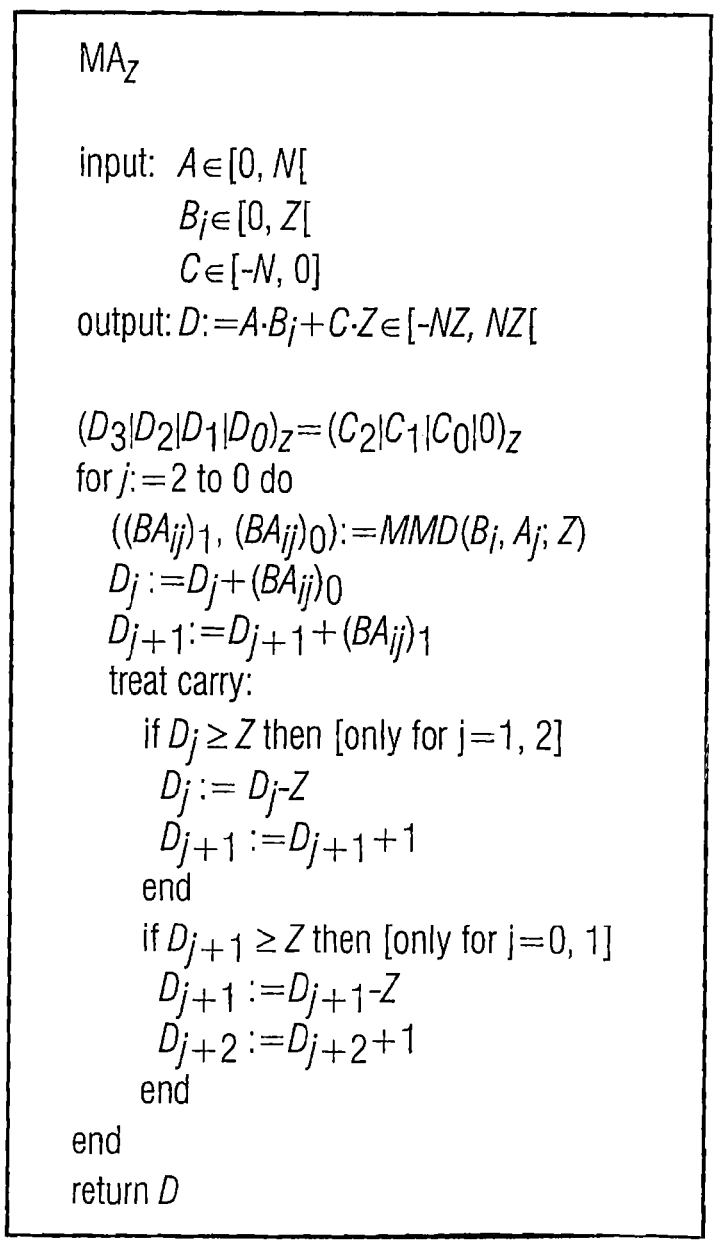

FIG 3B

Red$_Z$ (base version)

input: $D \in [-NZ, NZ[$
$N \in [\frac{2}{3}Z^3, Z^3[$ output: $D \bmod N \in [0, N[$ $Q_0 := D \text{ div } N$
$E := D - Q_0 \cdot N$ return $E$

FIG 3C

Red$_Z$ (1st version)

input: $D \in [-NZ, NZ[$
$N \in [\frac{2}{3}Z^3, Z^3[$
output: $D \bmod N \in [0, N[$ $\tilde{Q}_0 := D_3 Z \text{ div } N_2$
evaluate $\varepsilon$
$Q_0 := \tilde{Q}_0 + \varepsilon$
$E := D - Q_0 \cdot N$ return $E$

FIG 3D

Red$_Z$ (2nd version)

input: $D \in [-NZ, NZ[$
$N \in \left[\frac{2}{3}Z^3, Z^3\right[$ output: $D \bmod N \in [0, N[$ 184a { $\tilde{Q}_0 := D_3 Z \text{ div } N_2$
184b { estimate $\varepsilon$ by $\tilde{\varepsilon}$
184c { $Q'_0 := \tilde{Q}_0 + \tilde{\varepsilon}$
186a { $E := D - Q'_0 \cdot N$ 186b {
```
if E ≥ N then
    E := E-N
else if E < 0 then
    E := E+N
end
``` return $E$

FIG 3E

Red$_Z$ (3rd version)

input: $D \in [-NZ, NZ[$
$N \in \left[\frac{2}{3}Z^3, Z^3\right[$ output: $D \bmod N \in [0, N[$ 184a { $(\tilde{Q}_0, \tilde{R}_0) := MMD(D_3, Z; N_2)$ 184b { estimate $\varepsilon$:
184c { $\tilde{\varepsilon} := (D_2 + \tilde{R}_0 - (\tilde{Q}_0 N_1)_1) \text{ div } N_2$
$Q'_0 := \tilde{Q}_0 + \tilde{\varepsilon}$ 186a { $E := D - Q'_0 \cdot N$ 186b {
```
if E ≥ N then
    E := E-N
else if E < 0 then
    E := E+N
end
``` return $E$

FIG 3F $Red_Z$ (4th version)

input: $D \in [-NZ, NZ[$
$N \in [\frac{2}{3}Z^3, Z^3[$ output: $D \mod N \in [0, N[$ 184a $\begin{cases}(\tilde{Q}_0, \tilde{R}_0) := MMD(D_3, Z-N_2; N_2) \\ Q_0 := Q_0 + D_3 \\ D_2 := D_2 + \tilde{R}_0\end{cases}$ 184b $\{\tilde{\varepsilon} := \text{estimate } [D_2 - (\tilde{Q}_0 N_1)_1 \text{ div } N_2]$ 184c $\begin{cases} D_2 = D_2 - \tilde{\varepsilon} N_2 \\ Q'_0 := \tilde{Q}_0 + \tilde{\varepsilon}\end{cases}$ 186a $\begin{cases}((Q'_0 N_0)_1, (Q'_0 N_0)_0) := MMD(Q'_0, N_0; Z) \\ D_0 := D_0 - (Q'_0 N_0)_0 \\ \text{treat borrow/carry} \\ D_1 := D_1 - (Q'_0 N_0)_1 \\ \text{treat borrow/carry} \\ ((Q'_0 N_1)_1, (Q'_0 N_1)_0) := MMD(Q'_0, N_1; Z) \\ D_1 := D_1 - (Q'_0 N_1)_0 \\ \text{treat borrow/carry} \\ D_2 := D_2 - (Q'_0 N_1)_1 \\ \text{treat borrow/carry}\end{cases}$ 186b $\begin{cases} E := D \\ \text{if } E \geq N \text{ then} \\ \quad E := E - N \\ \text{else if } E < 0 \text{ then} \\ \quad E := E + N \\ \text{end}\end{cases}$ return $E$

FIG 4A
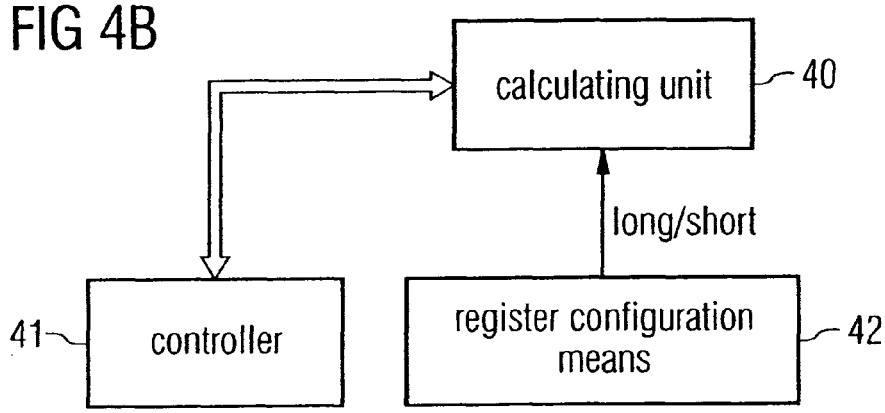
long mode / short mode
FIG 4B
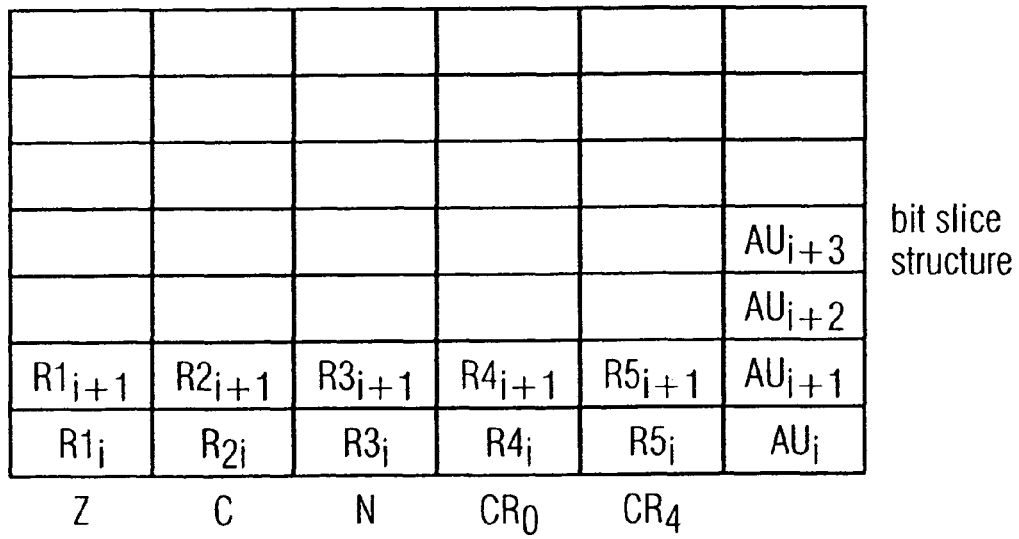
FIG 4C

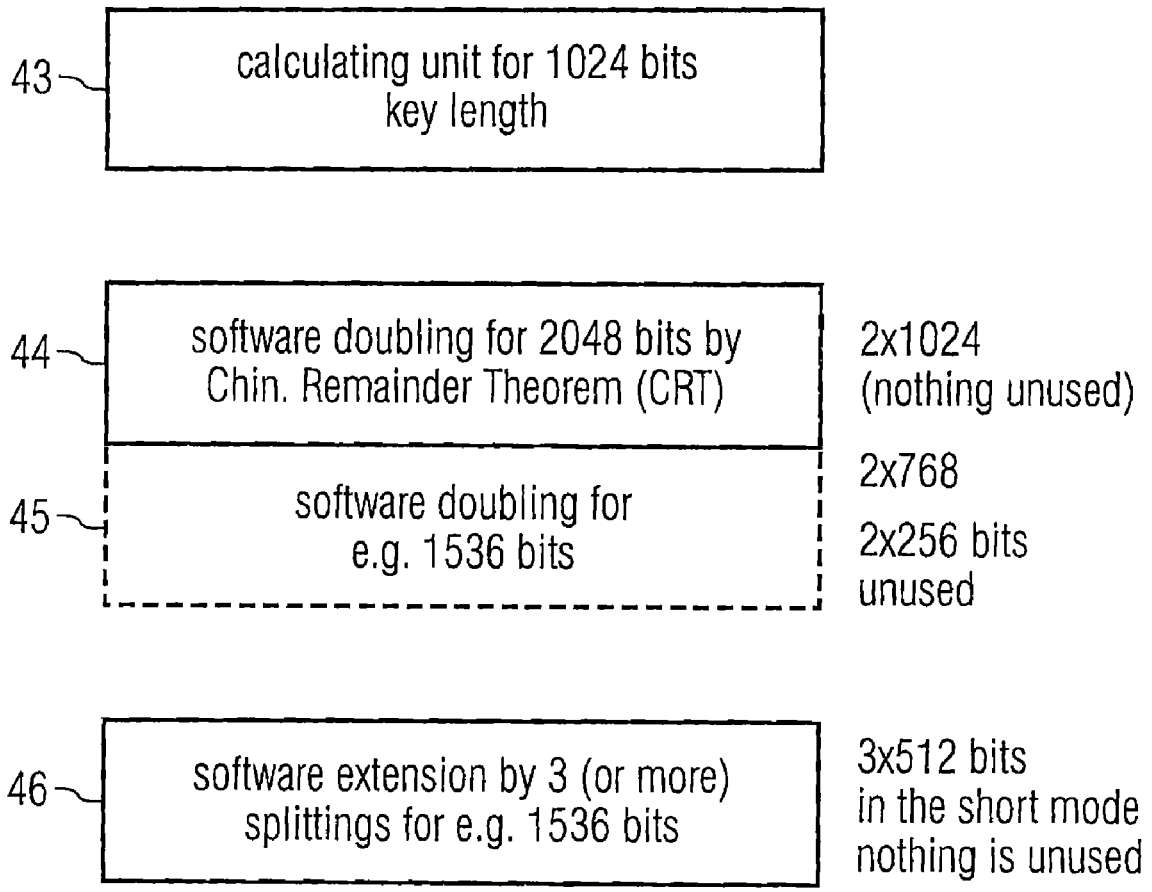

FIG 4E

| | algorithm I | algorithm II | algorithm III |
|---|---|---|---|
| $mm_K$ : theoretical | $18mmd_k + 3mm_k + 9mov_k$ | $7mmd_k + 16mov_k$ | $18mmd_k + 6mov_k$ |
| $k$ | $k = \lceil \frac{K}{3} \rceil$ | $k \approx \lceil \frac{K}{2} \rceil$ | $k = \lceil \frac{K}{3} \rceil + 4$ |
| Xmemory/bit needed | $9k$ | $8k$ | $8k$ |
| $K = 2048$: | | | |
| $k$ | 683 | 1024 | 687 |
| $mm_K/au$ | 7263 | 10114 | 5994 |
| full exponentiation/$au$ | 22.3 M | 31.0 M | 18.4 M |
| $K = 2048 + 16$: | | | |
| $k$ | 688 | 1052 | 692 |
| $mm_K/au$ | 7452 | 10254 | 6660 |
| full exponentiation/$au$ | 22.9 M | 31.5 M | 20.4 M |
| $K = 1536$: | | | |
| $k$ | 512 | 768 | 516 |
| $mm_K/au$ | 5514 | 7660 | 4482 |
| full exponentiation/$au$ | 12.7 M | 17.6 M | 10.3 M |
| $K = 2752$: | | | |
| $k$ | - | 1377 | - |
| $mm_K/au$ | - | 19668 | - |
| full exponentiation/$au$ | - | 81.1 M | - | algorithm I: Montgomery multiplication
algorithm II: Fischer-Sedlak-Seifert multiplication
algorithm III: new algorithm according to invention

- below 2064 bits: algorithm III is the fastest one
- above 2065 bits: only algorithm II still works
- algorithm III requires the fewest external memory (X memory)

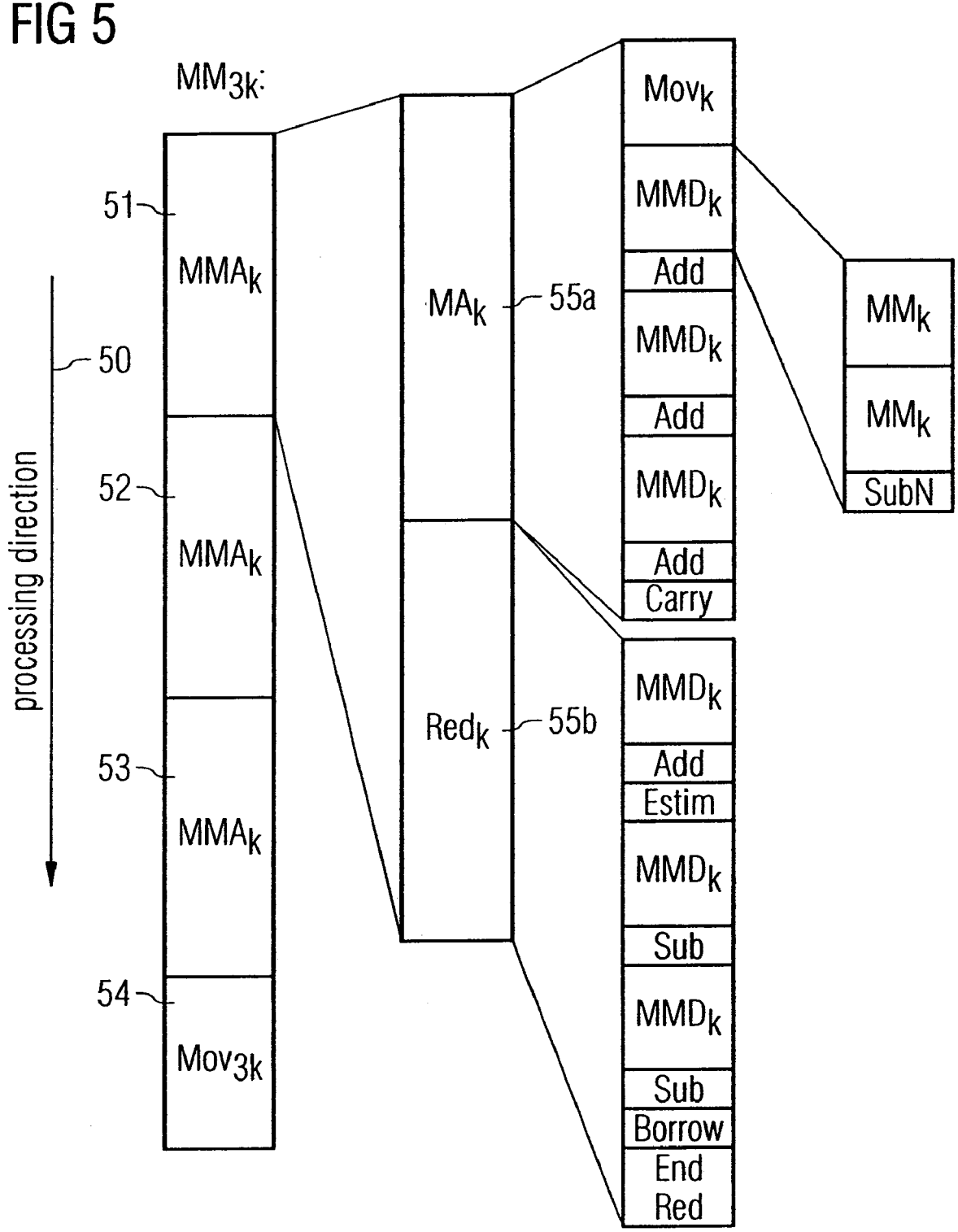

FIG 6A

```
MM_3k input:   N = (N_2|N_1|N_0)_Z  with  N_2 ∈ [⅔Z, Z[

A = (A_2|A_1|A_0)_Z ∈ [0, N[
         B = (B_2|B_1|B_0)_Z ∈ [0, N[
output: A·B mod N ∈ [0, N[

C  := MMA'_Z(A, B_2, 0; N)
C' := MMA'_Z(A, B_1, C; N)
E  := MMA_Z(A, B_0, C'; N)

return E
```

FIG 6B
Input:
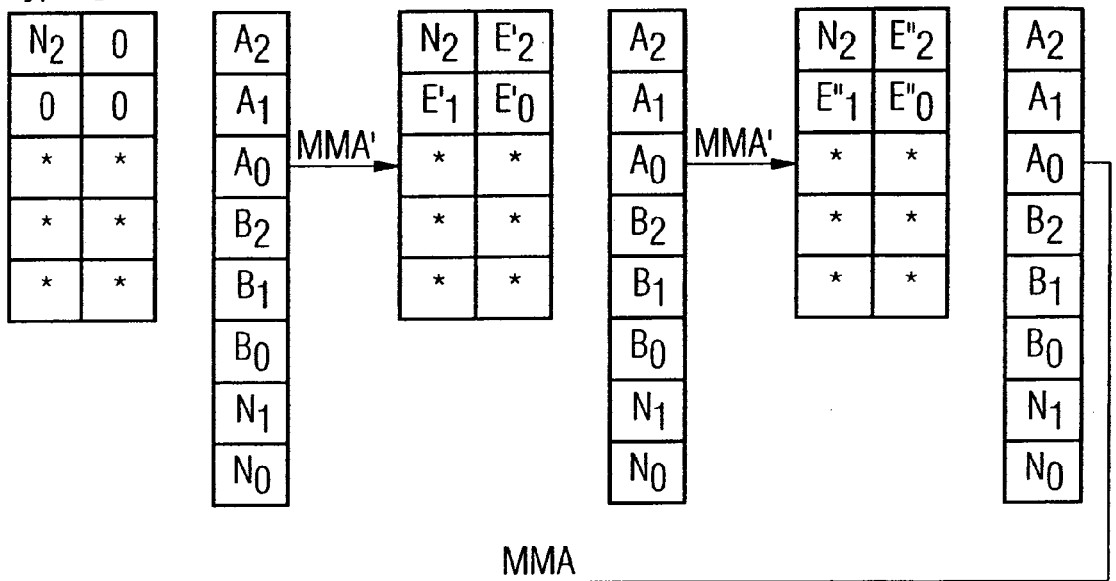
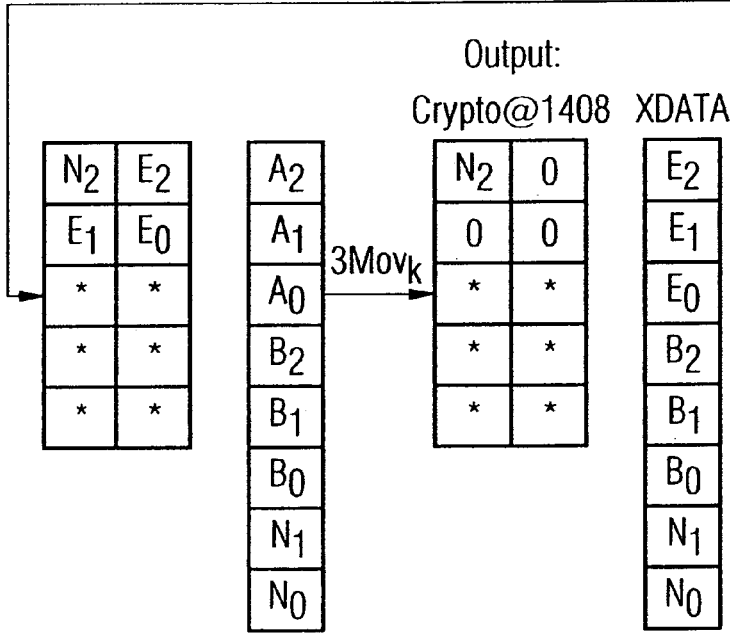
Output:

FIG 7A

MMA$_Z$ input: $N = (N_2|N_1|N_0)_Z$ with $N_2 \in [\frac{2}{3}Z, Z[$ $A = (A_2|A_1|A_0)_Z \in [0, N[$
$B_j \in [0, Z[$
$C \in [-N, 0]$ output: $A \cdot B_j + C \cdot Z \bmod N \in [0, N[$ $D := MA_Z(A, B_j, C)$
$E := Red_Z(D; N)$ return $E$

FIG 7B

MMA'$_Z$ input: $N = (N_2|N_1|N_0)_Z$ with $N_2 \in [\frac{2}{3}Z, Z[$ $A = (A_2|A_1|A_0)_Z \in [0, N[$
$B_j \in [0, Z[$
$C \in [-N, 0[$ output: $A \cdot B_j + C \cdot Z \bmod N \in [-N, 0[$ $D := MA_Z(A, B_j, C)$
$E := Red'_Z(D; N)$ return $E$

```
MA_z
input:  A = (A_2|A_1|A_0)_z ∈ [0, N[
        B_j ∈ [0, Z[
        C = (C_2|C_1|C_0)z ∈ [-N, 0]
        i.e., C_2 ∈ [-N_2-1, N_2]
output: D := A·B_j + C·Z ∈ [-NZ, NZ[

(U_1, U_0) := MMD(B_j, A_2; Z)
(D'_3|D'_2)_z := (C_2+U_1, C_1+U_0)_z
(V_1, V_0) := MMD(B_j, A_1; Z)
(D"_2|D"_1)_z := (D'_2+V_1, C_0+V_0)_z
(W_1, W_0) := MMD(B_j, A_0; Z)
(D"_1|D_0)_z := (D'_1+W_1, W_0)_z
(D_3|D_2|D_1|D_0)_z := (D'_3, D"_2, D"_1, D_0)_z return D
```

FIG 8C
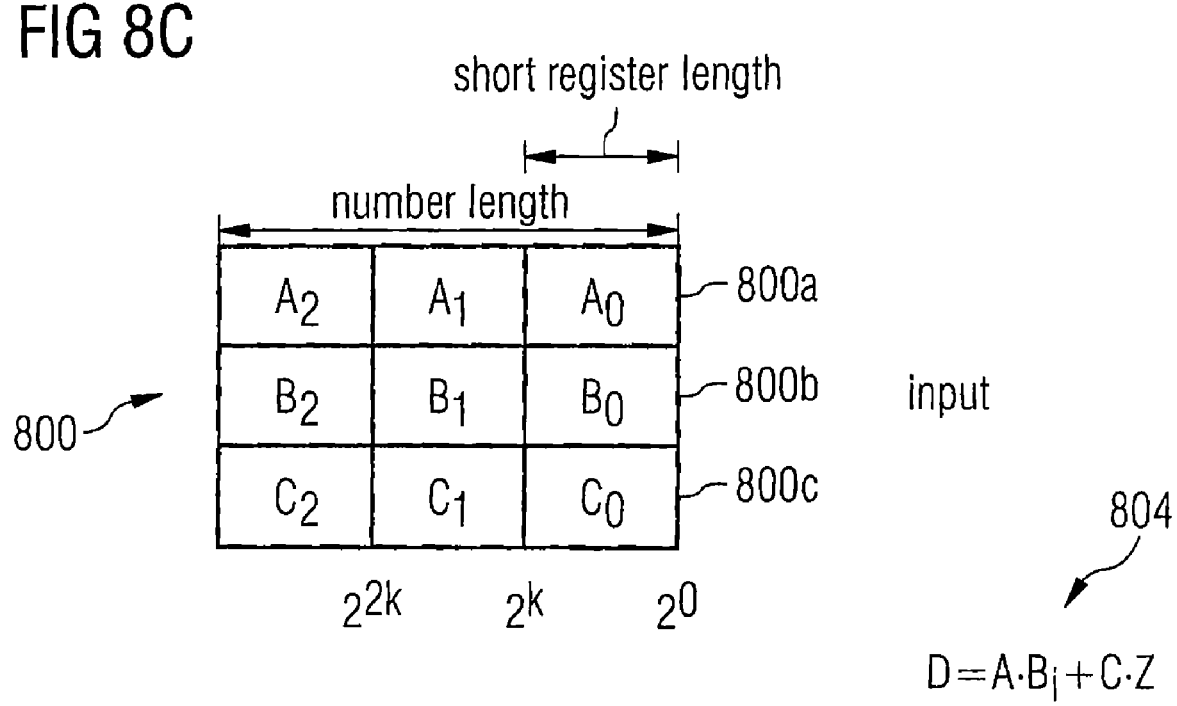
$D = A \cdot B_i + C \cdot Z$
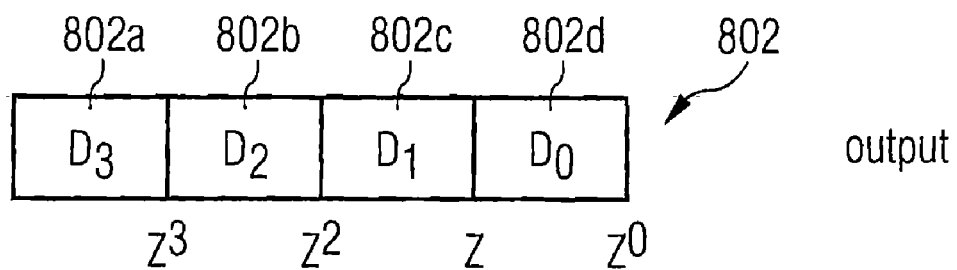
D0: MOD result of the last MMD operation
D3, D2, D1: updated MOD-DIV results of the three MMD operations

FIG 8E example: A = [8|6|5]   D = 865·9 + 10·(713)

$B_i$ = [ |9| ]   Z = 10

$C_i$ = [7|1|3]

1st step:

| $U_1$ | $U_0$ |
|---|---|
| 7 | 2 |

$D'_3$ $D'_2$
0      1

2 auxiliary registers

2nd step:

| $V_1$ | $V_0$ |
|---|---|
| 5 | 4 |

$D''_2$ $D'_1$
6       1

2 auxiliary registers

3rd step:

| $W_1$ | $W_0$ |
|---|---|
| 4 | 5 |

$D''_1$ $D'_0$
5       5

2 auxiliary registers 4 result registers:

| $D'_3$ | $D''_2$ | $D''_1$ | $D_0$ |
|---|---|---|---|
| 0 | 6 | 5 | 5 |

```
TC input:  (Y, X)_Z, X ∈ [0, 2Z[
output: (Y|X)_Z if (X ≥ Z) then
    X:=X-Z
    Y:=Y+1
end return (Y, X)
```

FIG 9B

```
TB input:  (Y, X)_Z, X ∈ [-Z, Z[
output: (Y|X)_Z if (X < 0) then
    X:=X+Z
    Y:=Y-1
end return (Y, X)
```

FIG 9C $\text{Red}_Z^{[r]}$ input: $N = (N_2|N_1|N_0)_Z$ with $N_2 \in [\frac{2}{3}Z, Z[$ $\quad\quad\quad D = (D_3|D_2|D_1|D_0)_Z \in [-NZ, NZ[$ output: $D \bmod N \in [0, N[$ output': $D \bmod' N \in [-N, 0[$ 184a $\begin{cases} (Q_0, R_0) := \text{MMD}(D_3, Z-N_2; N_2) \\ Q'_0 := Q_0 + D_3 \end{cases}$ 184b $\{ D'_2 := D_2 + R_0$ 184c $\begin{cases} \varepsilon := \text{estimate } (D'_2 - (Q'_0 N_1)_1 \text{ div } N_2)[+1] \\ D''_2 := D'_2 - \varepsilon N_2 \\ Q''_0 := Q'_0 + \varepsilon \end{cases}$ 186a $\begin{cases} (U_1, U_0) := \text{MMD}(Q''_0, N_0; Z) \\ (D'_1|D'_0)_Z := (D_1 - U_1, D_0 - U_0)_Z \\ (V_1, V_0) := \text{MMD}(Q''_0, N_1; Z) \\ (D'''_2|D''_1)_Z := (D''_2 - V_1, D'_1 - V_0)_Z \end{cases}$ 186b $\{ (E_2|E_1|E_0)_Z := (D'''_2, D''_1, D'_0)_Z \bmod [\prime] N$ return $E$

FIG 13A input: $N^* = (N^*_2 | N^*_1 | N^*_0)_W$
output: $(N'_2 | N'_1 | N'_0)_Z = N^*$ $(Q_1, R_1) := \text{MMD}(N^*_2, W; Z)$
$(Q_2, R_2) := \text{MMD}(Q_1, W; Z)$
$(Q_3, R_3) := \text{MMD}(R_1, W; Z)$
$(N'_2 | N'_1 | N'_0)_Z := (Q_2, R_2 + Q_3, R_3 + N^*_0)_Z$
$(Q_4, R_4) := \text{MMD}(N^*_1, W; Z)$
$(N'_2 | N'_1 | N'_0)_Z := (N'_2, N'_1 + Q_4, N'_0 + R_4)_Z$ return $(N'_2 | N'_1 | N'_0)_Z$

FIG 13B

Div input: $X, Y$ with $X < Y^2$
output: $X \text{ div } Y = \left\lfloor \frac{X}{Y} \right\rfloor$ $R := X \bmod Y$
$R' := X \bmod (Y+1)$
$Q := R - R'$
if $Q < 0$ then
  $Q := Q + Y + 1$
end return $Q$ input: $A = (A_2|A_1|A_0)_Z$,
$\quad\quad N^* = (N'_2|N'_1|N'_0)_Z$
output: $(A'_2|A'_1|A'_0)_Z := A \bmod N^*$ $Q := \text{Div}(A_2, N'_2 + 1)$
$(M_2|M_1|M_0) := \text{MA}((N'_2|N'_1|N'_0)_Z, Q, 0)$
$(A'_2|A'_1|A'_0)_Z := (A_2 - M_2, A_1 - M_1, A_0 - M_0)_Z$
if $A'_2 < 0$ then
$\quad (A'_2|A'_1|A'_0)_Z := (A'_2 + N_2, A'_1 + N_1, A'_0 + N_0)_Z$
end return $(A'_2|A'_1|A'_0)_Z$ max. processable number:
$\pm 2^n - 1 = \pm N \cdot Z$
N: modulus
Z: integer larger than 1

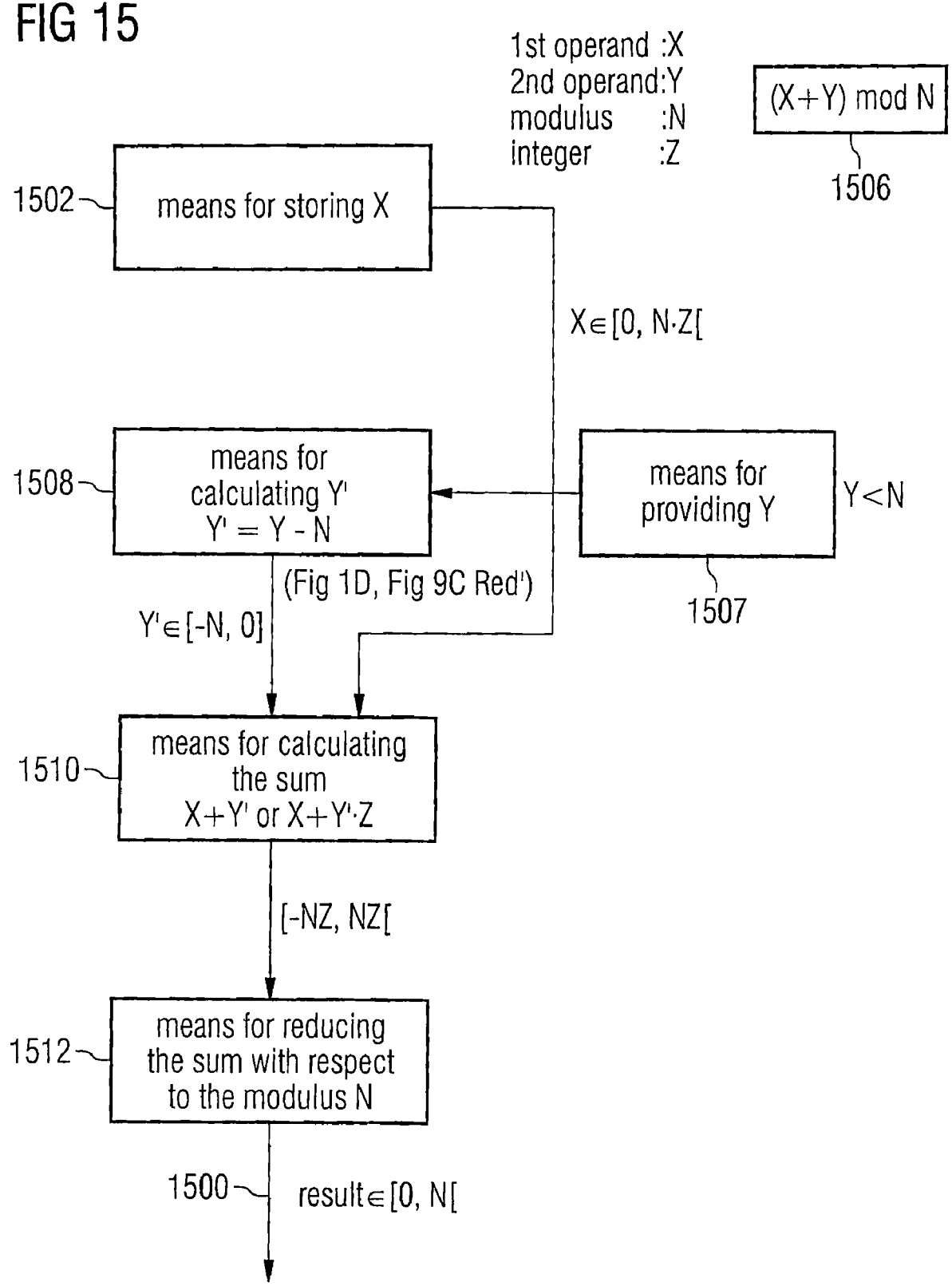

FIG 16

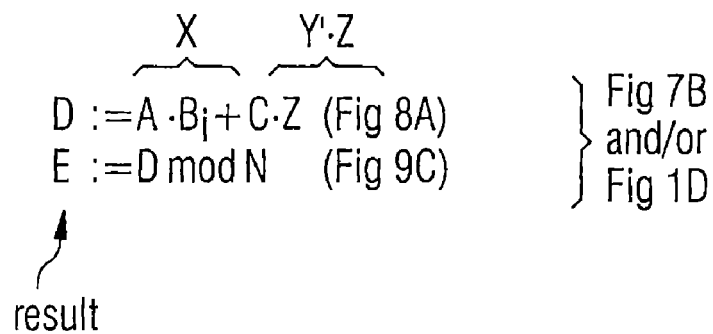

$$D := \underbrace{A \cdot B_i}_{X} + \underbrace{C \cdot Z}_{Y' \cdot Z} \quad \text{(Fig 8A)}$$
$$E := D \bmod N \quad \text{(Fig 9C)}$$

$\Big\}$ Fig 7B and/or Fig 1D

↑ result

FIG 17A example with invention $Y=7; X=95; N=10, Z=10$
$E=(X+Y) \bmod N$ $Y-N=-3$
$(Y-N)+95=92$ $92 \bmod N = 2$ CU can process all values
that are not a value larger than 99
$92 \in [-100, 100]$

FIG 17B comparative example $X+Y=102$ $102 \bmod N = 2$

CU cannot select result that
the CU ($X+Y=102$) cannot
process/store
$102 \notin [-100, 100]$

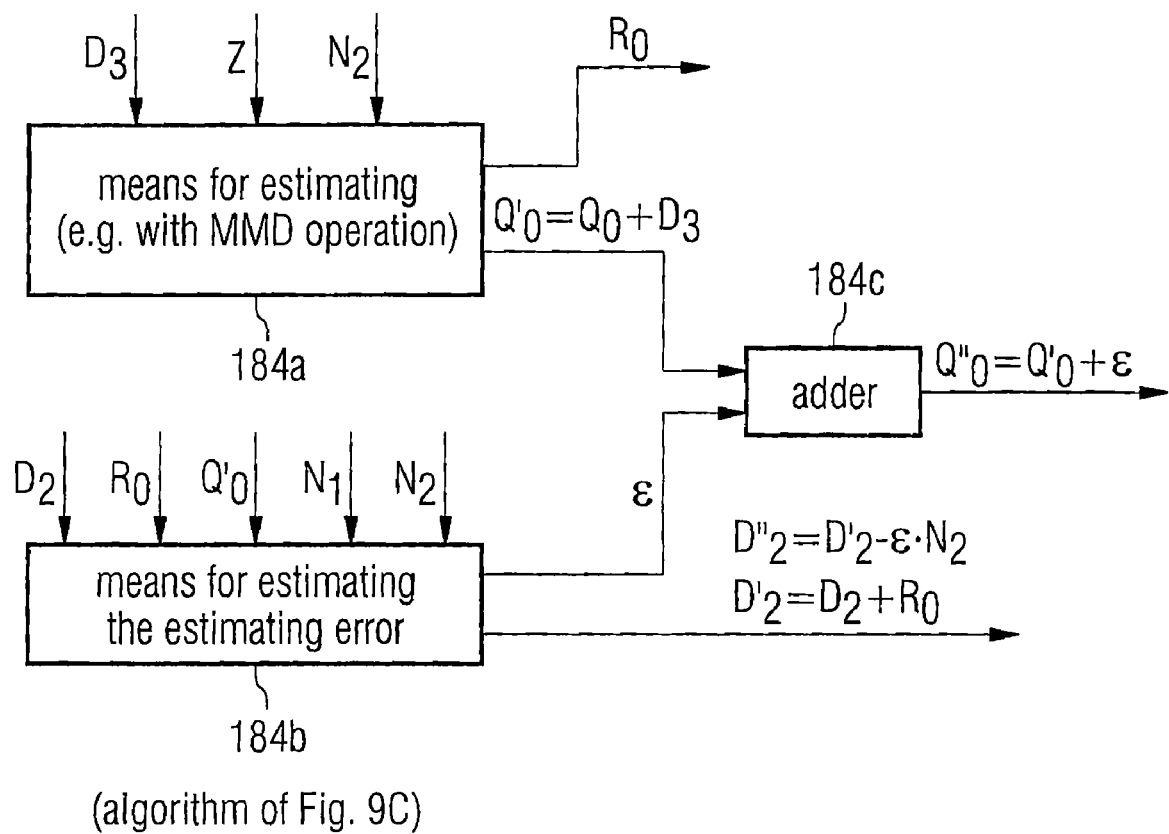

(algorithm of Figs. 3D-3F)

(algorithm of Fig. 9C)

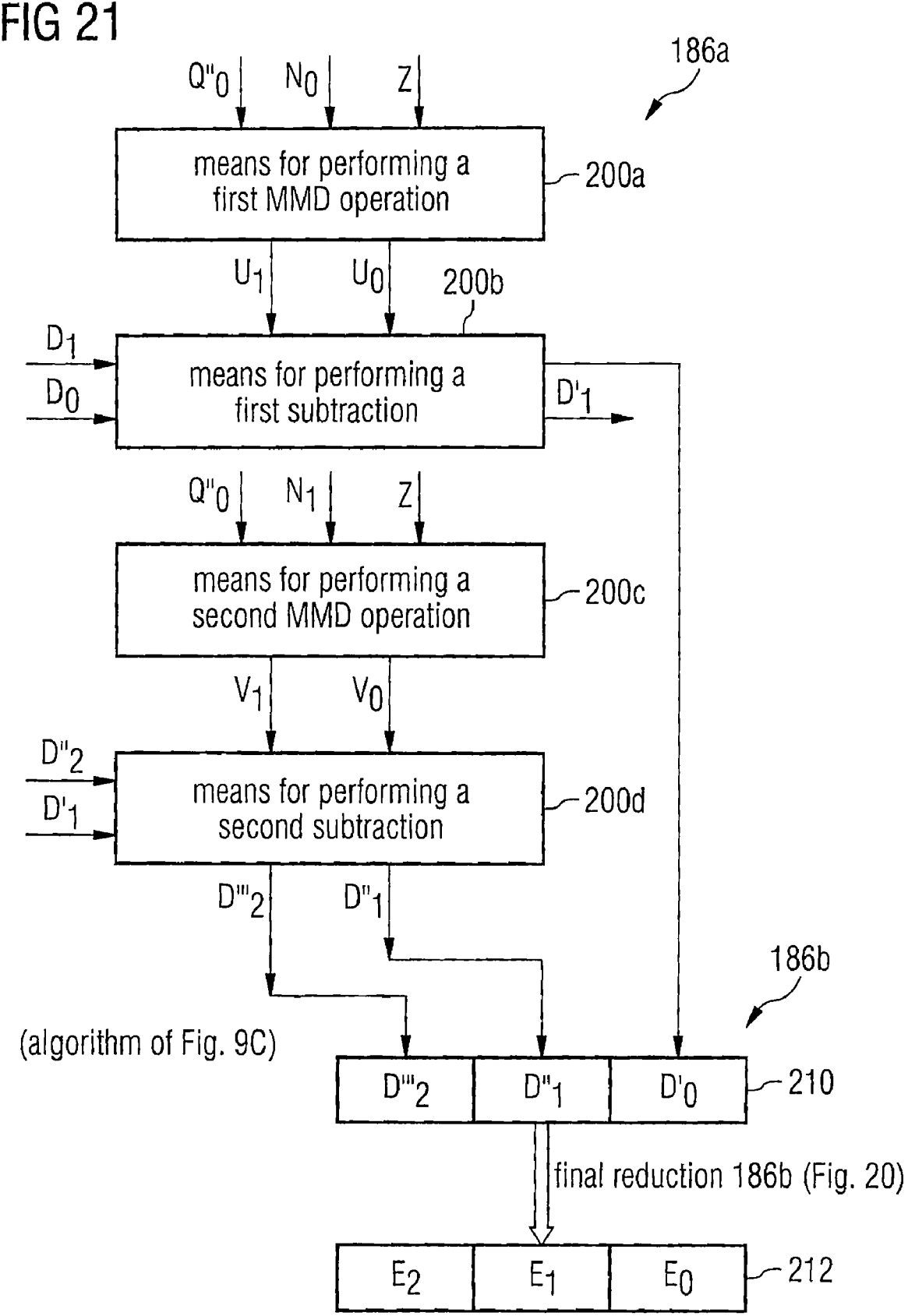

CALCULATING UNIT FOR REDUCING AN INPUT NUMBER WITH RESPECT TO A MODULUS

CROSS-REFERENCE TO RELATED APPLICATIONS

This application claims priority from German Patent Applications No. 10 2006 025 673.5, filed on Jun. 1, 2006, and No. 10 2005 051 772.2, filed on Oct. 28, 2005, which are incorporated herein by reference in their entirety.

BACKGROUND

The present invention relates to calculating units for reducing an input number with respect to a modulus and particularly to calculating units whose processable word width is less than a word width of the input number or the modulus, wherein such requirements particularly occur in cryptographic applications.

The modular multiplication is a central operation used in modular exponentiation, such as it is usually used in cryptography. For example, as shown in FIG. 2a, a key pair is generated in public key cryptography, i.e. in asymmetric cryptography, such as in the RSA method. The key pair consists of a public key e and a private key d. The private key is only known to one entity. The public key serves this entity, but is provided to another entity which wants to send, for example, encrypted data to the one entity to which the private key belongs. As shown in FIG. 2a, an encryption of an unencrypted message M to an encrypted message C is done by calculating a so-called modular exponentiation, in which the message is raised to a higher power with the public key, to then perform a modular reduction with respect to the modulus N, which is also known publicly. For the decryption, the same operation is performed, but now with the private key as exponent, so that the one entity to which the private key belongs and by which the public key was originally distributed to the other entity, again obtains the plain text message M.

These public key methods may also be used as signature/verification methods. An entity generates a digital signature by encrypting the message M to be signed with the private key of this entity to generate the signature S, such as it is also illustrated in FIG. 2a. The verification is then done by the verifying entity subjecting the signature to modular exponentiation with the public key e of the signing entity to then obtain a plain text message M that may be compared to the plain text message M to which the signature is assigned. If the plain text message obtained in the verification matches the plain text message to which the signature is assigned, it may be assumed that the signed document is authentic.

As mentioned above, a cryptographic calculation including modular exponentiation, such as illustrated in FIG. 2b, is split into several modular multiplications. For example, it is usually preferred to calculate a modular exponentiation by applying modular multiplications consecutively. In particular, due to the increased security requirements for the RSA algorithm, there is an interest to execute a modular multiplication with a width of 2048 bits, i.e. with key lengths and/or modulus lengths of 2048 bits.

Generally in modular multiplication as part of a cryptographic calculation, both the multiplier A and the multiplicand B and the modulus N represent parameters of the cryptographic calculation, because the final results, such as plain text message, encrypted message, signature, etc. depend on these parameters.

As already mentioned, there is an interest to steadily increase the key lengths of public key cryptography, because this allows to still prevent so-called brute force attacks with increasingly fast processors. For example, the effort of a brute force attack is correlated with the key length, so that increasingly long keys also require increasingly more complex brute force attacks which, with currently available computers, take so much time that a cryptographic algorithm may be considered to be safe. However, what is problematic with increasingly larger key lengths is that the key length that a crypto co-processor in a chip card or a computer (for example in a TPM module) has is limited by the long number calculating unit included in this crypto co-processor. Such a long number calculating unit is shown, for example, in FIG. 4c, where a so-called bit-slice structure of a long number calculating unit is illustrated.

In the embodiment shown in FIG. 4c, each bit slice includes an arithmetic unit, which may, for example, be a one-bit full adder, which may receive a carry from a lower bit slice and which may output a carry to a higher bit slice. Furthermore, at least one register is associated with such a bit slice. However, it is preferred to associate a certain number of registers, for example two or, even better, for example five registers. In a currently existing crypto co-processor with a bit slice number of 1408 slices, a bit slice includes five registers, i.e. register Z, register C, register N, register $CR_0$ and register $CR_4$, as indicated in the left subimage in FIG. 4a. In that case, this processor operates in long mode. With this number of bit slices, the processor is well-suited to perform RSA calculations with key lengths of 1024 bits, because, for a calculation with 1024 bits key length, a calculating unit that would also have only 1024 bit slices would not be quite sufficient. In the calculating unit with 1408 bit slices, slightly longer key lengths may also be calculated, but there should always be slightly more bit slices than key bits to be able to compensate certain overflow or underflow situations.

The calculating unit 40 shown in FIG. 4b may be provided with data and/or flow sequences and/or controlled by a controller 41. Furthermore, there is a register configuration means 42 which may configure the registers of the calculating unit, i.e. the five registers in long mode in this embodiment, to ten registers in short mode. Each long mode register of a certain length thus results in two short registers of half the length, respectively, in this embodiment, so that two N registers, two C registers, two Z registers and one $CR_0$ register, one $CR_2$ register, one $CR_4$ register and one $CR_6$ register are created. Still each bit slice has an arithmetic unit, i.e. for example a one-bit full adder, which now, however, has twice the number of registers in short mode in contrast to the situation in FIG. 4c representing the long mode.

If the crypto co-processor with 1408 bits now is to calculate RSA key lengths of, for example, 2048 bits, this is no longer easily possible, because there are not enough bit slices.

It is apparent that, although an increase in key lengths is very desirable from the security point of view, each increase in key lengths causes already existing coprocessors to be no longer readily usable. Thus, always new longer calculating units would have to be developed, which requires development time and costs.

In order to avoid this, methods have been developed with which larger numbers may be processed on smaller calculating units. For example, there are generally methods for doubling a calculating unit in software. Such a method is, for example, the calculation of the modular multiplication using the Chinese Remainder Theorem (CRT), as it is described in section 14.5 on pages 610-613 of "Handbook of Applied Cryptography", A. Menezes, P. van Oorschot, S. Vanstone, 1996. Generally, a modular exponentiation with a long modulus is split into two modular exponentiations with a short modulus using the Chinese remainder theorem, wherein these results are then combined. In that way, a calculating unit may, so to speak, be doubled "software-wise".

However, this concept only allows doubling, which is inconvenient for situations in which doubling of the key lengths is not necessarily required, but in which key lengths are to be used that are maybe only 50% larger than the architectural calculating unit length, i.e. the number of bit slices. If such 100% doubling algorithms are used, when perhaps only key lengths larger by 50% are to be processed, the calculating unit is used only with (100+50)%/2=75%. In principle, hardware resources are thus wasted.

In addition to the CRT doubling method, there are also further calculating unit doubling algorithms, such as the Montgomery multiplication, a multiplication with Karatsuba-Offman and subsequent reduction by means of, for example, the Barrett reduction, or the doubling method using the MultModDiv operation, such as it is, for example, discussed in German patent DE 10219158 B4.

Considering, for example, FIG. 4d, a calculating unit for a 1024 bit key length is indicated at 43. Software doubling using, for example, the Chinese remainder theorem or using one of the above further methods, is useful when 2048 bits are required, such as illustrated in block 44 in FIG. 4d. In this way, the whole calculating unit is used, i.e. no unused bit slices remain. However, if a key length with, for example, 1536 bits is to be enough, software doubling using, for example, the Chinese remainder theorem (CRT) will result in 2×768 bits being required. The remaining 2×256 bits would remain unused in this case.

Often there is a demand in the art to perform a reduction of a number with respect to a modulus, i.e. to obtain the remainder of an integer division. Such reductions particularly occur in cryptographic applications based on modular arithmetic, such as in the known asymmetric cryptography techniques, such as the RSA method or also in elliptic curve cryptography. Wherever calculation takes place on a limited body, sooner or later the task has to be solved to get a number that is larger in magnitude than the largest number in this body back into the body, i.e. to reduce it with respect to the modulus associated with the body.

A simple possibility of modular reduction is to subtract the modulus from the number until the result of the subtraction is less than the modulus. In that way, the larger number has been "reduced into" the body again. Such a procedure is normally done so that the number is taken, the modulus is subtracted and that there is then a determination whether the result of this subtraction is already less than the modulus. If this is the case, the modular reduction is already completed. However, if this is not the case, the modulus is again subtracted from the result of the first subtraction, and afterwards there is another determination whether the thus obtained result is again less than the modulus or not. Depending on the result, the reduction is then completed or is continued iteratively.

This procedure is problematic for several reasons. One reason is that the number of steps and the duration of the total calculation significantly depend on the original value of the number. If this number is only slightly above the modulus, a single subtraction process will be sufficient. Thus the result is obtained quickly, while, if the number is significantly larger than the modulus, many such steps are required. Thus it is easy for an attacker to draw conclusions as to the size of the original number based on the duration of the calculation and the current consumption.

What is further problematic is that, if the numbers are larger than the calculating unit width of the processor, the subtraction of a large number, such as the modulus, from an even larger number, such as the number to be reduced or an intermediate result, involves a lot of effort, because the numbers always have to be loaded into the calculating unit in small portions to then perform the individual subtractions piece by piece, which results in significant transfer between the calculating unit and an external memory etc. particularly due to the limited calculating unit length.

On the other hand, particularly in cryptographic applications, the key length is a significant security aspect with respect to so-called brute force attacks, i.e. attacks in which an attacker simply tries every possibility to then "crack" either the key or at least the message after a large number of attempts. Such brute force attacks involve increasing effort the longer the keys and thus also the larger the numbers and/or the modulus in the cryptographic calculation.

However, to keep up with such growing key lengths, a new calculating unit in the form of a new cryptoprocessor or cryptocoprocessor would actually have to be developed and brought onto the market with every new key length. However, this concept is not very flexible and not acceptable for many customers, because they would always have to give back, for example, their old payment cards and exchange them for new payment cards with a cryptoprocessor having a wider word length. However, this concept is exceptionally inflexible and not suitable for a mass market, as it applies to chip cards.

Conventionally, there is thus a lack of a more flexible concept for reducing an input number with respect to a modulus.

BRIEF SUMMARY

Among other things, the present invention concerns a calculating unit for reducing an input number with respect to a modulus, wherein the input number comprises input number portions of different significances and/or valencies, wherein the input number portions represent the input number with respect to a division number, wherein the modulus comprises modulus portions of different significances, and wherein the modulus portions represent the modulus with respect to the division number, includes means (184) for estimating a result of an integer division of the input number by the modulus using a stored most significant portion of the number, a stored most significant portion of the modulus and the number and for storing the estimated result in a memory of the calculating unit, and means for calculating a reduction result based on a subtraction of a product of the modulus and a value derived from the estimated result from the number.

BRIEF DESCRIPTION OF THE SEVERAL VIEWS OF THE DRAWING(S)

Next, there will be given a detailed description of the preferred embodiments of the present invention with respect to the accompanying drawings, in which:

FIG. 1c shows a schematic representation of the functionality of the inventive device for combining the intermediate results;

FIG. 1d shows a representation of the modular multiplication operation;

FIG. 1e shows a representation of the modular multiplication with addition;

FIG. 2c shows a schematic representation of the multiplication operation;

FIG. 2d shows a special representation of the inventive MultAdd operation;

FIG. 2e shows a special representation of the MultModAdd operation;

FIG. 2f shows a special representation of the modular multiplication operation;

FIG. 2g shows a schematic representation of the MultModDiv operation sequentially used in the present invention;

FIG. 3a shows a general representation of the inventive MultAdd operation;

FIG. 3b shows a base version of the reduction operation;

FIG. 3c shows a first preferred version of the reduction operation;

FIG. 3d shows a second preferred version of the reduction operation;

FIG. 3e shows a third preferred version of the reduction operation;

FIG. 3f shows a fourth preferred version of the reduction operation;

FIG. 4a shows a representation of the register situation of a calculating unit in long mode and in short mode;

FIG. 4b shows a schematic representation of a configurable calculating unit;

FIG. 4c shows a schematic representation of a bit slice structure of a calculating unit;

FIG. 4d shows a schematic representation of the various possibilities of software doubling as compared to the inventive software extension by three or more splittings;

FIG. 4e shows a tabular comparison of various algorithms;

FIG. 5 shows a flow diagram of the inventive calculation;

FIG. 6a shows a preferred implementation of the modular multiplication algorithm;

FIG. 6b shows a preferred register implementation of the algorithm of FIG. 6a;

FIG. 7a shows a preferred implementation of the MMA operation;

FIG. 7b shows an alternative implementation of the MMA operation;

FIG. 8b shows a preferred register implementation of the MMA operation of FIG. 8a;

FIG. 8c shows a schematic representation of the input and output operands in the present invention;

FIG. 8e shows a calculating example for the present invention illustrating the register loading of the short auxiliary and result registers for each intermediate step;

FIG. 9a shows a preferred implementation of the TC operation (TC=treat carry);

FIG. 9b shows a preferred implementation of the TB operation (TB=treat borrow);

FIG. 9c shows a preferred implementation of the reduction operation;

FIG. 11b shows a register implementation of the MMD operation of FIG. 11a;

FIG. 13a shows an implementation of a transform rule for the modulus;

FIG. 13b shows an implementation of the DIV operation;

FIG. 15 shows a block circuit diagram and/or flow diagram of the device and/or the method for calculating a result of a sum;

FIG. 16 shows an association of the procedure with the modular multiplication described in FIGS. 8 and 9;

FIG. 17a shows a calculating example;

FIG. 17b shows a comparative example that may be calculated with significant time/complexity disadvantage;

FIG. 19b shows a preferred implementation of the means 184 for estimating of FIG. 18 according to the algorithm of FIG. 9c.

FIG. 21 shows a preferred implementation of the means for performing the subtraction of FIG. 20 according to the algorithm of FIG. 9c.

DETAILED DESCRIPTION

Figures 1A, 1B:
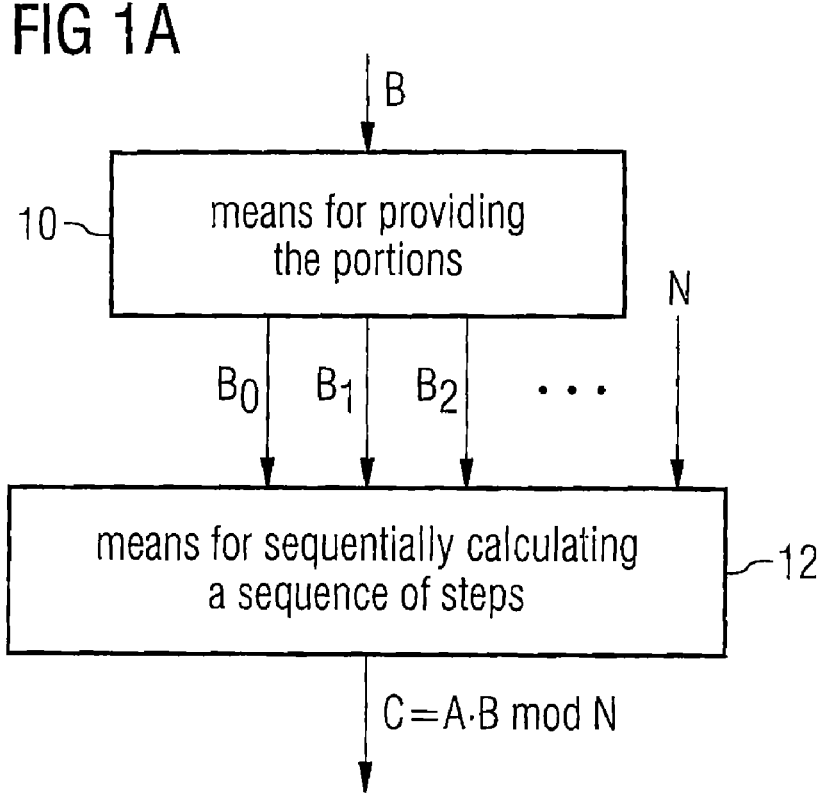
FIG. 1a shows a schematic representation of the device for calculating a result of a modular multiplication according to a preferred embodiment of the present invention.
FIG. 1b shows a register representation of the operands A, B, N of FIG. 1a and the division of the operands into portions.

Preferably, the result of an integer division of the input number by the modulus, on the basis of which there is then performed the modular reduction, is estimated by not using the whole number and the whole modulus, but only a most significant portion of the number and a most significant portion of the modulus. Furthermore, for estimating the result of the integer division, there is also used the division number on the basis of which the most significant portions of the number and the modulus are determined. This estimated result, which is a short number, may then easily be stored in a register of the calculating unit and does not have to be treated separately. The reduction result per se is then determined from the input number based on the estimated result and a subtraction of the product of the modulus and a value derived from the estimated result. According to the invention, for the reduction there is thus first used the reduction algorithm, which does not subtract one modulus after the other and check after each subtraction whether the remainder class has been reached. Instead, the number of subtractions is estimated, so to speak, using the most significant portions of the modulus and the number to then obtain the reduction result on the basis of a subtraction of the product of the modulus and the estimated number.

It has been found that the estimating result of the integer division that is not performed on the basis of the whole number and the whole modulus, but is performed only on the basis of a most significant portion of the number and a most significant portion of the modulus, is already very close to the exact result of the integer division, so that the speed of the modular reduction may already be significantly increased by this measure as compared to the case in which the modulus is always subtracted once to then check again whether this has been sufficient or not. According to the invention, this also significantly increases the security of the calculating unit, because particularly when the means for calculating the reduction result processes the result of the subtraction again step by step, only few steps are required or perhaps not even one step is required to "make up for" the error occurred in estimating.

According to the invention, however, it is preferred to also estimate the estimating error itself, namely so that the remaining error, i.e. the discrepancy between the estimated error and the actual error, is maximally equal to 1 or equal to −1. The result is that, when the subtraction is performed using the estimated result and the estimated estimating error, always only a single final reduction is required, i.e. an examination as to whether the result number is negative, wherein in that case a modulus would have to be added, or whether the number obtained in the subtraction is larger than the modulus to then subtract the modulus once.

In a further preferred embodiment, this subtraction is divided into several individual MMD operations preceding corresponding subtraction processes, so that all calculations are performed with numbers whose word width is less than the width of the modulus, and whose word width is particularly equal and, in a preferred embodiment, equal to a third of the whole word width of the modulus. Particularly, the modulus is also divided into individual portions. The result is that, when assuming a calculating unit having a certain maximum word length, a modular reduction may be performed efficiently with numbers having k times the length. In particular, with a calculating unit of a certain word width, it is preferred to process numbers having 1.5 times the word width of the calculating unit itself. The result is that, when the calculating unit is divided, the word width of the number divided into portions is equal to three times a single word width of the divided calculating unit.

However, when there is a sufficiently large number of registers, there could of course also be processed a number set having numbers not only 1.5 times the calculating unit register length, but even equal to three times the calculating unit register length. However, the present invention may also be applied to even higher number lengths, i.e. for example also to numbers four or five times the calculating unit register length, wherein, however, in that case a correspondingly larger number of registers is required, because the number of required registers increases with the ratio between the length of the numbers to be processed and the length of the individual registers provided by the calculating unit.

In preferred embodiments, in a calculating unit in which there may maximally be processed numbers whose magnitude is less than or equal to a product of a modulus and an integer larger than 1, when a sum of two operands is to be calculated with respect to a modulus, and when one operand of the two operands is less than the modulus, this operand is made negative in a way that the modified operand is equal to the non-modified operand minus the modulus. Then, a sum of the one operand with the modified operand will still be less than the maximally processable number, although the sum of the two operands without the modulus subtraction to make an operand negative would have yielded a number that would have been larger than the maximally processable number of the calculating unit.

The result of the sum calculation according to the invention is thus still within the allowed number range. This result, however, carries an error as compared to the number preceding the number to be processed.

This error, however, is eliminated according to the invention when this result is modularly reduced, namely with respect to the modulus that has previously been subtracted from the operand to achieve the modified operand.

The inventive device is particularly advantageous in that now, in a calculating unit designed to process negative and positive numbers, i.e. which processes a sign bit, still no overflow prevention measures are required, even if the sum of the two operands to be calculated resulted in an intermediate result larger than the maximally processable number of the calculating unit.

Thus, the inventive calculating unit is faster and more flexible and also less error prone in that no overflow is generated and thus no overflow managing measures are required that significantly slow down the calculating unit per se. According to the invention, there may thus also be calculated more complex calculations in which a sum and a subsequent reduction of the sum are required, wherein there will only be intermediate results smaller than the maximally processable number, because the sum is always smaller than the maximally processable number prior to its final reduction, because an addend is made negative, while the other addend is positive. Preferably, the sum is thus always transformed into a difference, wherein the difference partner is obtained by modulus subtraction, and the thus introduced error is again eliminated in the final modular reduction with respect to this modulus.

The only additional step required is that the second operand is made negative, namely by subtracting the modulus from its actual value without this measure. This additional step, however, only requires a simple subtraction of the modulus, thus takes place only on the arithmetic side and does not require any exceptional managing or overflow managing routine. Thus, there is no slowing down, which is not desirable.

It is particularly preferred if the inventive reduction by one N "too much" is embedded or integrated in a larger reduction in which there is a reduction by subtracting a multiple of N. In this case, the multiple simply needs to be incremented by one, wherein the subsequent subtraction is then performed considering the incremented multiple.

The concept is further advantageous in that the intermediate step of the "negative-making" of the second operand may be executed irrespective of whether the result of the sum of the two operands is really above the maximally processable number or not. Instead, it is preferred to operate independent of the values of the first and second operands, so that no value-dependent current profile of the circuit is externally visible. Thus, even by a side channel attack, for example by means of differential power analysis, it is not possible to determine whether an intermediate result is above the maximally processable number or not, because, irrespective of whether the intermediate result is actually larger than or less than the maximally processable number, always the same step sequence and thus essentially the same power consumption and thus also essentially the same time consumption and/or the same performance/time profile is output by the circuit.

In connection therewith, it is to be noted that the present invention is particularly suitable for long number calculating units, because these calculating units are designed for operands with lengths (significantly) above 300 bits anyway. On the other hand, increasing requirements of cryptographic securities and particularly also drastically increasing computing power that allows more and more brute force attacks to become increasingly feasible, result in increasingly longer keys and thus increasingly longer operands and/or numbers to be processed. Each measure with which calculations may be performed, although the intermediate results already become "too large" for the calculating unit, is thus highly welcome, because these measures as a whole result in a less expensive product, particularly due to the reduced hardware requirements for the same security, i.e. for the same key length. Especially in the area of chip cards, which are a mass product where price differences in the order of cents are important if a product is to survive on the market, the requirements of chip area (hardware requirements), security features and price are particularly tight. In addition, time aspects also play a role, because customers do not want to wait a long time when authenticating themselves somewhere with their chip cards. This expectation, however, does not prevent customers from expecting a maximum security standard of their chip cards.

It is exactly in this field of conflict that the present invention has its advantages, providing maximum security due to the reliability of actually too large intermediate results with, at the same time, fast execution of a cryptographic calculation, because no overflow measures are taken which would otherwise significantly slow down the operation of the chip card.

In order to further increase the efficiency, in preferred embodiments of the present invention, at least the multiplicand of a modular multiplication is divided into at least three portions, wherein each portion comprises a number of digits less than half the number of digits, wherein the at least three portions of the multiplicand include all digits of the multiplicand. Furthermore, means for sequentially calculating is provided to calculate an intermediate result sequentially for each portion of the multiplicand, and to then obtain a result of the modular multiplication using these intermediate results.

By splitting the multiplicand into at least three portions, a dividable calculating unit may preferably be used, in which the multiplicand and preferably also the multiplier and the modulus is divided into three or more parts, so that each third of the number may be accommodated in one half of the co-processor. Thus, the calculating unit itself may also be utilized in full length, and no hardware resources are wasted.

In preferred embodiments, a division of all registers of the calculating unit is done, namely into registers of the same length, and furthermore all operands, i.e. both the multiplier and the multiplicand and the modulus, are divided into three or more parts as well, so that in the end, for the calculation of the (long) modular multiplication, only logic and arithmetic operations are required that are done with numbers whose length, i.e. whose number of digits, is maximally equal to the number of digits of one portion of the numbers. Preferably, in order to obtain optimum utilization of a calculating unit, the portion into which a number is divided, i.e. the number of bit slices of the calculating unit that has to perform these operations with a smaller number of digits, is selected such that they correspond to one half of the dividable calculating unit.

Thus a calculating method using the MultModDiv operation is used, in which there are preferably never used more than ten short registers of the calculating unit, wherein two short registers of the calculating unit in short mode correspond to one register of the calculating unit in long mode.

In particular, in order to calculate the modular multiplication, the whole task is divided into three multiplication modulus addition operations to be performed sequentially in the present invention, wherein another portion of the multiplicand B is used for each one of these individual operations. Each such multiplication modulus addition operation is, in turn, divided into a multiplication addition operation and a subsequent reduction operation, wherein, in the multiplication addition operation, there is always used the currently considered portion of the multiplicand B, and in individual iteration steps, corresponding portions of the intermediate result C obtained from the previous step and the multiplier A are used.

Thus this multiplication addition operation is now divided into several MultModDiv operations, i.e. into modular multiplications, which respectively provide the integer quotient, i.e. the DIV result, and the remainder, i.e. the MOD result. Both the DIV result and the MOD result are short numbers that may be stored in short registers. The short registers in which results of the MMD operation are stored are also referred to as auxiliary registers, because they are written to several times in the process of the iterative processing of the multiplication addition operation. In other words, the results of an MMD operation are only required for the subsequent updating operation, in which a piece of the result number, namely a portion of the result number fitting into a short register, is successively calculated. Specifically, during updating, the result of the previous MMD operation is updated using an addition of portions of the third operand C, i.e. the intermediate result of a previous step.

Thus each updating step provides two entries into a result register, wherein the more significant entry into the result register already represents a final result that is not changed anymore, while the less significant entry of the two obtained results will still be changed by a result of an updating step depending on the current number situation.

The present invention thus only needs a calculating unit for a multiplication addition operation that has a word width equal to the length of only one portion and not the whole length of an operand, i.e. which has a short word width. In other words, such a calculating unit only requires internal registers of short length and not of long length. In addition, only in a preferred embodiment of the present invention only two auxiliary registers and—for a division into three portions—four short result registers are required. The multiplication addition operation may thus be calculated with only six short registers. In this case, the calculating unit is a bit slice stack, wherein each bit slice has a full adder function, i.e. receives a carry from a lower bit slice and passes a carry on to a higher bit slice, wherein "higher" and "lower" refers to the significance of the processed binary digits. If there is only a calculating unit with six internal registers, the calculating unit must be able to receive the additional operands from an external memory, i.e. the portions of the intermediate result from a previous iteration step and the required portions of the multiplier A and, if necessary, the current portion of the multiplicand B.

In the preferred embodiment of the present invention, a number of 10 or 12 short registers is sufficient for calculating the multiplication addition operation, which may be obtained by halving five or six long registers, wherein there is further available a working memory, which is typically called "XDATA", in which further portions are stored. This working memory, however, only has to be accessed with respect to a single portion of a single operand in each cycle, so that an operation may be efficient and with a small number of working memory accesses, but with maximum utilization of the internal registers. It is to be noted that the concept of calculating the result of a multiplication addition operation may be used not only as part of a modular multiplication, but in all cases where, using a processor allowing only short word lengths due to its construction, a multiplication addition operation is to be calculated that includes long operands, i.e. operands having a word length that may not be processed by the calculating unit in one go.

Before discussing the preferred use of the concept as part of the efficient calculation of a modular multiplication with an actually too small calculating unit in detail with respect to FIGS. 1 to 13c, first the present invention is illustrated with respect to FIGS. 14 to 17b, as it may be also used in a calculating unit in which there is no division of the operands. Also in such a calculating unit having, for example, registers and/or a number of bit slices equal to the digits of the maximally processable number, in which there is thus no operand division, the concept will also result in a performance advantage. The preferred application, however, is in a device and/or a method and/or a computer program usable for calculating the modular multiplication, wherein there is register division such that long operands and thus cryptographic key lengths may be calculated with a too short calculating unit.

Figures 13C, 14:
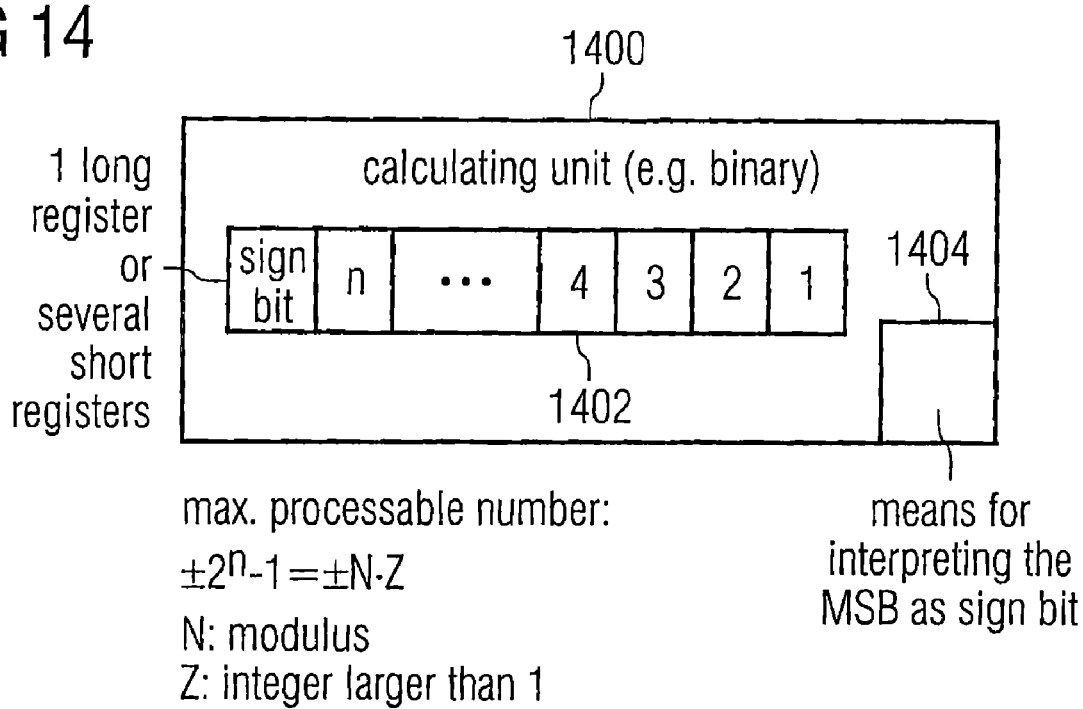
FIG. 13c shows a schematic representation of a reduction algorithm for the final reduction.
FIG. 14 shows a calculating unit with a maximally processable number and an associated sign bit.

FIG. 14 shows such a calculating unit 1400, which is, for example, a binary calculating unit, such as it is illustrated with respect to FIG. 4b. The calculating unit is defined by a maximally processable number which, in the binary case, is typically $+/-2^n-1$. This maximally processable number may also be represented by a product of the modulus N and a number Z, wherein the number Z is an integer larger than 1 and, in preferred embodiments of the present invention to be described later, is used to achieve a division of a long number into several short numbers.

The property of the calculating unit to process only numbers smaller than or equal to a maximally processable number is illustrated in FIG. 14 by an exemplary long register 1402 which exemplarily comprises a sign bit as MSB which, in a set state, indicates for example a negative number, while it indicates a positive number in the unset state. The digits of the number are symbolized by digits 1, 2, 3, 4, . . . , n in FIG. 14. Alternatively, however, the calculating unit could also be, for example, a decimal calculating unit, in which the digits would correspond exactly to the digits of the decimal system, wherein in that case both calculations of the maximally processable number have to take no longer the number "2", but the number "10" as the basis of the exponentiation.

Since the MSB and/or the highest digit of the maximally processable number is a sign bit, the calculating unit also includes means 1404 for interpreting the most significant bit (MSB) and/or the most significant digit of the maximally processable number as sign bit and not as "value bit".

As will be discussed later, the calculating unit may include such a long register. The long register, however, may also be implemented by various short registers, wherein again the most significant bit of the short register storing the most significant portion and/or the most significant "subnumber" is again interpreted as sign bit. With respect to the division of the numbers into operands, which will be discussed further below, this most significant portion would correspond, for example, to the portion $A_2$, $B_2$ and $N_2$, respectively, of an operand A, an operand B and a modulus N.

As a long number has only a single sign, no individual sign bit is required for the two remaining portions, i.e. for example $A_1$, $A_0$ and/or $B_1$ or $B_0$.

FIG. 15 shows a schematic block circuit diagram of a device and/or a method for calculating a result obtained at 1500 using a sum of a first operand X stored in means 1502 and a second operand Y that may be provided by means 1504. In the embodiment shown in FIG. 5, the second operand Y is smaller than the modulus N. Furthermore, the whole calculation of the sum is performed in a modular way, i.e. the result of the sum with respect to the remainder class defined by N is wanted, as it is illustrated at 1506 in FIG. 15.

As already discussed with respect to FIG. 14, the calculating unit 1400 including the elements shown in FIG. 15 is designed to process maximum numbers whose magnitude is less than or equal to a product of the modulus N and the integer Z larger than 1.

In particular, the calculating unit 1400 of FIG. 14 and/or the calculating unit illustrated in FIG. 15 includes the means 1502 for storing the first operand X in the calculating unit, wherein a magnitude of the first operand is less than or equal to the maximally storable number. It is to be noted that, if the first operand X is larger than the maximally storable number, storing would not be possible without special further measures anyway. Specifically, the preferred embodiment of the present invention further assumes that X is positive and less than the maximally storable number, as illustrated on the right-hand side with respect to block 1502 in FIG. 15. However, the first operand X may also become negative for other alternatives, as long as it has a magnitude smaller than N times Z, i.e. the maximally storable number.

The device further includes means 1508 for calculating a modified second operand Y', wherein the modified second operand is equal to the second operand minus the modulus N, so that the modified second operand is negative. A special integrated use within the modular multiplication of this "modulus subtraction" from an already reduced value is particularly illustrated in FIG. 1d or in FIG. 9c at "Red'" and will be discussed in more detail below.

The means 1508 and the means 1502 feed means 1510 for calculating a sum of the first operand and the modified second operand or the first operand and a product of the second operand times a factor less than or equal to the integer Z. The result of the means 1510 for calculating is thus larger than or equal to the product of the modulus and the integer, and is always smaller than the product of the modulus and the integer. The result of the sum calculation means 1510 is thus still within the allowed range, i.e. less than the maximally processable number, in spite of the fact that the sum of the first operand X and the non-modified second operand Y would actually have become larger than the maximally processable number, i.e., in the present case, larger than or equal to N, Z.

The calculated sum is finally supplied to means 1512 which performs a modular reduction of the sum with respect to the modulus to obtain the result 1500 which is, in turn, larger than or equal to zero and in any case less than the modulus N, and which is now again positive particularly in comparison with the output value of block 1508.

In other words, the error introduced by means 1508 is thus again eliminated due to the further subtraction of a modulus from the actually already reduced second operand by the modular reduction in step 1512. This small detour for calculating the modified operand now, however, allows to also execute the calculation, as illustrated in FIG. 15, although intermediate results are reached that are larger than the maximally processable number, as will be illustrated based on a comparison of FIG. 17a and FIG. 17b.

Only as an example, FIGS. 17a and 17b show a calculation in which the two operands X equal to 95 and Y equal to 7 are to be modularly reduced with respect to the modulus N equal to 10. The maximally processable number of the calculating unit is N times Z. In other words, the calculating unit may thus process numbers between −99 and +99.

The simple sum of X+Y, however, already yields 102, wherein the number 102 is no longer processable and would result in an overflow managing routine and/or even in an error.

The modulus is subtracted from the second operand Y, so that a negative number −3 results from the number 7. The sum of −3 and 95 now yields the number 92, which is an easily processable number. The modular reduction of the number 92, however, yields the same result as the modular reduction of the number 102 which is no longer processable, so that the error introduced by the modulus subtraction step is again eliminated in the end due to the modular reduction.

At this point, it is further to be noted that the second operand Y=7 has already been the result of a previous modular reduction, that this value is thus already in the remainder class and thus actually should not be reduced and/or subjected to a subtraction of the modulus again. However, not executing the subtraction of the modulus from the second operand Y would result in, as in the comparative example, the calculating unit no longer being able to calculate the result of the sum of the first operand and the second operand with respect to the modulus.

As already mentioned, the calculating unit-efficient sum calculation as part of a modular multiplication is executed as illustrated in FIG. 1d. Specifically, the calculation for calculating the result of the sum of the first and the second operands with respect to a modulus represents the $MMA_Z$ operation for the second portion of operand $B_1$ and for the first portion $B_0$ of this operand, as also illustrated in the "correspondence" in FIG. 16. The result of the means 1512 for reducing the sum with respect to the modulus N obtained at the output 1500 of FIG. 15 thus corresponds to the value E+N in FIG. 7b, because the further subtraction of the modulus has already been executed in step 1508 by the reduction $Red'_Z$ (D; N).

The means 1508 of FIG. 15 thus corresponds to the functionality for calculating the value C of the second $MMA_Z$ step in FIG. 1d and/or the functionality of step $MMA'_Z$ in FIG. 7b, wherein $Red'_Z$ is executed to obtain the modified second operand E in FIG. 7b as the result of the second $MMA_Z$ step. Then, the sum of D is calculated in the last step $MMA_Z$ according to FIG. 7a to then perform the functionality $Red_Z$ D−N of FIG. 7a by the reduction in block 1512 of FIG. 15 to finally obtain the result C of the modular multiplication of FIG. 1d.

In the following, a preferred embedding and/or implementation of the preferred concept to keep intermediate results below the number to be maximally processed is discussed in connection with FIGS. 1a to 13c, which shows a preferred implementation of the modular multiplication with a calculating unit having registers shorter than the operand length.

FIG. 1a shows a schematic representation of an inventive device for calculating a result of a modular multiplication with a multiplier A, a multiplicand B and a modulus N. Originally, the multiplier A, the multiplicand B and the modulus are each numbers extending from a least significant digit (the LSB in the binary case) to a most significant digit (the MSB in the binary case). The operands A, B, N have a length less than or equal to a certain number of bits, such as 1536 bits in the scenario in block 46 described in FIG. 4d.

Each portion of the multiplicand B provided by means 10 for providing the portions has a length of 512 bits in the embodiment shown in FIG. 1b, i.e. a length equal to a third of the original length of the multiplicand B. Thus, all portions are equal in length. The number B may then be written as illustrated in FIG. 1b. The number Z represents the "register shift number" or the corresponding multiplier to be multi-plied to the second and/or, in squared form, to the third portion to recombine the number B from the portions $B_0$, $B_1$, $B_2$. i directly means the number of digits and/or the number of bits that a portion has. It is to be noted that the embodiment shown in FIG. 1b is exemplary for a uniform division of a number into three portions. According to the invention, however, there may also be generated more than three portions and preferably an odd number of portions, and there may also be generated portions having unequal lengths, i.e. that, for example, the first portion is somewhat shorter than a third and the second portion is somewhat longer than a third, etc. However, with respect to an optimum adaptation of the division into portions by the means 10 of FIG. 1a to the calculating unit, portions of equal length are preferred.

The portions of a number may thus represent the number directly, so that the portions directly have the digits of the number and yield the number when they are cut out, so to speak, and put together. Alternatively, and sometimes even preferably, the number is calculated from the portions using the division number Z, so that the portions represent the number here as well, but the representation is not done via directly putting them together, but via a calculation with the division number Z, as indicted in FIG. 1b at "generally".

The means 10 for providing the multiplicand in at least two portions thus receives the number B on the input side and provides the three or more portions $B_0$, $B_1$, $B_2$ on the output side, wherein each portion has a number of digits less than half the number of digits, and wherein the means 10 for providing is further selected to perform the portion division so that the generated portions together include all digits of the multiplicand.

The means 10 provides the portions to means 12 for sequentially calculating a sequence of steps. In particular, the means 12 for sequentially calculating a sequence of steps is designed to calculate a first intermediate result for the use of a more significant portion of the multiplicand, as illustrated at 14 in FIG. 1h. This first intermediate result is then used to calculate a second intermediate result also using a less significant portion $B_1$. This second intermediate result is then used to calculate a third intermediate result using again a less significant portion $B_0$ of the multiplicand. The third intermediate result may already be the result of the modular multiplication, if only three portions have been used for the multiplicand. The third intermediate result may then be further processed according to the procedure shown in FIG. 1h, if further portion divisions have been performed, to then finally obtain the final result of the modular multiplication.

Although, in preferred embodiments, the means 10 for providing is designed to provide not only the multiplicand, but also the multiplier and the modulus into individual portions, the embodiment shown in FIG. 1a, in which only one operand of the multiplication is divided, already results in an advantage in that no long register is required for the multiplicand itself, but that a short register is sufficient there, because the whole multiplicand is never required due to the sequential calculating nature of means 12, but always only a portion of the multiplicand.

For calculating units in bit slice architecture, however, a division into portions of all operands and the modulus is preferred, as discussed below, to only have to use registers that have the same (short) length. In this context, there is also preferred a division of all parameters of the modular multiplication into portions of the same length, because the best calculating unit utilization is achieved when (short) registers of the same length are used.

According to the invention, it is preferred that a calculating unit is used for performing the modular multiplication that has at least one register having a length less than a length of the multiplicand, but larger than or equal to a portion of the multiplicand, wherein the means for calculating is designed to sequentially load a portion of the multiplicand into the register or read it from the register.

In a further preferred embodiment, a division of the numbers into exactly three portions is performed, and a calculating unit is used that is operated in a short mode, i.e. which is divided into two calculating unit halves in which the three portions of the respective numbers are processed.

Figures 2A, 2B:
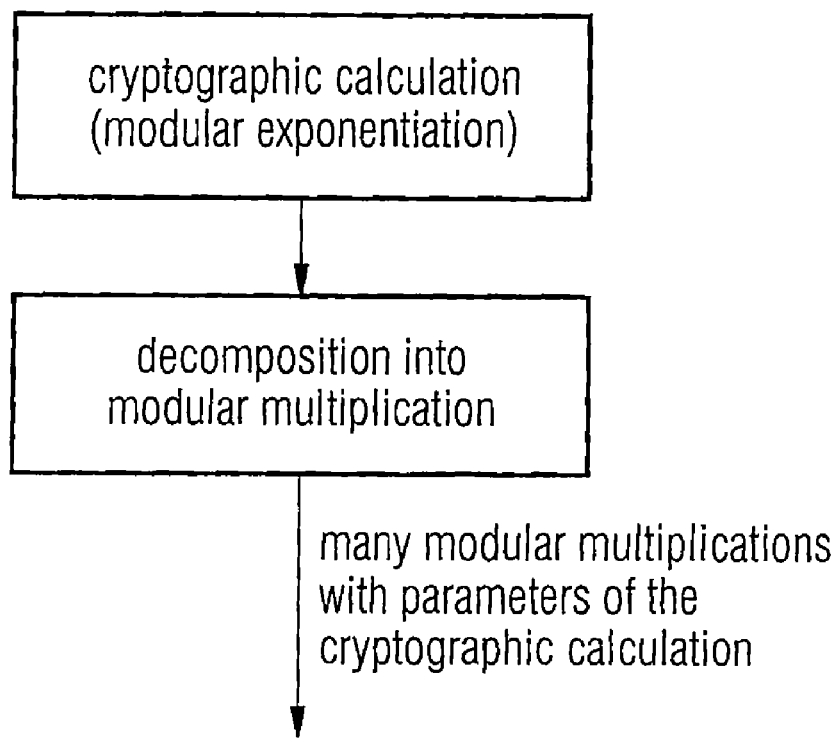
FIG. 2a shows a general representation of the field of application of the modular exponentiation.
FIG. 2b shows a schematic representation of the decomposition of a modular exponentiation into modular multiplications.

Subsequently, a preferred embodiment of the present invention is given in which a 2048 bit multiplication is implemented. First, however, an overview of certain used notations and operations is given. Essentially the following is about the calculation of the modular multiplication as illustrated in FIG. 2f.

$\#N$ is defined to be the bit length of N, i.e., if $n=\#N$, then $N \in [2^{n-1}, 2^n[$.

A mod N denotes the usual remainder of A modulo N, i.e. A mod $N \in [0, N[$.

A mod 'N denotes the negative remainder of A modulo N, i.e. A mod 'N $\in$ ]$-$N,0], i.e. A mod ' N=A mod N$-$N, if A mod N>0.

There will be used several notations for integers: Let $Z \geq 2$ be some integer, then there will be written for the integer $N \geq 0$ $$N=(N_2|N_1|N_0)_Z$$

wherein $$N_0 := N \bmod Z,$$

$$N_1 := (N \operatorname{div} Z) \bmod Z,$$

$$N_2 := N \operatorname{div} Z^2.$$

Although there may be used the notation $$N = N_2 \cdot Z^2 + N_1 \cdot Z + N_0 = (N_2, N_1, N_0)_Z$$

this latter notation does not imply that $N_1$ and $N_0$ are reduced modulo Z, while the first notation $(N_2|N_1|N_0)_Z$ does imply this: In this notation $N_1$ and $N_0$ are in $[0,Z[$. However, $N_2$ may be larger than Z, this is in the case of $N \geq Z^3$. Equivalently, $N_2$ may be negative in the case of N<0.

Furthermore the generalizations $(N_{m-1}|\ldots|N_0)_Z$ as well as $(N_{m-1}, \ldots, N_0)_Z$ are analogously used in the obvious way.

Think of Z as a power of two, e.g. $Z=2^{1024}$. But it is not necessary that Z is a power of two, neither any non-trivial power of an integer!

The following basic algorithms are fundamental and always used. Their implementation will be discussed later. Let $K \in N$.

The usual multiplication: A·B

The modular multiplication of bit length K: A·B mod N

The MultModDiv operation (FIG. 2g) of bit length K:

$$(A \cdot B \operatorname{div} N, A \cdot B \bmod N)$$

Furthermore there is needed the MultAdd algorithm (FIG. 2d):

$$A \cdot B + C \cdot 2^K$$

and the MultModAdd (FIG. 2e):

$$A \cdot B + C \cdot 2^K \bmod N$$

There is often written:

$$M_K(A,B) = A \cdot B,$$

$$MM_K(A,B;N) = A \cdot B \bmod N,$$

$$MMD_K(A,B;N) = (A \cdot B \operatorname{div} N, A \cdot B \bmod N).$$

The performance and/or speed of these algorithms, which is not classified any further at this point, depends on their implementation. So in the following it will be denoted by $m_K$, $mm_K$, $mmd_K$, etc.

Note that the index is used in a very free manner, sometimes, if the exact K is not important, the index is left out, sometimes K is replaced by the actual number base $2^K$. Even other bases are used. More about this in the following sections.

Remark 1: Note the very important fact that for $(Q,R) := MMD_K(A,B;N)$ there is the identity $$A \cdot B = Q \cdot N + R.$$

This is a fundamental fact for many implementations, which are following.

In this section there are given some hints as to how the basic algorithms are implemented in the Crypto@1408—if they can be implemented in a direct way. Furthermore there are discussed some very basic and general methods to break down long integer arithmetic into smaller pieces.

Multiplication

On the Crypto@1408, multiplications of a length up to 1400 bits (including sign bits) are possible, i.e. A·B for $\#A+\#B \leq 1400$. The average performance on the Crypto@1408 for this operation is given by $$\frac{\#B+1}{1,75} \text{ au.}$$

For more about this multiplication algorithm, see [5, 6, 8]. Usually, in order to break down a long multiplication into smaller pieces, the well-known high-school method is used: Set, for example, $Z := 2^k$ for some suitable k and write $A = (A_{m-1}, \ldots, A_0)_Z$ as well as $B = (B_{m-1}, \ldots, B_0)_Z$, then the method can be roughly described as it is shown in FIG. 2c.

The line in the loop will be read in the following way: The old value of the partial integer $(C_{i+j+1}, C_{i+j})_Z = C_{i+j+1} \cdot Z + C_{i+j}$ is added to the partial product $M_k(A_i, B_j)$ yielding the result X. Then set $C_{i+j+1} := X \operatorname{div} Z$ and $C_{i+j} := X \bmod Z$. Of course, hidden in these instructions are treatments of carries, which will not be discussed any further here.

There are faster ways to implement a multiplication, e.g. with KARATSUBA-OFFMANN, cf. [9]. But, although these algorithms are very good in theoretical performance, they often have the disadvantage that they are not optimal for implementation, e.g. they need very much resources like memory.

Modular Multiplication

On the Crypto@1408, modular multiplications of a length up to 1400 bits are possible, i.e. A·B mod N for $LR := \#N + 1 \leq 1400$. The realization is done via the so-called ZDN algorithm-[11]. The average performance on the Crypto@1408 for this operation is given by $$\frac{LR}{\alpha} \text{ au}$$

The factor $\alpha = \alpha_{LR}$ is a parameter which depends on the statistical properties of the ZDN algorithm. For $\alpha_{LR}$, values are usually between 2.5 and 2.7.

One way to implement the multiplication for longer bit lengths is to break it down into smaller pieces. Looking at the equation for m=3

$$A \cdot B \bmod N = A(B_2 Z^2 + B_1 Z + B_0) \bmod N$$
$$= (((A \cdot B_2 \bmod N)Z + A \cdot B_1 \bmod N)Z + A \cdot B_0) \bmod N$$

it can be see that a modular multiplication $A \cdot B \bmod N$ can be realized as in FIG. 1d, wherein operation MMA is shown in FIG. 1e.

Of course, this is only one way to do this. Some derived versions of this are presented in this paper.

The MultModDiv Operation

Figure 10A:
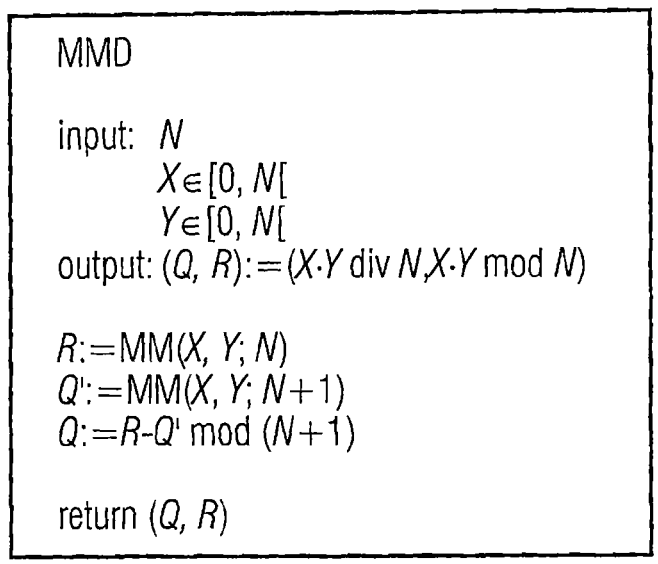
FIG. 10a shows a representation of the MMD operation.

The MultModDiv operation is a recently introduced operation, cf. [7], which does a little bit more than a modular multiplication: It not only computes the modular product (A·B mod N), but also the quotient (A·B div N). Implemented in HW, the additional implementation overhead is small, since this last integer is just a protocol of what the modular reduction was doing during the modular multiplication. In SW the overhead is significant, but surprisingly only 100%! The algorithm can be implemented as shown in FIG. 10a.

Note that this algorithm only works for positive and reduced A and B. It will be needed later on also for a (reduced) negative multiplicand, but in this case only the negative integer is inverted, the latter algorithm is applied and finally the output is inverted. Also, it is possible to run the two modular multiplications in parallel (mode) if the modulus is small enough. This means again a doubling of the performance. More about this later with respect to FIGS. 11a and 11b. As one can see there, the performance for $MMD_k$ is given by:

$$mmd_k := \begin{cases} mm_k & \text{if } LR \leq 695 \\ 2 \cdot mm_k & \text{if } LR > 695 \end{cases}$$

In the algorithm representations, according to usual pseudo code notation, the term "input" stands for the algorithm input parameters. The term "output" stands for the algorithm output. The term "return" stands for jumping back and/or giving back the corresponding value to a hierarchically higher program that invoked the algorithm. The argument of "return" is thus the actual result of the algorithm that has been calculated. Furthermore, "for" stands for a repetition loop that is to execute something given by the term "do" starting from a start parameter "to" to an end parameter. "end" stands for the end of a loop.

Furthermore, "if" stands for a conditional loop, wherein "when" indicates what to do if the condition of the if loop is fulfilled. Correspondingly, "else if" indicates a further condition that has to be fulfilled instead of a first condition to perform a certain calculation introduced by "then". The term "treat carry" stands for treating a carry, wherein borrow stands for a negative carry, i.e. so to speak a "carry forward".

In the following, there are further given some register implementations, such as they are to be seen, for example, in FIG. 6b. Under "Crypto@1408", the registers of the preferably used crypto co-processor with 1408 bit slices can be found, which are, however, operated in the short mode due to the division in the middle. The register notation in all register implementations is as illustrated in FIG. 4a in the right sub-image. For example, the second field in the right column stands for the register $CR_0$ of the processor. Furthermore, the numbers in the fields stand for the corresponding values stored into the corresponding register. If there are "asterisks" in a register, this means that the register is unused, i.e. the register may be occupied with undetermined numbers, which, however, do not play any further role. Furthermore, the vertical column of fields described with "XDATA" stands for an external memory, i.e. refers to a RAM working memory of the processor, while the twelve registers are the internal registers of the memory. Thus, if data are to be loaded from the external RAM memory into the registers of the co-processor, data movement commands (move commands) are necessary.

Register Architecture of Crypto@1408

The following will illustrate the implementations of the algorithms with the assignments of the Crypto registers with the intermediate results. There is shown the Crypto@1408 in the two modes, namely the long mode and the parallel mode (FIG. 4a).

In long mode, there are 5 registers of a length of 1.408 bits: Z, C, N, $CR_0$ and $CR_4$.

In parallel mode, there are 10 registers of a length of 704 bits: $CR_0$, $CR_2$, $CR_4$ and $CR_6$, as well as three registers Z, C, N for each side.

The basic configurations are illustrated as shown in FIG. 4a:

Moving Data

Depending on the fact that the data may lie in the cache or in the XRAM (external memory), it can take more or less time to move an integer into or out of the Crypto@xxxx. The following assumes an average value for the performance $mov_k$ to move a k-bit integer into or out of the Crypto. Some examples show that the moves take a significant time comparable to multiplications.

The Modular Multiplication Algorithms

There are several algorithms for implementing a modular multiplication on the basis of simpler elements like (small) multiplications or a smaller modular multiplication. By virtue of these algorithms, it is possible to implement a modular exponentiation by "square and multiply" or Lucas-chain methods (Montgomery ladder). We are not going the way of finding optimal performance algorithms for square and multiply respectively, since this eliminates the possibility of a secure implementation of RSA if needed.

Although what is of interest is actually the algorithm $MM_{2048}$, it can be seen that A·B mod N=A($B_2 Z^2 + B_1 Z + B_0$) mod N, or equivalently this expression can be written as ((A·$B_2$ mod N)Z+A·$B_1$ mod N)Z+A·$B_0$ mod N. Therefore, the implementation of $MM_K$ may sometimes be broken down to some "smaller" algorithms like $MMA_k$, for some k<K.

Although sometimes these algorithms need additional data (hence some precomputations may be necessary), this is not taken into account and they are not counted. Usually, they have no impact on the performance of the full RSA computation. They may, however, have an impact on the performance of a "short" RSA, like a verification with a small exponent $F_4 = 2^{16} + 1$.

Montgomery Multiplication

Without doubt, the most famous algorithm for implementing a modular multiplication is the Montgomery Multiplication [10]. This multiplications algorithm actually does not implement the algorithm $MM_K(A,B;N)$=AB mod N, but rather $A \cdot B \cdot 2^{-K} \bmod N$ Without going into detail, with this strange kind of modified multiplication, it is possible to implement a K-bit-RSA calculation with the same number of multiplications as in the usual implementations which use $MM_K$.

Multiplication with Barrett Reduction

At the moment, a discussion about this method is left out, since usually Barrett reduction has the same performance as the last method. It is not expected that in this context there will be a much better implementation than the one in the last section.

Fischer-Sedlak-Seifert's Algorithm with MMD

This algorithm was designed in order to make a 1 k-bit RSA co-processor fit for 2 k-bit operations needing only a minor hardware add-on. The algorithm, described in [7,2], is specifically used for doubling the bit length. It uses the MultModDiv algorithm, which has to be built into the hardware, cf. [4], or may be emulated in software, cf. [3], with two modular multiplications.

Preferred Inventive Algorithm with MMD

This algorithm implements the modular multiplication in the classical way, by computing $$A \cdot B \bmod N \text{ via } A \cdot B - \left\lfloor \frac{A \cdot B}{N} \right\rfloor \cdot N$$

However, because of practical reasons and architectural restrictions, this will be done in three steps—as described above—by implementing for $K = m \cdot k$ with $m=3$ and $k=\lceil K/3 \rceil$. Thus, $MM_K$ will be implemented as in FIG. 1d.

Now, $MMA_Z$ is the algorithm given (FIG. 1e).

$N_2$ will be very close to Z. However, at the moment, there are no restrictions with respect to the integer Z, except that Z has to have about the correct size of k bits. But more about that later.

Figures 1F, 1G, 1H:
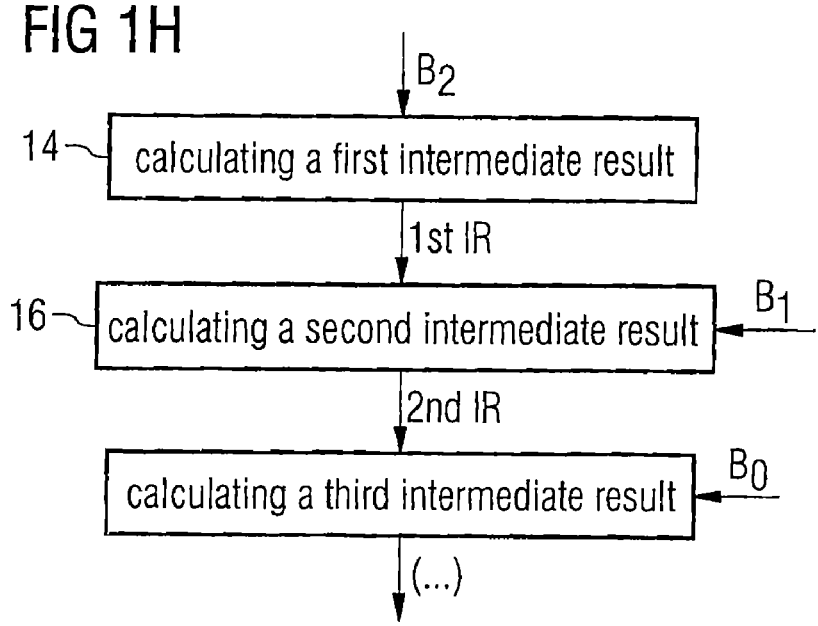
FIG. 1f shows a schematic representation of the multiplication with addition.
FIG. 1g shows a schematic representation of the reduction operation.
FIG. 1h shows a schematic representation of the sequential calculation of the intermediate results.

Again, this last algorithm will be implemented in two steps, namely: First the multiplication shown in FIG. 1f is performed.

Note the following estimation.

Remark 5: For the output of $MA_Z$ $$D = AB_i + CZ \quad (1)$$
$$\in [0, N-1] \cdot [0, Z-1] + [-N, 0] \cdot Z$$
$$\in [0, NZ - N - Z + 1] + [-NZ, 0]$$
$$= [-NZ, NZ - N - Z + 1]$$
$$\subseteq [-NZ, NZ[$$

and in particular for $D = (D_3 | \ldots | D_0)_Z$ $$D_3 = D \text{ div } Z^3$$
$$\in [-N_2 - 1, N_2]$$
$$\subseteq [-Z, Z[.$$

After the multiplication step, there is the reduction of FIG. 1g.

In the following, there is first of all presented the mathematical description of $MA_Z$ and $Red_Z$ with a little theory, which will be important for the implementation.

Description of the Algorithm

From now on, any algorithms will be given for the case of $m=3$. Because this is the case needed. However, k will not be fixed yet.

The multiplication operation $MA_Z$ (FIG. 3a), i.e., $$(A_2 | A_1 | A_0)_Z \cdot B_i + (C_2 | C_1 | C_0)_Z \cdot Z$$

or equivalently $$(A_2 | A_1 | A_0)_Z \cdot B_i + (C_2 | C_1 | C_0 | 0)_Z$$

will be implemented in the straightforward way:

$$AB_i + CZ = A_0 B_i + (A_1 B_i + C_0) Z + (A_2 B_i + C_1) Z^2 +$$
$$(A_2 B_i + C_2) Z^3 + C_3 Z^3$$

Since $A_j \cdot B_i$ is a 2 k integer, this product is written as $$A_j \cdot B_i = (BA_{ij})_1 \cdot Z + (BA_{ij})_0$$

and therefore the result is $$(BA_{i0})_0 + ((BA_{i0})_1 + (BA_{i1})_0 + C_0) Z +$$
$$((BA_{i1})_1 + (BA_{i2})_0 + C_1) Z^2 + ((BA_{i2})_1 + C_2) Z^3$$

Note that the large brackets still may be $\geq Z$!

The reduction operation $Red_Z$ (FIG. 3b), i.e. $E := D \bmod N$ will be implemented as $$E := D - [D \text{ div } N] \cdot N.$$

Here, $$[D \text{ div } N] := \left\lfloor \frac{D}{N} \right\rfloor.$$

However, since $Q_0 := D \text{ div } N$ cannot be computed directly, the strategy is to first approximate $Q_0$ by $\tilde{Q}_0$, wherein $$\tilde{Q}_0 := D_3 \cdot Z \text{ div } N_2.$$

Hence, $Q_0 = \tilde{Q}_0 + \epsilon$ can be written. A computation shows that $\epsilon \in \{-2, -1, \ldots, 4\}$, and in this context it will even be $$\epsilon \in \{-2, -1, 0, 1, 2, 3\}.$$

Remark 6: In fact, $\epsilon = -2, 3$ will almost never happen and $\epsilon = 2$ only very seldom.

Thus, the first version of the plain (base) algorithm of FIG. 3b will be as in FIG. 3c.

Remark 7: The range of $Q_0$ is given by:

$$Q_0 = \left\lfloor \frac{D}{N} \right\rfloor$$
$$\in \left[ \left\lfloor \frac{-NZ}{N} \right\rfloor, \left\lfloor \frac{NZ-1}{N} \right\rfloor \right]$$
$$= [-Z, Z[$$

Unfortunately, the problem of the exact computation of the division $$\frac{D}{N}$$

was only postponed. But since this worked very well, it will be done a second time: $\epsilon$ is approximated by $\tilde{\epsilon}$ such that $$\delta := \epsilon - \tilde{\epsilon} \in \{-1, 0, 1\}. \quad (2)$$

Then the reduction looks like in FIG. 3d.

Now, how is $\epsilon$ approximated? Look at the following equation:

$$(D - \tilde{Q}_0 N) \bmod N = D \bmod N$$
$$= (D - \tilde{Q}_0 N) - \varepsilon N$$

This yields $$\epsilon = (D - \tilde{Q}_0 N) \operatorname{div} N,$$

and therefore $D - \tilde{Q}_0 N$ is computed: Set $$\tilde{Q}_0 := D_3 Z \operatorname{div} N_2 \text{ and } \tilde{R}_0 := D_3 Z \bmod N_2,$$

so that $D_3 Z = \tilde{Q}_0 N_2 + \tilde{R}_0$. Now $$D - \tilde{Q}_0 N = (D_2 + \tilde{R}_0 - (\tilde{Q}_0 N_1)_1) Z^2 +$$
$$(D_1 - (\tilde{Q}_0 N_1)_0 - (\tilde{Q}_0 N_0)_1) Z +$$
$$(D_0 - (\tilde{Q}_0 N_0)_0)$$

Here, the notation $(\tilde{Q}_0 N_i)_1 := \tilde{Q}_0 N_i \operatorname{div} Z$ and $(\tilde{Q}_0 N_i)_0 := \tilde{Q}_0 N_i \bmod Z$ was used, so that $\tilde{Q}_0 N_i = (\tilde{Q}_0 N_i)_1 Z + (\tilde{Q}_0 N_i)_0$. From all this, there may now be given an approximation for $\epsilon$ by computing $$\tilde{\epsilon} := (D_2 + \tilde{R}_0 - (\tilde{Q}_0 N_1)_1) \operatorname{div} N_2.$$

In fact, the operands are approximated by their uppermost (say, for example) 16 bits. There still remains the work of proving that $$\delta := \epsilon - \tilde{\epsilon} \in \{-1, 0, 1\}.$$

This will be done later. Now, it is possible to give the following version of $\text{Red}_Z$ shown in FIG. 3e.

Observe the following computation:

$$D - \tilde{Q}_0 N - \tilde{\varepsilon} N = (D_2 + \tilde{R}_0 - (\tilde{Q}_0 N_1)_1 - \tilde{\varepsilon} N_2) Z^2 +$$
$$(D_1 - (\tilde{Q}_0 N_1)_0 - (\tilde{Q}_0 N_c)_1 - \tilde{\varepsilon} N_1) Z +$$
$$(D_0 - (\tilde{Q}_0 N_0) - \tilde{\varepsilon} N_0)$$
$$= (D_2 + \tilde{R}_0 - (Q'_0 N_1)_1 - \tilde{\varepsilon} N_2) Z^2 +$$
$$(D_1 - (Q'_0 N_1)_0 - (Q'_0 N_c)_1) Z +$$
$$(D_0 - (Q'_0 N_0)_0)$$

By virtue of this computation, the final version of the algorithm may be given, as shown in FIG. 3f.

Remark 8: Note the slight difference in the first lines: $(\tilde{Q}_0, \tilde{R}_0) := \text{MMD}(D_3, Z; N_2)$ was replaced by $$(\tilde{Q}_0, \tilde{R}_0) := \text{MMD}(D_3, Z - N_2; N_2)$$
$$Q_0 := Q_0 + D_3$$

First of all, it is easy to check that this new equation still holds! This change was done because it is not desired that operands are larger than the modulus, and in this case $Z > N$. However, since $$N \in \left[\frac{2}{3} Z^3, Z^3\right[$$

or more precisely $$N_2 \in \left[\frac{2}{3} Z, Z\right[,$$

it is certain that $$Z - N_2 \in \left[0, \frac{1}{3} N_2\right[.$$

However, because of equation 1, the first operand is within $[-Z, Z[$, but it will be seen that this is no problem, since $$D_3 \cdot (Z - N_2) \in [-Z, Z[ \cdot \left[0, \frac{1}{3} N_2\right[$$
$$= \left] -\frac{1}{3} Z N_2, \frac{1}{3} Z N_2 \right[$$
$$\subseteq \left] -N_2^2, N_2^2 \right[$$

Furthermore, note the following:
Remark 9: Because of remark 7 and equation (2), $$Q_0' \in [-Z-1, Z]. \tag{3}$$

Mathematical Performance

For the first part $\text{MA}_k$, there are needed 3 $\text{mmd}_k$, for the second part $\text{Red}_k$, there are also needed 3 $\text{mmd}_k$. Since this computation has to be done 3 times, the result is $$mm_K = 18 \cdot mmd_k.$$

Implementation for $(m, k) = (3, k)$

The implementation of the algorithm is shown starting from FIG. 5.

System Performance for $(m, k) = (3, k)$

It can be seen that the implementation of algorithm $\text{MA}_k$ needs $3 \text{ mmd}_k + \text{mov}_k$ and the implementation of $\text{Red}_k$ needs $3 \text{ mmd}_k$. This will be used three times and thereafter the result has to be moved outside of the Crypto, so that the performance will be: $3(6 \text{ mmd}_k + \text{mov}_k) + \text{mov}_K$, i.e. $mm_K = 18 \cdot \text{mmd}_k + 6 \cdot \text{mov}_k$ The Range of $\epsilon$ The parameter $\epsilon$ was defined to be $$\varepsilon = Q_0 - \tilde{Q}_0 = \left\lfloor \frac{D}{N} \right\rfloor - \left\lfloor \frac{D_3 Z}{N_2} \right\rfloor,$$

wherein $D \in [-NZ, NZ[$, in particular $D_3 \in [-Z, Z[$. In order to give an estimation of $\epsilon$, first the real number $$e := \frac{D}{N} - \frac{D_3 Z}{N_2}$$

is computed and then the following lemma is used.

Lemma 1 For r, s∈R, there is always $$\lfloor r \rfloor - \lfloor s \rfloor = \begin{cases} \lfloor r-s \rfloor \\ \lfloor r-s \rfloor + 1 \end{cases}$$

Now set $$e := \frac{D}{N} - \frac{D_3 Z}{N_2}$$

and get $$e = \frac{D}{N} - \frac{D_3 Z}{N_2}$$
$$= \frac{1}{NN_2}[DN_2 - D_3 ZN]$$
$$= \frac{1}{NN_2}[(D_3|D_2|D_1|D_0)_Z N_2 - D_3 Z(N_2|N_1|N_0)_Z]$$
$$= \frac{1}{NN_2}[(D_2|D_1|D_0)_Z N_2 - D_3 Z(N_1|N_0)_Z]$$

hence $$e \in \frac{1}{NN_2}([0, Z^3[\cdot N_2 - [-(N_2+1), N_2]Z[0, Z^2[)$$
$$= \frac{1}{NN_2}] - Z^3 N_2, 2 \cdot Z^3 N_2 + Z^2[$$
$$= ]\frac{-Z^3}{N}, \frac{2 \cdot Z^3}{N} + \frac{Z^2}{NN_2}[$$
$$\subseteq ]\frac{-3}{2}, \frac{6}{2} + 2^{-2k}[=]\frac{-3}{2}, 3 + 2^{-2k}[$$

Therefore, there is obtained $\lfloor e \rfloor \in \{-2, \ldots, 3\}$ and by virtue of the lemma $\epsilon \in \{-2, \ldots, 4\}$. Nevertheless, assuming $$N \in [\frac{3}{4}Z^3, Z^3[$$

then $$e \in ]\frac{-4}{3}, \frac{8}{3} + 2^{-2k}[=]\frac{-4}{3}, 3[$$

So it can be seen that in this case $\lfloor e \rfloor \in \{-2,-1, 0, 1, 2\}$ and $\epsilon \in \{-2, -1, 0, 1, 2, 3\}$.

How to Estimate ϵ

It could be seen that $\epsilon = aZ^2 + bZ + c$, wherein $a=(D_2+\tilde{R}_0-(\tilde{Q}_0 N_1)_1)$, $b=(D_1-(\tilde{Q}_0 N_1)_0-(\tilde{Q}_0 N_0)_1)$, $c=(D_0-(\tilde{Q}_0 N_0)_0)$, and $\tilde{\epsilon} := a$ div $N_2$ was defined. Now set:

$$r = \frac{aZ^2 + bZ + c}{N}$$
$$s = \frac{a}{N_2}.$$

Then $$x := r - s = \frac{1}{NN_2}(N_2(bZ+c) - (N_1|N_0)a)$$

Obviously $$-4Z < a < 3Z$$
$$-5Z < b < Z$$
$$-Z < c < Z$$

Then $$x < \frac{(N_2(Z^2+Z) + 4Z^3)}{NN_2} < \frac{6Z^3}{\frac{Z^3}{2} \frac{Z}{2}} = \frac{24}{Z}$$

as well as $$x > \frac{-(N_2(5Z^2+Z) + Z^2 3Z)}{NN_2} > \frac{9Z^3}{\frac{Z^3}{2} \frac{Z}{2}} = \frac{-36}{Z}$$

It can be seen that x=r−s is indeed very small, since Z will be in the range of $2^{700}$! So, practically, there will never be the case that $\epsilon \neq \tilde{\epsilon}$ (for general integers).

The actual approximation will be done by computing s using only the uppermost (e.g.) 16 bits of the involved integers, therefore there will be made an error of about the size $2^{-16}$. This is still very small, and only in a few cases the estimation of $\tilde{\epsilon}$ will be incorrect by 1. And this is the reason why a final reduction step is needed at the end of Red.

Analysis of the Algorithm

In this section, the three algorithms described in the previous sections are compared. These multiplication methods are denoted as Algorithm I, Algorithm II and Algorithm III, respectively.

Comparison of the Algorithms

Performance values—only for the time-consuming parts of the algorithms—are given in FIG. 4e. Of course, a real implementation will need about 10%-20% longer for all the software overhead, which is not described here.

Advantages/Disadvantages

Below 2.064 bits, the fastest multiplication is Algorithm III.

Above 2.065 bits, the only working algorithm is Algorithm II.

Algorithm III needs the fewest external memory.

Implementation Aspects

In this section, the 2.048-bit RSA implementation on the Crypto@1408/SLE88 will be described in detail. Of course, the main focus is on the implementation of the modular multiplication. It is clear how to set the multiplication in the framework of an exponentiation. So this will be described only very briefly. The modular multiplication A·B mod N presented here has a certain restriction: The integers A, B and N have to be transformed into a special form, namely it has brought from the binary form into the Z-ary form, e.g. $(A_2, A_1, A_0)_Z$ with three "digits". A and B, of course, have to be reduced. The precomputation will first decide the length k of the base parameter Z, transform the input values A, B and N into the right form, such that it is usable for the modular multiplication algorithm. Here, A and B will be just brought from the binary form into the Z-ary. The modulus N will be—as it is known for the usual implementation of RSA on the Crypto@xxxx—multiplied by a certain integer, and the exponentiation will be performed with this multiple of N. After the exponentiation, it is necessary to make the final reduction modulo the original N. And the result in Z-ary form is computed back into the old binary form.

It is superfluous to say that, with the pre- and post-computation, this algorithm is not well-suited for a single modular multiplication, although it is possible to do it. On the other hand, all other multiplication algorithms, e.g. the ones presented here, usually need some kind of pre- and post-computation, and in fact there is no really better way to do a simple modular multiplication.

Structure of the RSA Implementation

The framework of the RAS implementation is equal to any other implementation. First, there is the pre-computation, transforming the input parameters baseB* and modulus N* into the right form B and N. Then, the actual RSA implementation starts: It will be decided whether a squaring or the multiplication with the base will be done. Due to this decision, either the operation A←MM(A, A, N) or A←MM(A, B, N) will be carried out. There will be no description how to make this decision—this is standard for an RSA implementation. At the end, in post-computation, the result A will be reduced modulo the input modulus N* and transformed back into the binary form necessary for the output.

The following will describe the implementation of A←MM(A, B, N). For the squaring, i.e. A←MM(A, A, N), one can use A for the parameter B. It can even have the same allocated memory, since the result will be copied into the container of A at the very end.

Note that the exponentiation/modular multiplication only needs external memory for $A_2, A_1, A_0, B_2, B_1, B_0, N_1$ and $N_0$, i.e. maximally $$8 \cdot \frac{704}{8} = 704 \text{ bytes.}$$

An overview of the algorithm is given in FIG. 5.

FIG. 5 thus shows, so to speak, a flow diagram of the inventive modular multiplication algorithm for three portions. The processing direction and/or time direction is illustrated by an arrow 50 in FIG. 5. In order to perform modular multiplication, there are thus shown, as illustrated for example with respect to FIG. 1d, three MMA operations to be performed consecutively, which are designated 51, 52 and 53 in FIG. 5. The most significant portion $B_2$ of the multiplicand is used for the MMA operation 51. For the second MMA operation 52, the result of the first MMA operation and the next less significant portion $B_1$ of the multiplicand are used. The result of the second MMA operation is finally used together with the least significant portion $B_0$ of the multiplicand to obtain the final result of the modular multiplication. Next, the result is read out from the internal registers, i.e. $E_2$, $E_1$ and $E_0$, by means of a move command 54, to free the internal registers for a new modular multiplication.

Each MMA operation, for example the MMA operation 51, is divided into an MA operation 55a and a reduction operation 55b, wherein the MA operation, in turn, is again divided into various operations illustrated in FIG. 5, while the reduction operation is also divided correspondingly.

The Modular Multiplication Algorithm

The input for this modular multiplication is the modulus N, the multiplicand A∈[0, N[ and the multiplier B∈[0, N[. Formally, there is an input parameter k defining the length of the computation. The output will be A·B mod N stored in the place of A residing in the external memory.

The entry conditions for this algorithm already discussed above are

N is encoded in three integers $N_2$, $N_1$ and $N_0$, such that $N_i \in [0, Z[$ and $N = N_2 \cdot Z^2 + N_1 \cdot Z + N_0$, shortly written as $N = (N_2, N_1, N_0)_Z$.

Furthermore, $N_2 \in [0, Z[$, such that $N_2$ is transformed according to the Crypto@xxxx architecture.

A is encoded as three integers $A_2$, $A_1$ and $A_0$, such that $A_i \in [0, Z[$ and $A = A_2 \cdot Z^2 + A_1 \cdot Z + A_0$, shortly written as $A = (A_2, A_1, A_0)_Z$.

B is encoded in three integers $B_2$, $B_1$ and $B_0$, such that $B_i \in [0, Z[$ and $B = B_2 \cdot Z^2 + B_1 \cdot Z + B_0$, shortly written as $B = (B_2, B_1, B_0)_Z$.

The modular multiplication algorithm is shown in FIG. 6a. It is illustrated in FIG. 6b.

In the external memory XDATA, there are respectively the portions of the multiplier A and the multiplicand B and the least significant and the next more significant portion $N_1$ and $N_0$, while the most significant portion $N_2$ of the modulus is already in the $CR_6$ register of the crypto co-processor operated in the short mode. The other three registers $CR_4$, $CR_2$ and $CR_0$ are set to zero. The intermediate result of the first MMA' operation, i.e. $E_1'$, $E_2'$, $E_0'$, then replaces the zeros in the corresponding registers prior to the first MMA' step. The second MMA' step results in replacing the values $E_0'$, $E_1'$ and $E_2'$ by $E_0''$, $E_1''$ and $E_2''$. By means of the next MMA operation, there is again replacing, so that after the third MMA operation the final result of the modular multiplication is present in the form of the lowest portion $E_0$, the next higher portion $E_1$ and the highest portion $E_2$. This result E is thus obtained by the algorithm in FIG. 6a, specifically also portion-wise.

The result portions $E_2$, $E_1$ and $E_0$ replace $A_2$, $A_1$ and $A_0$ in the working memory, so that the result of a previous modular multiplication step now provides the new multiplier A for the next modular multiplication step, which will again be performed in the same way, wherein now, however, the original operand A is replaced by the newly calculated operand E.

In this algorithm, besides the already known MMA algorithm, a variation of it, namely MMA' is used. Roughly, the difference between the two algorithms is given in the formula MMA'=MMA−N. They are defined as shown in FIGS. 7a and 7b.

Figures 7C, 8A:
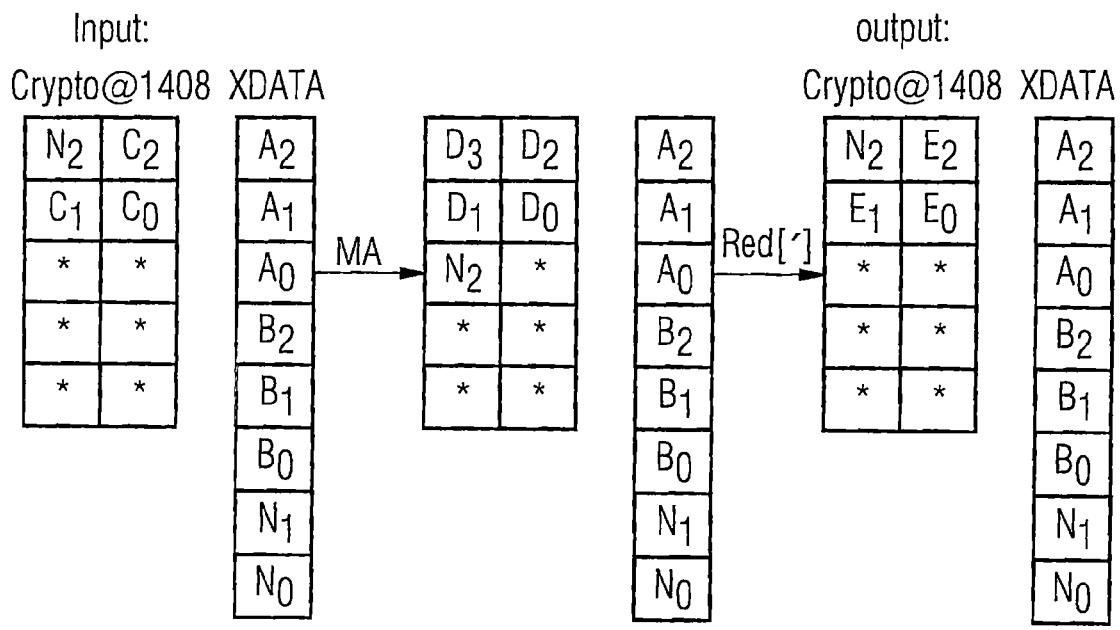
FIG. 7c shows a register implementation of the MMA operation.
FIG. 8a shows a preferred implementation of the MMA operation.

The register implementation is illustrated in FIG. 7c.

Both variations use the algorithms $MA_Z$ and $Red_Z$, wherein the last one again has two variants, namely $Red_Z$ itself and $Red'_Z$. Roughly, the difference between the two algorithms is given in the formula Red'=Red−N.

First the algorithm $MA_Z$ will be discussed. The algorithm is illustrated in FIG. 8a.

Figure 8B:
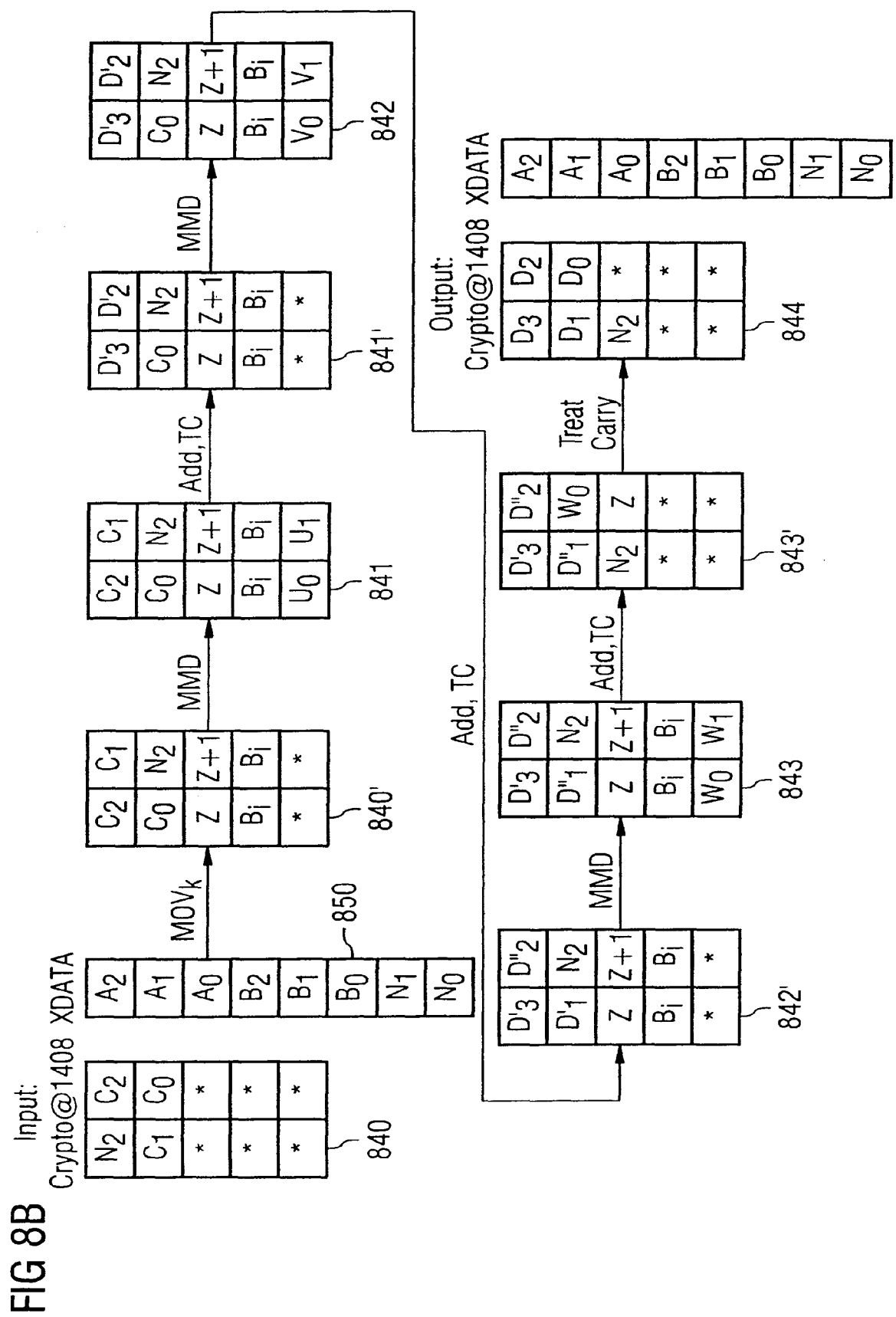
Figure 8D:
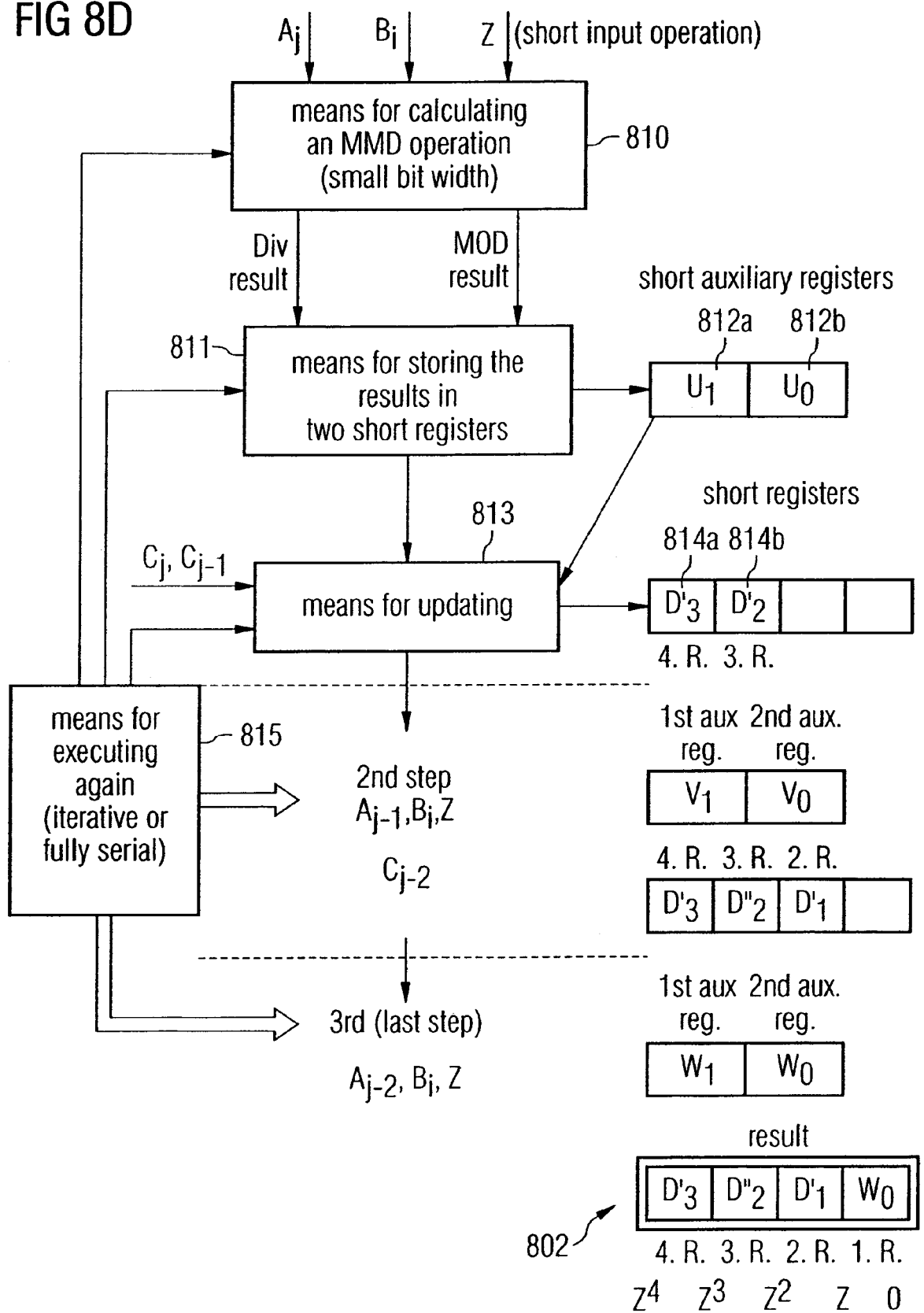
FIG. 8d shows a schematic block circuit diagram of the method and the device of the present invention.

The register implementation of the algorithm of FIG. 8a is illustrated in FIG. 8b. A preferred implementation of the inventive concept illustrated algorithmically in FIG. 8a is shown in FIG. 8d, wherein the register movements referred to in FIG. 8d are summarized in FIG. 8c, and wherein FIG. 8e gives an example of the inventive multiplication addition algorithm and the use of the two auxiliary registers and the four result registers. Before discussing the algorithm in detail, the meaning of the term "short register length" and "long number length" is first illustrated with respect to FIG. 8c. For this, a register block 800 is illustrated, which includes nine registers only for reasons of clarity. Each register of these nine registers has a certain number length and/or a number of binary digits and may thus store maximally one portion $A_i$, $B_i$, $C_i$ of the operand A, the operand B and the operand C. In the example shown here, each operand is divided into three portions. The index i thus has the values 0, 1, 2.

Considering each register for itself, each register has a number between zero and $2^{k-1}$. If, however, the least significant bit of a register is given a certain initial significance (and/or valency) per convention, which is common in calculating unit technology, a large register may, so to speak, be imitated by correspondingly interpreting the numbers in registers from these small registers. Equally, a row of the register block at 800 in FIG. 8c could include a single large register having a length equal to three times a short register length. In this case, the middle short register, in which there is stored $A_1$ or $B_1$ or $C_1$, would have to be given, for example, an initial significance of $2^k$ and/or generally speaking an initial significance of a number Z (the fourth operand), while the initial significance of the corresponding least significant register, in which there is stored $A_0$, $B_0$, $C_0$, would be $2^0$. Correspondingly, the initial significance of a register in which there is stored $A_2$, $B_2$ or $C_2$ would be $2^{2k}$ or $Z^2$.

Corresponding conventions also apply to the individual output or result registers 802. They are again four registers with short register length in which there is respectively stored a portion $D_0$, $D_1$, $D_2$ or $D_3$ of the result value, wherein, depending on the position and/or identification of a short register, there is an initial significance of $2^0$, Z, $Z^2$ or $Z^3$, which has to be given to register content when the total (absolute) number and not only a number within a register is important.

At 804, there is shown an example of a multiplication addition operation, i.e. an operation between a first operand A, a second operand $B_i$, a third operand C and a fourth operand Z, wherein the first operand A and the third operand C are longer than the second operand $B_i$ or the fourth operand Z, and wherein portions of the first operand A or the third operand C are shorter than the first operand or the third operand per se. In the individual result registers 802a, 802b, 802c, 802d, there are stored iteratively calculated results, wherein updated MOD and/or DIV results of 3 MMD operations are stored in the registers 802a to 802c, and wherein the MOD result of the last (third) MMD operation is stored in the least significant short register 802d.

It is to be noted that any number of iterations may be used, i.e. that the long operands do not necessarily have to be divided into three portions, but may also be divided into two portions or into more than three portions, such as four or five portions. The number of iterations would then increase correspondingly. The number of auxiliary registers, however, will not increase. The number of required result registers would, however, increase according to the number of portions (+1). Still, an embodiment will be discussed below in which the long operands are divided into three portions of the same length, although the division of equal length is not necessarily required either. Although it results in a regular and well-manageable value situation of the initial significances of the individual registers, it is not necessarily a precondition. If portions of unequal length are selected, the initial significances of the individual short registers are set correspondingly, so that the "combining" of the result number from the individual portions is done correctly.

FIG. 8d illustrates the inventive concept with respect to a device and/or a method for calculating the result 802 by a multiplication addition operation 804 between a first operand A, a second operand $B_i$, a third operand C and a fourth operand Z, wherein the first and the third operands are longer than the second or the fourth operands, and wherein portions of the first or third operands are shorter than the fourth operand, i.e. they are, so to speak, the number indicating the initial significance.

The inventive device includes means 810 for calculating results of an MMD operation using the second operand, a more significant portion $A_2$ of the first operand and the fourth operand as modulus. These results include a DIV result providing the integer quotient of the operation, and an MOD result yielding the remainder of the integer division. These two results are provided to means 811 for storing the results, as shown in FIG. 8d. The means 811 is designed to store the results in the form of $U_1$ and $U_0$ in two short auxiliary registers 812a, 812b. The values stored in the short auxiliary registers, i.e. the results of the first MMD operation, are then provided to means 813 for updating the DIV result and the MOD result, wherein the update is performed using an addition of portions of the third operand. This update thus takes into account the addition term of the multiplication addition operation, as shown at 804 in FIG. 8c. The means 813 for updating is further designed to store updated results in a fourth result register 814a and a third results register 814b. The memory contents of the result register 814a are designated $D_3'$, while the portion of the result in the third result register is designated $D_2'$.

Depending on the appearance of the portions of the third operand C, the update in means 813 for updating results in a change of the supplied DIV result or the supplied MOD result or not. If the whole situation of the third operand is, for example, so that the DIV result or the MOD result of the first MMD operation is not changed, the corresponding value $U_1$ or $U_0$ in the auxiliary register 812a, 812b may be entered directly into a result register 814a, 814b. In this case, "updating" thus means that there has been no change of the result of the MMD operation. If, however, the third operand is such that the results of the MMD operation executed at 810 are changed, this results in a change of the auxiliary register values and in the changed auxiliary registers values being fed into corresponding result registers, such as 814a, 814b.

The present invention further includes means 815 for executing the MMD operation and the update again using another portion of the first operand, until all portions of the first operand are processed. The registers in which updated results are stored, and a register in which an MOD result of a last MMD operation is stored, then together provide the result of the multiplication addition operation according to the initial significance associated with the registers, as shown at 802.

The means 815 for executing again may be designed as iteration means that again activates the means 810, 811, 813 in a cyclic processing, but provides them with the corresponding other portions of the operands. Alternatively, when no iterative processing is desired, the means 815 for executing again may also be designed as simple doubling and/or tripling of the elements 810, 811, 813, which, however, are fed with correspondingly different values. For reasons of efficiency, however, the embodiment is preferred in which the means 815 for executing again drives the existing means 810, 811, 813 again, but with other input operands, until all portions of the first operand A are processed.

In the first step, $A_j$, $B_i$ and Z as well as $C_j$, $C_{j-1}$ are required as input operands.

In the second step, $A_{j-1}$, Z and $C_{j-2}$ are required as input operands.

In the third step, $A_{j-1}$, $B_i$ and Z are required as input operands.

If there is a division into only two portions, the calculation is completed after as few as two steps.

If, however, there is a division into more than three portions, $C_{j-3}$ will be used in addition to $C_{j-2}$ in the second step, and $A_{j-3}$ and $C_{j-4}$ will be used in the third step, and there would be a fourth and last step, in which $A_{j-4}$ would be used.

In this case, the result register would also have five individual short result registers, instead of the four individual result registers used in the case of three portions, in which the result values $D_3'$, $D_2''$ and $D_0$ are stored, wherein $W_0$ represents the MOD result of the last MMD operation, while the other three inputs into the whole result register 802 will be updated MMD results.

For the purpose of illustration, FIG. 8e illustrates an example and the three iteration steps for calculating the result of the multiplication addition operation with respect to an arbitrarily selected example.

For each step, the loading of the two auxiliary registers 812a, 812b and the contents of the result registers 802a to 802d obtained in these steps are illustrated. In the embodiment shown in FIG. 8e, only registers are required that may store a single decimal digit, and there are never required registers that have to store two decimal digits.

The register implementation is illustrated in FIG. 8b.

The main part of the algorithm thus consists of the MMD operations. Their implementation will be discussed in a following section. In addition to these, there are an elementary operation, namely adding components of integers and treating a possible carry.

$$(D'_3|D'_2)_Z := (C_2+U_1, C_1+U_c)_Z$$

means $$D'_2 := C_1+U_0$$

$$D'_3 := C_2+U_1$$

$$(D'_3, D'_2) := TC(D'_3, D'_2)$$

and $$(D''_2|D'_1)_Z := (D'_2+V_1, C_0+V_0)_Z$$

means $$D'_1 := C_0+V_0$$

$$D''_2 := D'_2+V_1$$

$$(D''_2, D'_1) := TC(D''_2, D'_1)$$

$$[(D'_3, D''_2) := TC(D'_3, D''_2)]$$

Here, the last action was set in brackets, since this is not really necessary: If this was necessary, the carry would be resolved in the last step. Namely, as $D''_2 \leq 2(Z-1)$, it will still be possible to hold the carry from the next step, and it can be resolved without additional problems. Finally $$(D''_1''|D_0)_Z := (D'_1+W_1, W_0)_Z$$

can be implemented as $$D_0 := W_0$$

$$D''_1 := D'_1+W_1$$

$$(D''_2, D''_1) := TC(D''_2, D''_1)$$

The algorithm TC is nothing else than simply treating a carry in the Z-ary integer representation, as shown in FIG. 9a.

In the preferred embodiment of the present invention, the algorithm TC is performed as part of the updating step, i.e. after the performed addition and prior to the loading of the result registers 814a, 814b in FIG. 8d. The algorithm for TC is shown in FIG. 9a. The algorithm TC only steps in when the second input X, i.e. the value of $(C_1+U_0)$ in the algorithm shown in FIG. 8a, is larger than Z. If this value is less than Z, there is no carry, and the function TC of FIG. 9a is transparent. If, however, it is the case that X is larger than Z or equal to Z, Z is subtracted from X, and Y is incremented by "+1" to take the carry into account. The value Y then represents the contents of the fourth register $D_3'$, while the value X represents the contents $D_2'$ of the third register 814b in FIG. 8d.

It is to be noted that, when such numbers are calculated in which there is never a carry, the TC function is not required. For universal applicability, however, this function is preferred and is used within the means for updating after the addition of portions of the third operand C.

Next, a process of the inventive method is illustrated in more detail with respect to a preferred register implementation. A register situation of a calculating unit with 5 long registers divided into ten short registers is assumed. The register loading at the start of the algorithm is illustrated at 840 in FIG. 8b. It can be seen that only the top four registers are loaded with $N_2$, $C_1$, $C_2$ and $C_0$. $N_2$ is the top portion of the transformed modulus, which itself is not required for the multiplication addition calculation, but which is already in the register due to the previous and/or subsequent calculations. In principle, however, it is not required for the execution of the multiplication addition operation.

Furthermore, the state of the external memory and/or working memory XDATA 850 is shown in FIG. 8b. The external memory 850 includes three portions of the first operand A, three portions of the second operand B, and the middle and lowest portions of the transformed modulus N, which, however, are not required for the multiplication addition operation either.

In a memory loading step $Mov_k$, the internal register memory is now loaded, namely with the fourth operand Z in the fourth row and the left column, shown at 840'. The numbers Z+1 and the new loading of $B_i$ into a further short memory are not required for the multiplication addition operation in its basic execution. Then the first MMD operation is performed by the means 810. The results $U_0$, $U_1$ are fed into the two still free register memories, as illustrated at 841. Now there is an update, which is illustrated by an addition function and a TC function in FIG. 8b. Here, the registers $C_2$ and $C_1$ are overwritten with the values $D_3'$ and $D_2'$. This is possible because the values $C_2$ and $C_1$ are no longer needed, as can be seen in FIG. 8a. Furthermore, the memory loading is illustrated in FIG. 8b after the first updating step (Add, TC) such that the two auxiliary registers in which $U_0$, $U_1$ were stored are again cleared, as illustrated at 841'.

Then, the second MMD operation is performed and the results $V_0$, $V_1$ are again stored into the two auxiliary registers, as can be seen at 842. Then there is an update, i.e. an addition operation and a TC operation are executed to achieve a memory loading 842'. It can be seen that the register memory in which $C_0$ was written has been overwritten by $D_1'$, because $C_0$ is no longer needed after the second update (Add, TC).

Furthermore, the third and last MMD operation is performed to obtain a loading of the register memory as shown at 843. Again, a loading of the two auxiliary registers by $W_0$ and $W_1$, i.e. the results of the MMD operation, is achieved, wherein then there is a last update to obtain a memory loading as illustrated at 843'. In the embodiment shown in FIG. 8b, the value $N_2$ was shifted, and $W_0$ was entered as least significant result register value.

A final treat carry step for the use of the contents of the memory, as shown at 843', results in the ultimate output state, illustrated at 844.

It is to be noted that the internal memory loading has been selected so that the processor, i.e. the means 810 for calculating the MMD operation or the means 813 for updating, which may be one and the same calculating unit or may be separate calculating units, always has to access only a single value in the external memory. In the first MMD step, this is the value $A_2$. In the second MMD step, this is the value $A_1$, and in the third MMD step, this is the value $A_0$.

In the case of a processor that does not execute any external access, but is to operate only with its internal registers, the value for $A_2$, $A_1$ and/or $A_0$ would have to be stored into an available short register prior to each execution of the MMD operation, or all three values could be loaded as part of $Mov_k$ at the beginning.

Later the algorithm for treating a negative carry (borrow), which is analogous to TC, will be used after a subtraction. It is shown in FIG. 9b.

The final reduction step only has to take care of the upper two parts of D, since the lower two parts have been treated in the last step, so $$(D_3|D_2|D_1|D_0)_Z := (D'_3, D''_2, D''_1, D_0)_Z$$

(also denoted as TC) is in fact implemented as $$D_1 := D''_1$$

$$(D_3, D_2) := TC(D''_3, D''_2)$$

Remember that $D_3$ may become positive or negative, so that it is "free floating".

Finally, a further part of the whole algorithm is the modular reduction step. It has to versions, one that computes the usual remainder $\epsilon[0, N[$ and one that computes the remainder decremented by N, i.e. $\epsilon[-N, 0]$. The two algorithms are shown in one step, since the differences only lie in the computation of $\tilde{\epsilon}$ and in the final reduction (FIG. 9c).

Figure 9D:
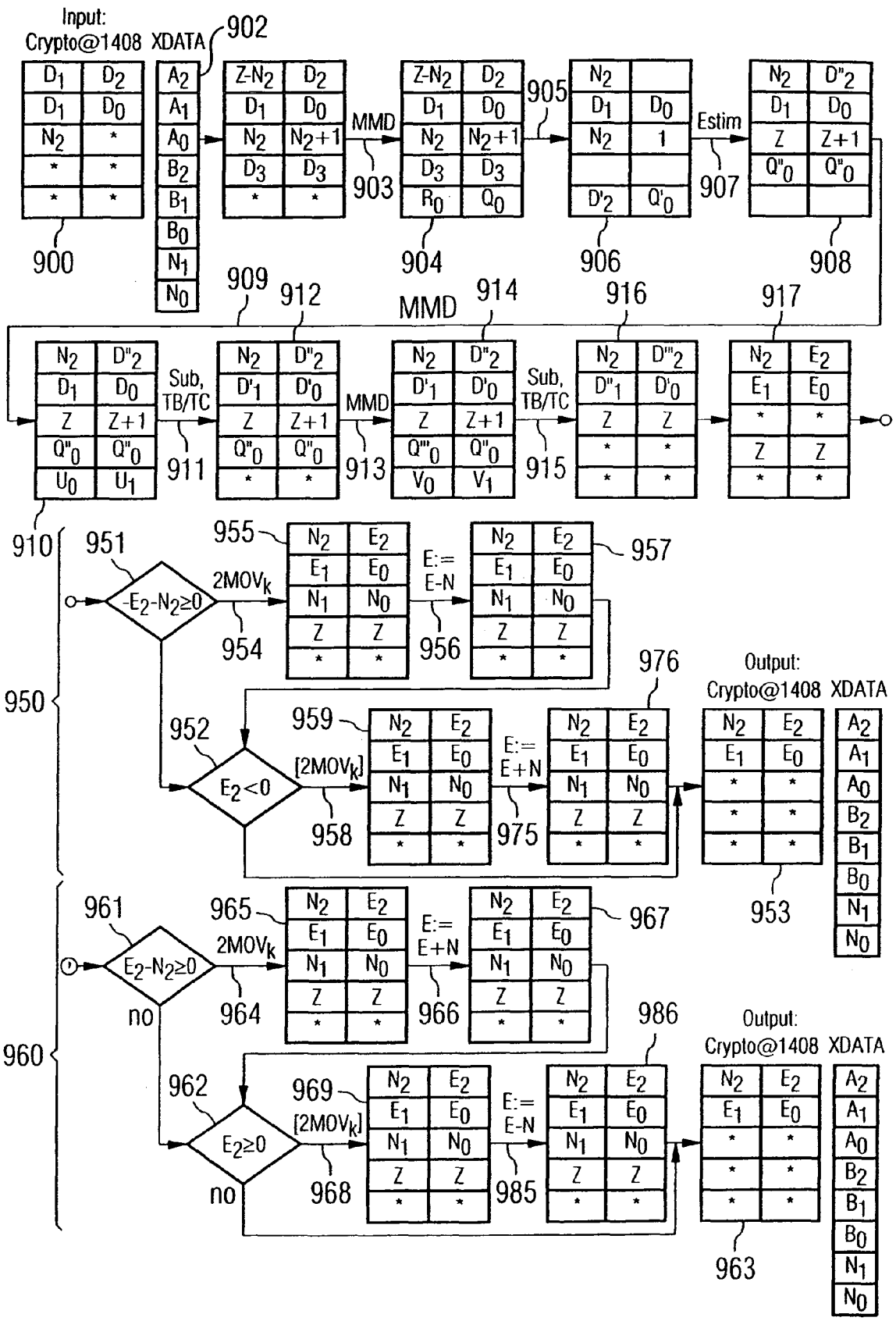
FIG. 9d shows a preferred implementation on the register level of the reduction operation of FIG. 9c.

The register implementation is illustrated in FIG. 9d.

In the register implementation as illustrated in FIG. 9d there are illustrated both the internal registers at 900 and a loading of external registers xdata at 902 at the beginning of the calculation of FIG. 9c and/or 3f.

In the initial situation, the registers of the cryptoprocessor are loaded with the four portions $D_0$, $D_1$, $D_2$, $D_3$ of the number D to be reduced and with the most significant portion $N_2$ of the modulus. In the working memory 902, there are not only the operands A and B not required for the present reduction, but also the two other portions $N_1$ and $N_0$ of the modulus N. Next, first calculations are performed to reach the values required for the first MMD operation at 903. The register loading after the first MMD operation 903 is shown at 904. Then the calculations at 905 in FIG. 9c and/or 3f are performed to obtain the register loading 906, which is the initial situation for the estimation of $\epsilon$ 907. The register loading after the estimation of $\epsilon$ is shown at 908 in FIG. 9d. In particular, the two further calculations for $D''_2$ and $Q''_0$ have been performed in the embodiment shown in FIG. 9d also in the course of the calculation 907. Then the first MMD operation 909 is performed. The result of this MMD operation is shown at 910. The subsequent subtraction and/or carry or borrow treatment is schematically illustrated at 911 in FIG. 9d. The result prior to the second MMD operation 913 is illustrated at 912. Then a register loading 914 is obtained, which is subjected to a further subtraction 915 with corresponding carry/borrow treatment to obtain a register loading 916, which is used as starting point for the final reduction either directly or after re-sorting to obtain the register loading 917.

Two possibilities are shown for the final reduction in FIG. 9d. The first possibility at 950 represents the steps and/or register loadings required if a reduction to a number between 0 and N is required. In contrast, 960 illustrates the steps and/or register loadings required if the result is to be between 0 and −N. Specifically, it can be seen that, when the two decisions 951 and 952 are respectively answered with no, no further calculations are necessary and the output result has the same register loading 953 as it was obtained at 917 as result of the calculation 915. If, however, the first decision process 951 determines that the result E is too large, i.e. that $E_2-N_2$ is larger than 0, the remainder of the modulus, i.e. $N_1$, $N_2$, is loaded into the register via a loading process 954 to obtain the register loading 955. Then the modulus N is subtracted at 956 to obtain a result 957. If the decision block 952 then determines that $E_2$ is not less than 0, the final result has been reached.

However, if the first decision 951 is answered with no and the second decision 952 is answered with yes, the same operation as performed at 954 is performed at 958. Then a register loading 959 is achieved. After the addition of the modulus at 975, a register loading 976 is reached which already comprises the correct values for $E_2$, $E_1$ and $E_0$.

The functionalities for the alternative reduction in which a result is obtained that is less than zero and larger than −N are similar to the processes described in 950. However, the decision boxes at 961 and 962 are designed differently. The decision at 961 determines whether the result is too small, i.e. whether the result is less than −N. This is determined by forming $-E_2-N_2$ and examining whether the result is larger than or equal to zero. If this is the case, the modulus portions $N_1$, $N_0$ are loaded into the register at 964 to obtain a loading at 965. Then the modulus is added at 966 to obtain a loading 967 with which then the final result is obtained at 963.

If, however, the decision in block 961 is answered with no and the decision in block 962 is answered with yes, this means that $E_2$ is larger than zero. In that case, the remainder of the modulus, i.e. $N_1$, $N_0$, has again to be loaded into the register to obtain the loading at 969. At 985, a modulus is then subtracted to obtain the loading at 986, which then corresponds to the final result with respect to $E_2$, $E_1$ and $E_0$.

Again, the main part of the algorithm consists of the three MMD operations. Their implementation will be discussed in a following section. The remaining part consists of the estimation of $\epsilon$, which will be discussed in a later section, and some elementary operations of addition or subtraction of components and treating possible carries or borrows.

The first two additions $Q'_0 := Q_0 + D_3$ and $D'_2 := D_2 + R_0$ are not subjected to any carry treatment. In any case, remark 7 has shown that $Q_0$ will not become much larger than Z. On the other hand, $D'_0$ may become as large as 2 Z, but it is non-negative and therefore this integer has to be interpreted as unsigned integer!

Figure 12:
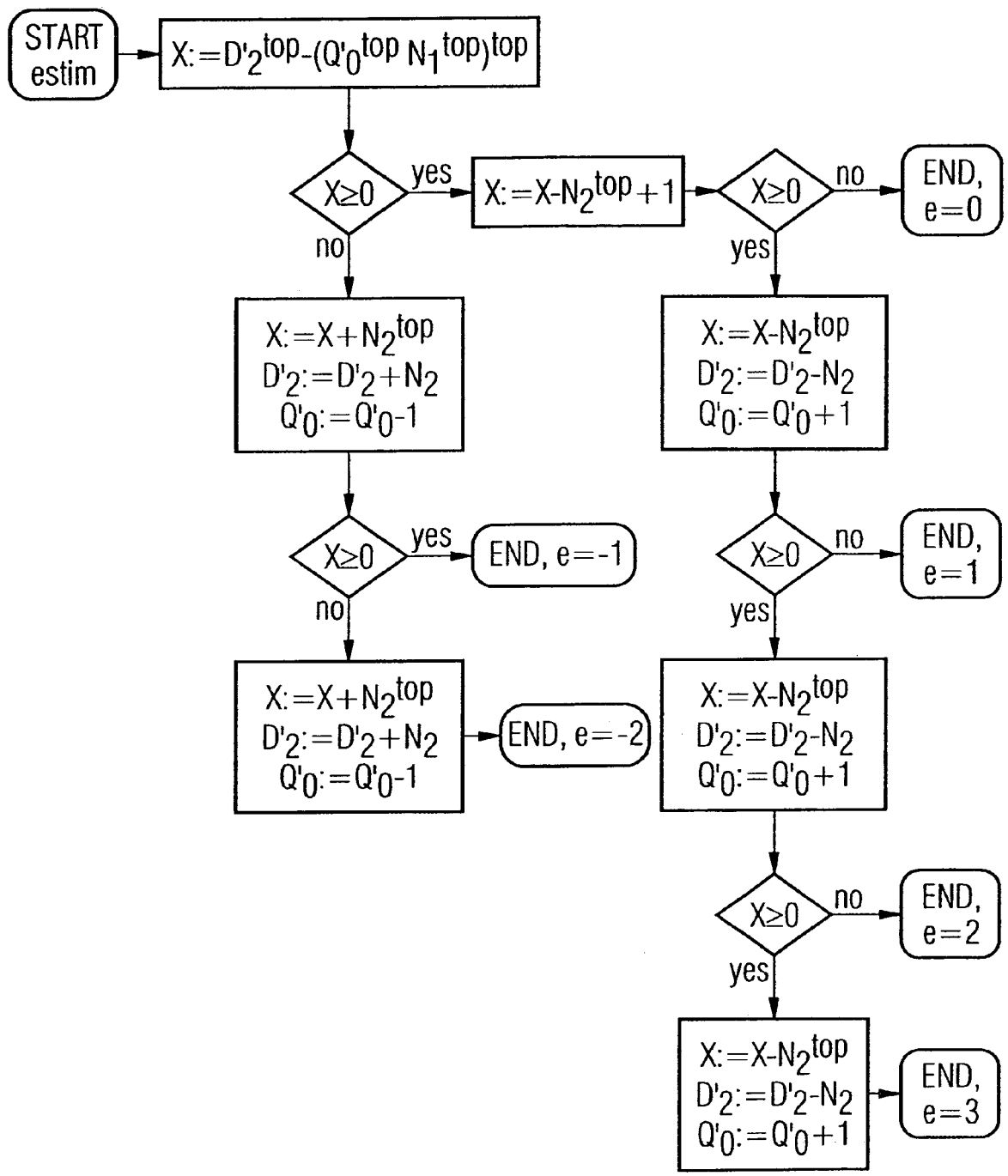
FIG. 12 shows a register implementation of the calculation (estimation) of $\epsilon$ and/or e.

With reference to FIG. 12, it is shown how to implement the next three lines together:

$$\epsilon := \text{estimate}(D'_2 - (Q'_0 N_1)_1 \text{ div } N_2)[+1]$$

$$D''_2 := D'_2 - \epsilon N_2$$

$$Q''_0 := Q'_0 + \epsilon$$

The subtraction $$(D'_1|D'_0)_Z := (D_1 - U_1, D_0 - U_0)_Z$$

will be done similarly to the $MA_Z$ algorithm, with the difference that borrows have to be treated instead of carries. But note that, if $Q''_0<0$, then $U_1$ and $U_0$ are also negative, hence the subtraction is actually an addition, and carries have to be treated again:

$$D'_0:=D_0-U_0; D'_1:=D_1-U_1$$

if $Q''_0 \geqq 0$ then $$(D'_1,D'_0):=TB(D'_1,D'_0)$$

$$(D'_2,D'_1):=TB(D'_2,D'_1)$$

else $$(D'_1,D'_0):=TC(D'_1,D'_0)$$

$$(D'_2,D'_1):=TC(D'_2,D'_1)$$

end

Of course, there is a possibility to change the order of the operations. In the same way, the other subtraction $$(D'''_2|D''_1)_Z:=(D''_2-V_1,D'_1-V_0)_Z$$

is treated as:

$$D''_1:=D'_1-V_0; D'''_2:=V_1$$

if $Q''_0 \geqq 0$ then $$(D'''_2,D'_1):=TB(D'''_2,D''_1)$$

else $$(D'''_2,D''_1):=TC(D'''_2,D''_1)$$

end

Remember that $D'''_2$ will not be resolved yet. This is done in the final reduction step following now:

In $Red_Z$, it is desired to get a result $E\epsilon[0, N[$. But sometimes, the result is slightly larger than N or less than 0. In this case, N has to be subtracted or added once. In order to check whether E>N, E has to be subtracted from N. But unfortunately, N does not fully lie in the Crypto@1408. So $E_2-N_2$ is computed and there is a check whether this difference is $\geqq 0$. If E>N, this is certainly the case. Note that also $E_2-N_2=0$ may be a hint that E>N, since it is always possible that $E_1>N_1$. However, this cannot be checked immediately, since the full N first has to be loaded into the Crypto@1408. It happens only in very few cases that $E_2=N_2$, while $E \leqq N$. Since all this happens very rarely, one takes the time and loads the complete N into the Crypto@1408 and performs the final reduction: N is subtracted from E. If then the new integer $E_2 \geqq 0$, this is the end. If $E_2$ becomes negative, N has to be added again. If $E_2$ was negative from the beginning—which also happens very rarely—then N is also loaded into the Crypto@1408 and added to E. This algorithm is formally given by if $E_2-N_2 \geqq 0$ then $$(E_2|E_1|E_0)_Z:=(E_2-N_2,E_1-N_1,E_0-N_0)_Z$$

end if $E_2<0$ then $$(E_2|E_1|E_0)_Z:=(E_2+N_2,E_1+N_1,E_0+N_0)_Z$$

end

Note that normally, in 99.9% of all cases, both if—conditions will not be fulfilled. So the implementation should consider this fact. It should be avoided to load the full N into the Crypto@1408, unless one of the conditions is true, because this needs a lot of time! For $Red'_Z$, the final reduction is quite similar.

if $-N_2-E_2<0$ then $$(E_2|E_1|E_0)_Z:=(E_2+N_2,E_1+N_1,E_0+N_0)_Z$$

end if $E_2 \geqq 0$ then $$(E_2|E_1|E_0)_Z:=(E_2-N_2,E_1-N_1,E_0-N_0)_Z$$

end

In both cases, one always has to be aware of carries and borrows and resolve them like in the additions and subtractions described earlier in this section. Finally, note the following important remark.

Remark 11: Because of equation (3), $Q''_0 \epsilon [-Z-1, Z]$. Since in the second and third MMD operations the second factor is definitely reduced mod Z, the product $Q''_0 \cdot N_i$ will always have an absolute value $\leqq (Z+1)(Z-1)=Z^2-1$.

Implementation of $MMD_k$

Input for the MMD algorithm is a transformed modulus N (in this case this will be $N_2$ or Z), the multiplicand X (in this case $B_i$, $D_3$, $Q''_0$) and the multiplier Y ($A_i$, Z, $Z-N_2$ and $N_i$), which in most but not all cases will lie outside the Crypto@1408.

1. If #N=:k>704−8−1 =695 (sign bit, not counted), the MMD operation has to be computed in long mode of the Crypto@1408. Otherwise, the parallel mode discussed below may be used. In long mode, the algorithm is given in FIG. 10a.

Figure 10B:
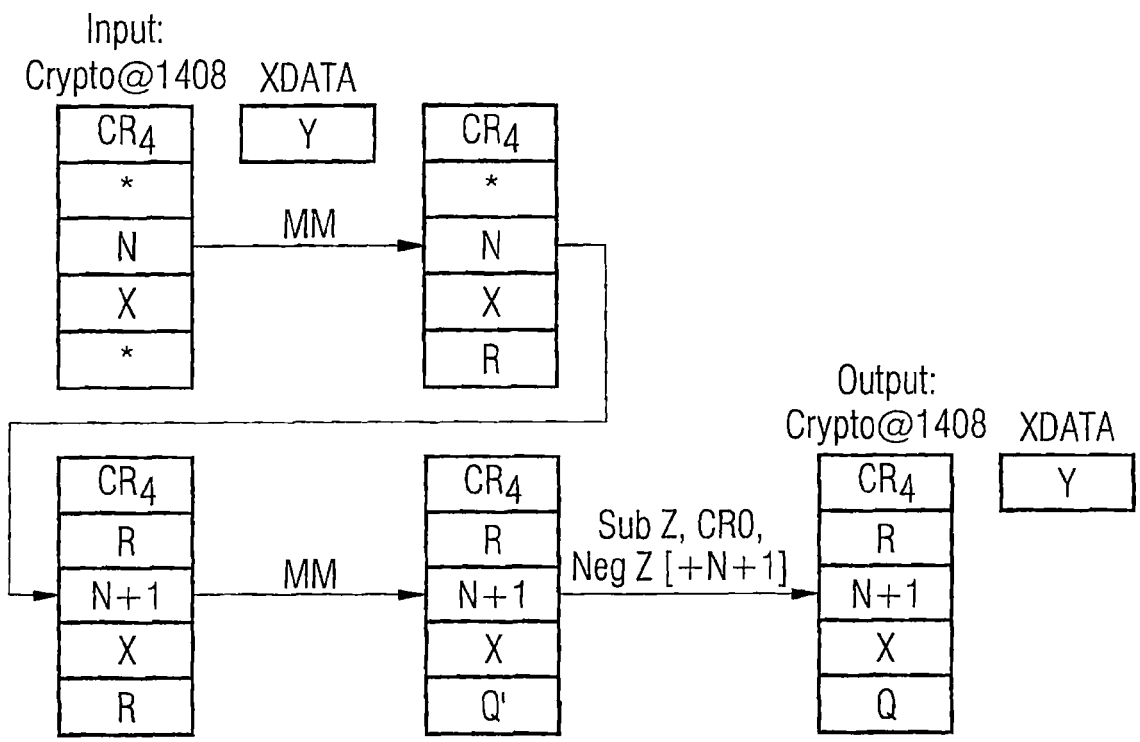
FIG. 10b shows a preferred register implementation of the MMD operation.

For the Crypto@1408, the algorithm is illustrated in the following FIG. 10b.

2. At least in one case, the algorithm will be needed for a negative multiplicand. But this is not a problem, as long as $X \epsilon ]-N, 0]$: In this case, (Q, R):=MMD(−X, Y; N) is computed and (−Q+1, N−R) is returned, if R>0, and (−Q, −R), if R=0. This is legitimate by the following observation: If $$-X \cdot Y = Q \cdot N + R, \text{ with } R \epsilon [0,N[,$$

then $$X \cdot Y = -Q \cdot N - R = (-Q+1) \cdot N + (N-R).$$

In fact, in this case, it will be sufficient to just return (−Q, −R), since this algorithm works in this part with negative remainder R.

3. It is even not really necessary that X and Y $\epsilon$ [0, N[ (or more generally in ]−N, N[). It is sufficient that the product X·Y lies in [0, $N^2$[. Therefore, it may be allowed that X or Y is a little bit larger than N, as long as Crypto@1408 does not interpret the integer in a wrong way (sign bit).

the product X·Y is not too big, i.e. lies in [0, $N^2$[.

Figure 11A:
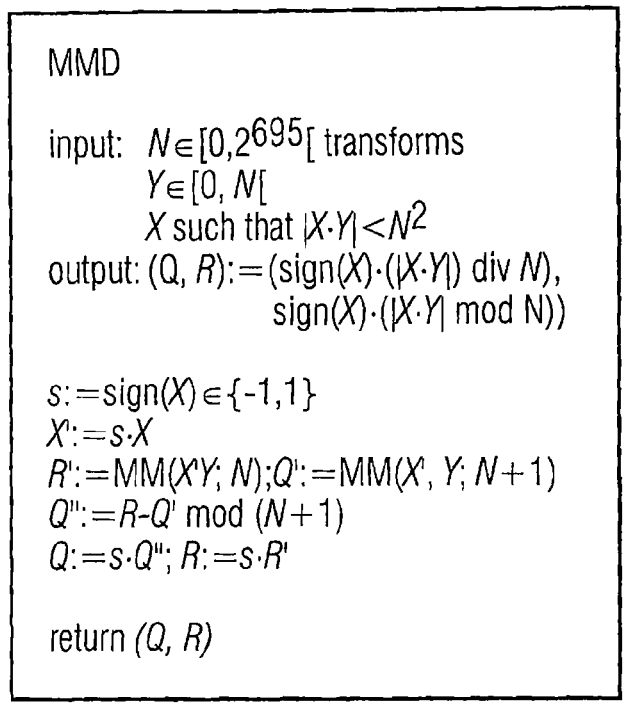
FIG. 11a shows an implementation of the MMD operation.

In FIG. 11a, the algorithm is given in the way it is preferably used.

Figure 11B:
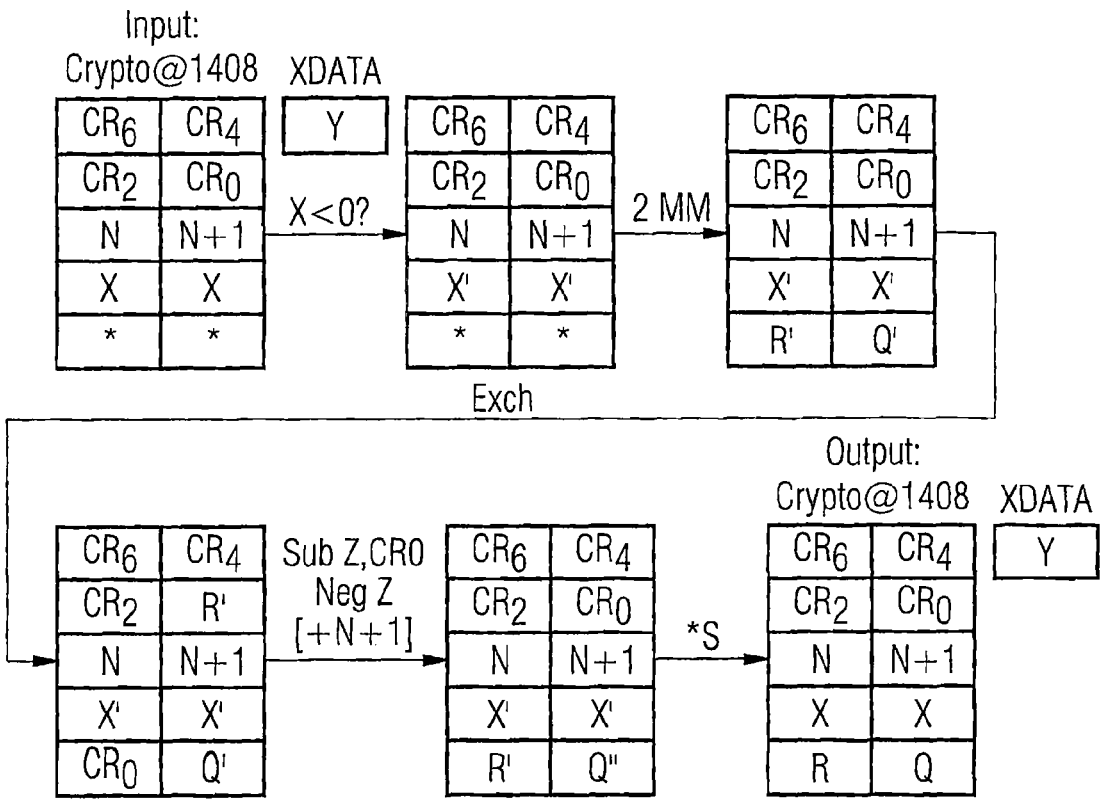

The algorithm implemented on Crypto@1408 is illustrated in FIG. 11b.

Making the Side Computation

In this section, there is given an implementation of the three lines $$\epsilon:=estimate(D'_2-(Q'_0 N_1)_1 \text{ div } N_2)$$

$$D''_2:D'_2-\epsilon N_2$$

$$Q''_0:Q'_0+\epsilon$$

of Red.

The main point in this implementation is the estimation of $D'_2-(Q'_0 N_1)_1$ div $N_2$. By the same technique already used several times an approximation of a division may be obtained by using only the top bits of a dividend and divisor. In this case, the 16 top bits (including sign bit) will be used, i.e.:

$$D'^{top}_2 := D'_2 \text{ div } 2^{k-16}$$

$$Q'^{top}_0 := Q'_0 \text{ div } 2^{k-16}$$

$$N_1^{top} := N'_1 \text{ div } 2^{k-16}$$

$$Z^{top} := Z \text{ div } 2^{k-16}$$

$$N_2^{top} := Z^{top} N_2 \text{ div } 2^{k-16}$$

Since $(\ldots)_1$ in $(Q'_0 N_1)_1$ means division by Z, the fraction is multiplied by Z and there is hence an approximation in the following way:

$$\epsilon := (Z^{top} D'^{top}_2 = Q'^{top}_0 N_1^{top}) \text{div } N_2^{top}$$

and $D'^{top}_2$ and $Q'^{top}_0$ are obtained by reading the most significant word of $D_2$ and $Q'_0$. The top two bytes—sign extended—are loaded into some CPU register. Also $N_1^{top}$ is prepared in the same way, but in this case this has to be done only once during the whole exponentiation. (Pre-computation!) Then the product $Q'^{top}_0 N_1^{top}$ will be computed. It is a 32 bit word and it is subtracted from $Z^{top} D'^{top}_2$. Call the result X. This result will be compared with $N_2^{top}$, which is prepared in the same way as $N_1^{top}$, but with an additional factor of $Z^{top}$. The rest is obvious and shown in FIG. 11.

Remark 12: Note that for Red' one has to add one additional block $$D'_2 := D'_2 - N_2$$

$$Q'_0 := Q'_0 + 1$$

in any case.
Pre-Computation

The pre-computation gets the base B* and the modulus N* for the exponentiation. N* has a bit length K, i.e. $N^* \in [2^{K-1}, 2^K[$. Since the pre-computation is not relevant for the performance, the implementing aspects are not treated in too much detail. Only some notes and remarks regarding these points:
Transforming N* into $(N_2|N_1|N_0)$:

Now set $W := 2^{k-1}$ the largest power of two to less than Z and write $N^* = (N^*_2 | N^*_1 | N^*_0)_W$, i.e. divide N* into three (k−1) bit blocks. The transformation into Z-ary representation $(N_2|N_1|N_0) := N^*$ is given in FIG. 13a:

Note that Z is transformed, so that the MMD implementation of FIGS. 11a and 11b may really be used. The two addition parts are done exactly like in the main implementation presented starting from FIG. 6: Make the addition component-wise and treat the carry!
Transforming B* into $(B_2|B_1|B_0)_Z$:

This works exactly in the same way as in the last point.
Making the Final Reduction (Post-Computation)

The final reduction takes the output $(A_2|A_1|A_0)_Z$ of the last modular multiplication of the pure exponentiation, reduces this number modulo $N^* = (N'_2|N'_1|N'_0)_Z := N^*$ and transforms it back into the binary representation A*. The result is 1. $(A'_2|A'_1|A'_0)_Z := (A_2|A_1|A_0)_Z \mod (N'_2|N'_1|N'_0)_Z$

2. $A^* := (A'_2|A'_1|A'_0)_Z$ wherein $(N'_2|N'_1|N'_0)_Z$ is known from section 5.5.
For 1. The Reduction
will be done in the already known way: $A := A - [A \text{ div } N] \cdot N$, so the algorithm can be given as shown in FIG. 13c.

The division is the one from the last section, and the entire already known technique is used.

For 2. Transforming into Binary Form
This is actually just the computation $$A := A'_2 \cdot Z^2 + A'_1 \cdot Z + A'_0$$

Three different methods to implement a 2048-bit RSA computation have been described. Furthermore, the performance of such an implementation of the algorithm was evaluated, taking into account some system aspects which are performance-dominating, such as moving integers into and out of Crypto@1408. It was found that in terms of speed and usage of external memory, the inventive preferred algorithm is the best one. Although for m=3 it is only suitable to implement RSA up to 2048 bits (+16 for randomization). If there is a need for longer bit lengths, then the Algorithm II (Fischer-Sedlak-Seifert with MMD) seems to be the best reasonable method. Alternatively, m=4, 5, . . . may also be chosen.

Figure 18:
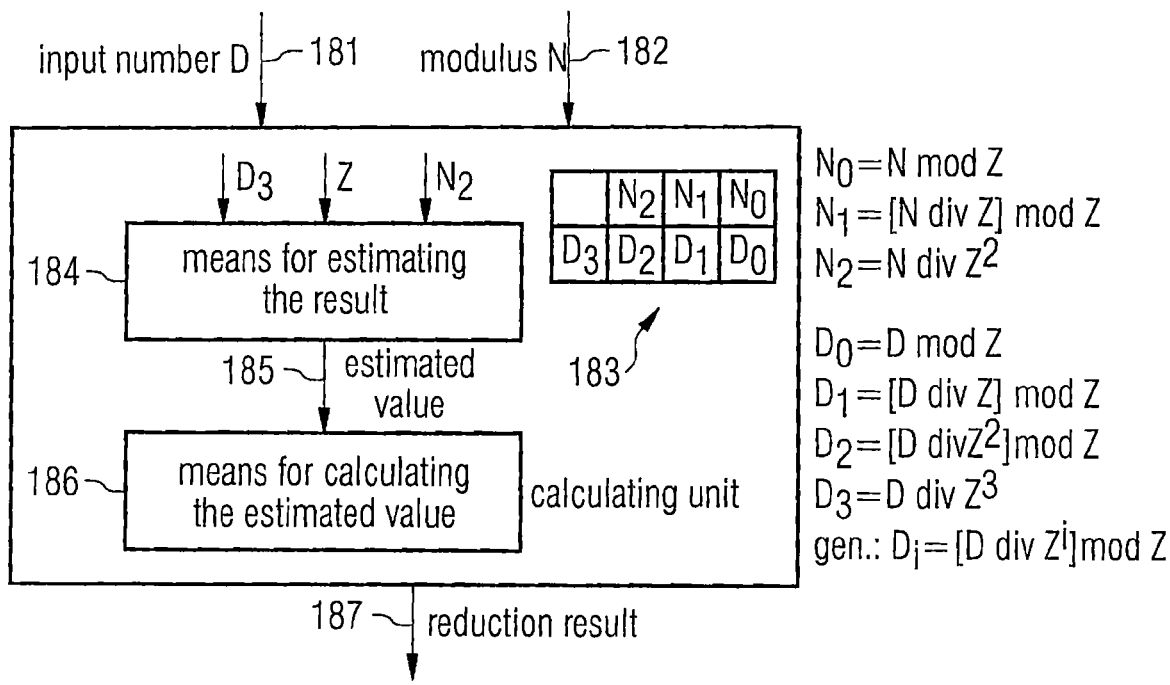
FIG. 18 shows a calculating unit as it is used in a preferred embodiment of the present invention.

In the following, the inventive calculating unit for reducing an input number D with respect to a modulus N is explained with respect to FIG. 18. The calculating unit 180 includes a calculating unit input for the input number D designated 181 and a calculating unit input 182 for the modulus N. Both the modulus and the input number are in portions as preferably illustrated on the right of the calculating unit 180 in FIG. 18. In particular, the portions $N_0$, $N_1$, $N_2$ include different significances. Portion $N_2$ has the highest significance, as shown with respect to register block 183 storing the portions with decreasing significance from left to right. Thus, portion $N_2$ has the highest significance with respect to the modulus. The portion $N_1$ has a lower significance, and the portion $N_0$ has the lowest significance. A corresponding situation applies to the input number D to be reduced, which is very likely to have a third most significant portion, because it may be significantly larger than the modulus N. Again, portion $D_3$ is the most significant portion. The less significant portion $D_2$ follows the most significant portion. A still less significant portion $D_1$ follows the portion $D_2$ in significance, and the least significant portion $D_0$ is formed by modular reduction of the input number with the division number Z as modulus, as also illustrated in FIG. 18. The portions thus represent the input number D and/or the modulus N considering the division number Z.

In particular, the calculating unit 180 further includes means 184 for estimating a result of an integer division of the input number by the modulus using a most significant portion of the number, a most significant portion of the modulus and the division number. The means 184 is further designed to output the estimated result, i.e. for example $\tilde{Q}_0$, or an estimated value $Q'_0$ (FIG. 3d, FIG. 3e, FIG. 3f) or $Q''_0$ (FIG. 9c) derived from the estimated result at an output 185 and/or to store them via an output 185. The storage is preferably done in a register of the calculating unit, wherein only a short register is required, because the number $\tilde{Q}_0 Q'_0$ (FIG. 3d, FIG. 3e, FIG. 3f) or $Q''_0$ (FIG. 9c) is smaller than the most significant portion $N_2$ of the modulus. The means 184 for estimating preferably executes the functionality of "evaluate $\epsilon$", as illustrated in FIG. 3c.

The calculating unit 180 further includes means 186 for calculating a reduction result that may be output at a calculating unit output 187, wherein the means 186 is designed to calculate its result based on a subtraction of a product of the modulus and the estimated result or the estimated value provided by the means 184 from the number. The means 186 is thus designed to preferably execute the functionality illustrated for E in FIG. 3c starting from the estimated result of the integer division. The value E is thus the reduction result in the embodiment of the present invention shown in FIG. 3c.

Figure 19A:
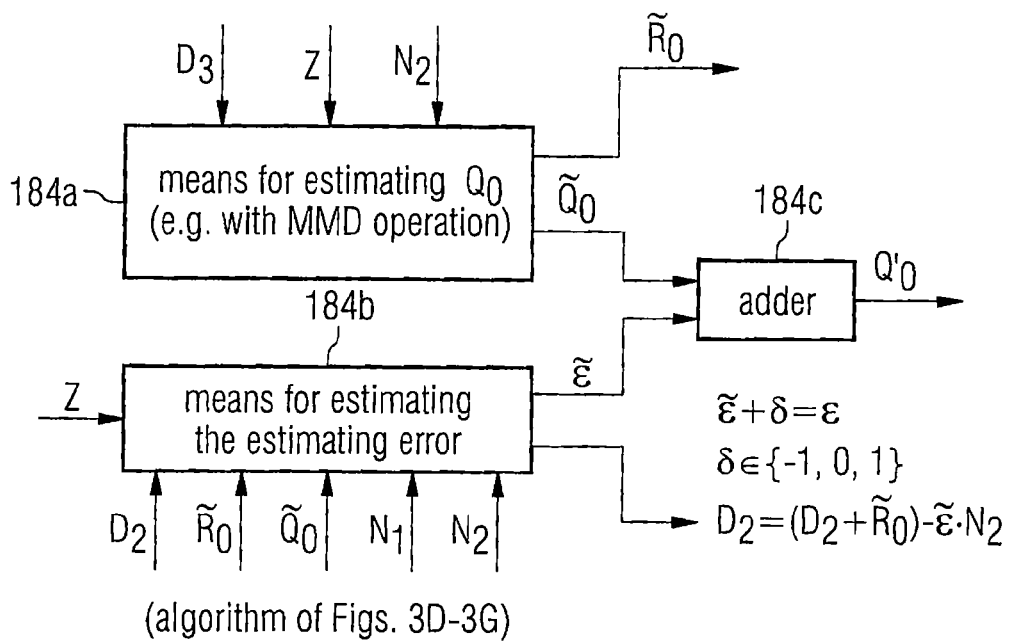
FIG. 19a shows a preferred implementation of the means 184 for estimating of FIG. 18 according to the algorithm of FIGS. 3d-3f.

As already discussed with respect to FIGS. 3c and 3d, it is preferred to perform a further estimating process, i.e. to perform also an estimation of the estimating error made by means 184a in addition to the estimation of the result of the integer division performed by estimating means 184a, which is part of means 184 in FIG. 18. This estimation of the estimating error is achieved by means 184b, as illustrated in FIG. 19a for the algorithm of FIGS. 3d to 3f. FIG. 19b shows the analogous case for the algorithm of FIG. 9c. In both figures, an adder 184c is provided designed to add the outputs of the means 184a and 184b, as shown in the figures, to derive the estimated value from the estimated result.

Preferably, the means 184b for estimating the estimating error is designed to obtain an estimated value $\tilde{\epsilon}$ differing from the actual estimating error $\epsilon$ by maximally $\delta$. In the preferred embodiment of the present invention, the estimating error $\tilde{\epsilon}$ is estimated so that the highest residual error is equal to $-1$, $0$ or $+1$. In the preferred embodiment of the present invention, the calculation for $\tilde{\epsilon}$ illustrated in FIG. 3e is performed for calculating the estimating error $\tilde{\epsilon}$, the calculation being special in that only short numbers are required for the estimation of the estimating error, such as $D_2$, i.e. the second most significant portion of the number D, $\tilde{R}_0$, i.e. the remainder of the modular reduction of the product of $D_3$, the number Z and with respect to the top portion $N_2$ of the modulus. Furthermore, the expression $(\tilde{Q}_0 N_1)_1$ is used, which is equal to the result of the integer division by the number Z of the product of $\tilde{Q}_0$ and $N_1$. It is to be noted at this point that $N_1$ is the second most significant portion of the modulus N, as it has been discussed.

For the estimation of the estimating error, there are thus needed portions of the modulus other than the least significant portion $N_0$, and only the second highest portion is required of the number D. Other portions are not required.

Alternatively, the estimating error $\tilde{\epsilon}$ may also be calculated as illustrated for $\tilde{\epsilon}$ in FIG. 3f. The difference results from the differently defined MMD operation, as shown in FIG. 3f.

Generally, however, the means for estimating the estimating error is designed to calculate the estimating error only using the second highest portion $D_2$ of the number and the two highest portions of the modulus N, wherein there are preferably used the equations illustrated in FIG. 19a and/or FIG. 3e or FIG. 3f. Alternatively, it is preferred to implement the functionality of FIG. 19b, which is based on the algorithm in FIG. 9c.

After the estimation of the estimating error, by which the estimated estimating error $\tilde{\epsilon}$ is obtained, there still has to be executed the functionality of the means 186 of FIG. 18. For this purpose, the means 186 is preferably embodied in two functionalities 186a and 186b. The means 186a serves to perform the subtraction, i.e. the subtraction as illustrated, for example, in FIG. 3e for the value E, wherein $Q'_0$ is equal to the estimated result $\tilde{Q}_0$ for the integer division plus the estimated estimating error $\tilde{\epsilon}$ that has been calculated by the means 184b of FIG. 19a or 19b. The thus obtained result may then be subjected to a final reduction to consider the allowable estimating error $\delta$, so to speak. In particular, if E is larger than or equal to N, N has to be subtracted from the result E to obtain the final reduction result. However, if E is less than zero, then a modulus N has to be added to obtain the reduction result at the output of means 186b, as illustrated in FIG. 3e.

In a preferred embodiment of the present invention, the means 186a for performing the subtraction is designed as illustrated in FIG. 3f or in FIG. 9c. The implementations of the means 186a in the manner illustrated in FIG. 3f or in FIG. 9c ensure that, for all calculations made in this implementation, there are only required portions of numbers whose length is always less than the number Z, so that, for all calculations made in these implementations, there is always required only a calculating unit of a length less than the number Z.

Figure 20A:
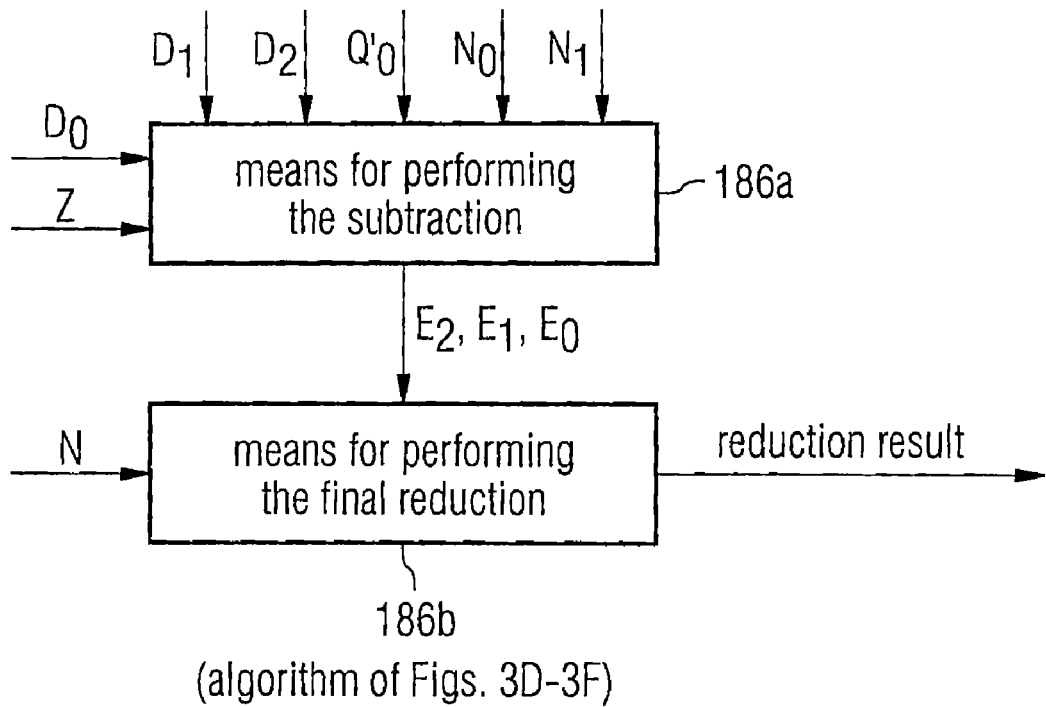
FIG. 20a shows a preferred implementation of the means for calculating of FIG. 18 according to the algorithm of FIGS. 3d-3f.
Figure 20B:
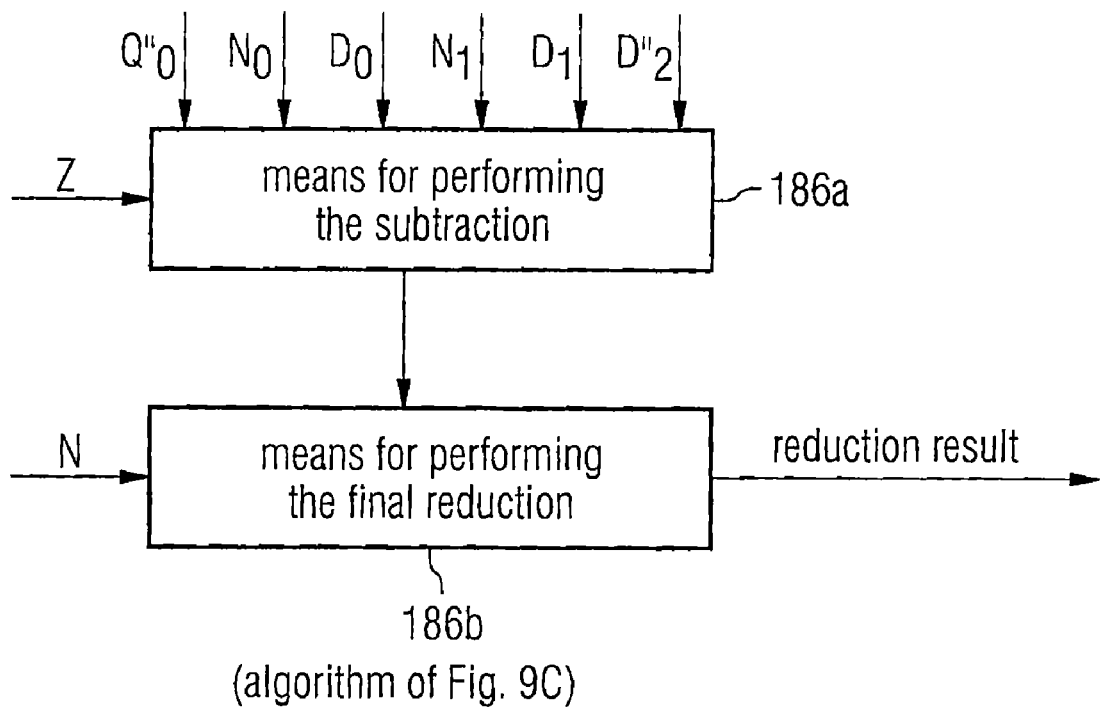
FIG. 20b shows a preferred implementation of the means for calculating of FIG. 18 according to the algorithm of FIG. 9c.

The "splitting" of the subtraction, as generally illustrated at 186a with long numbers with respect to FIG. 20a for FIG. 3f or with respect to FIG. 20b for FIG. 9c, is achieved by MMD operations and subtraction operations according to the invention. In particular, the splitting of the "long" subtraction into shorter subtractions may be achieved by performing a first MMD operation starting from the less significant portion $N_0$ of the modulus N, as illustrated at 200a in FIG. 21 for the algorithm of FIG. 9c by way of example. The results of the first MMD operation designed as illustrated, for example, in the sixth last line in FIG. 9c, are then supplied to means 200b for performing a first subtraction.

The means for performing the first subtraction further receives the least significant portion $D_0$ and the more significant portion $D_1$ of the number to be reduced, which follows with respect to significance. The means 200b for performing the first subtraction thus already provides the least significant portion of the reduced number $D'_0$, which is already the result if the final reduction is not required, or which only has to be subjected to the final reduction together with the remaining portions of the number $D_2$. Only by way of example, the least significant portion $D'_0$, by the means 186a of FIG. 20b whose more detailed design is illustrated in FIG. 21, is indicated at 210 in FIG. 21.

The means 186a for performing the subtraction further includes means 200c for performing a second MMD operation designed to now obtain, among other things, a more significant portion $N_1$ of the modulus. The results $V_1$, $V_0$ of the second MMD operation 200c, as calculated, for example, by the fourth last line of FIG. 9c, are then supplied to means 200d for performing a second subtraction, which provides the two more significant portions $D''_1$ and $D'''_2$ of the result number stored in the register 210. The number represented by the portions $D'''_2$, $D''_1$ and $D'_0$ now has to be subjected to a (positive or negative) final reduction and/or check to take into account and/or "eliminate" the still allowed estimating error $\delta$ of $-1$, $0$, $+1$.

Then the reduction result as obtained by the means 186b in FIG. 20b is provided as final result E in a result register 212, wherein the final result is again obtained by portions $E_0$, $E_1$, $E_2$, which again together represent the finally sought for result with respect to the division number Z.

As explained above, it is preferred for certain applications to obtain the MMD result subtracted by a modulus N. For this, see FIG. 1d and/or FIGS. 14-17. This "special" reduction, which actually reduces by one "N" too much, may readily be integrated by the inventive implementation by simply incrementing, as illustrated in FIG. 9c at 220, the estimated estimating error $\epsilon$ by "+1" as compared to its calculated value obtained according to the equation illustrated in FIG. 9c.

Furthermore, these facts are taken into account for this special reduction Red'$_Z$ in the final reduction by subjecting the result, as it is obtained, for example, from FIG. 21, to a subtraction with the modulus N, if the result is larger than zero. However, if the result is less than $-N$, a modulus N is added.

For reasons of clarity, the preferred, but exemplary distribution of the algorithm lines among the individual means 184a, 184b, 184c, 186a and 186b was indicated by horizontal lines in the individual figures in FIGS. 3d, 3e, 3f and 9c.

Depending on the circumstances, the inventive method for calculating a result may be implemented in hardware or in software. The implementation may be done on a digital storage medium, particularly a floppy disk or CD with control signals that may be read out electronically, which may cooperate with a programmable computer system so that the method is executed. Generally, the invention thus also consists in a computer program product with a program code stored on a machine-readable carrier for performing an inventive method when the computer program products runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

[1] W. Fischer, "Vorrichtung und Verfahren zum Berechnen eines Ergebnisses aus einer Division," DE patent #102,05,713, Aug. 7, 2003.

[2] W. Fischer, H. Sedlak, J. P. Seifert, "Vorrichtung und Verfahren zum Berechnen eines Ergebnisses einer modularen Multiplikation," DE patent #102,19,158, Dec. 9, 2004.

[3] W. Fischer, J. P. Seifert, "Vorrichtung und Verfahren zum Umrechnen eines Termes," DE patent application #102,19,161,A1, Nov. 20, 2003.

[4] W. Fischer, H. Sedlak, J. P. Seifert, "Vorrichtung und Verfahren zum Berechnen eines ganzzahligen Quotienten," DE patent #102,19,164, Dec. 2, 2004.

[5] W. Fischer, H. Sedlak, J. P. Seifert, "Vorrichtung und Verfahren zum Berechnen einer Multiplikation mit der Verschiebung des Multiplikanden, insbesondere bei der kryptographischen Berechnung," DE patent 190 102,60,655, Jun. 24, 2004.

[6] W. Fischer, H. Sedlak, J. P. Seifert, "Modulare Multiplikation mit paralleler Berechnung der Look-Ahead-Parameter u.s. bei der kryptographischen Berechnung," DE patent #102,60,660, Jun. 9, 2004.

[7] W. Fischer, J. P. Seifert, "Increasing the bitlength of a crypto-coprocessor," Proc. of CHES '02, Springer LNCS, Vol. 2523, pp. 71-81, 2002.

[8] W. Fischer, J. P. Seifert, "Unfolded modular multiplication," Proc. of ISAAC '03, Springer LNCS, 2003.

[9] A. Menezes, P. van Oorschot, S. Vanstone, "Handbook of Applied Cryptography," CRC Press, 1997.

[10] P. L. Montgomery, "Modular multiplication without trial division," Math. of Computation, 44:519-521, 1985.

[11] H. Sedlak, "The RSA cryptographic Processor: The first High Speed One-Chip Solution," Proc. of EUROCRYPT '87, Springer LNCS, Vol. 293, pp. 95-105, 198.

What is claimed is:

1. A calculating unit for reducing an input number with respect to a modulus, wherein the input number comprises input number portions of different significances, the input number portions represent the input number with respect to a division number, the modulus comprises modulus portions of different significances, and the modulus portions represent the modulus with respect to the division number, comprising:
a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and
a reduction result calculator configured for calculating a reduction result based on a result of a subtraction of a product of the modulus and the estimated result from the input number or based on a result of a subtraction of a product of the modulus and the estimated value from the input number,
wherein the unit for estimating is formed to evaluate the following equation:

$$(\tilde{Q}_0, \tilde{R}_0) := \mathrm{MMD}(D_3, Z \text{-} N_2; N_2),$$

wherein $\tilde{Q}_0$ is a result of an integer division, $\tilde{R}_0$ is an integer remainder of the integer division, MMD is a Mult-Mod-Div operation $D_3$ is the most significant portion of the input number Z is the division number, and $N_2$ is the most significant portion of the modulus.

2. The calculating unit of claim 1,
wherein the unit for estimating is formed to further estimate an estimating error depending on a deviation of the estimated result from a true result, and
wherein the unit for estimating is further formed to derive the estimated value by summing the estimating error and the estimated result.

3. The calculating unit of claim 2,
wherein the unit for estimating is formed to estimate the estimating error so that the estimated estimating error deviates maximally + or −1 from a true estimating error, and
wherein the reduction result calculator is formed to compare a value acquired based on the subtraction with the modulus to subtract the modulus if the value is larger than the modulus, or to compare the value acquired based on the subtraction with zero to add the modulus if the value is less than zero.

4. The calculating unit of claim 1, wherein the reduction result calculator is formed to calculate the subtraction step by step starting from a least significant portion of the input number.

5. The calculating unit of claim 4, wherein the reduction result calculator comprises a unit for performing a final reduction with the result of the subtraction, wherein the unit for performing the final reduction is formed to provide a result larger than zero and less than N or larger than −N and less than zero.

6. The calculating unit of claim 1,
further comprising a calculating unit width and associated calculating unit registers smaller than the input number and the modulus, and
wherein the unit for estimating and the reduction result calculator are formed to always use only portions of numbers or to use intermediate results representing a number and/or a result with respect to the division number that is larger than a calculating unit width or a register length of the calculating unit.

7. The calculating unit of claim 1, further comprising registers for storing a most significant portion of the number and of a most significant portion of the modulus, which are able to store a maximum word width that is shorter than a word width of the modulus or the number.

8. A device for calculating a result of a modular multiplication with a multiplier, a multiplicand and a modulus, comprising:
a unit for providing the multiplicand in at least three portions, wherein each portion comprises a number of digits less than half the number of digits of the multiplicand, and wherein the at least three portions include all digits of the multiplicand; and
a sequential calculator, wherein the sequential calculator is formed
to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein the sequential calculator comprises a calculating unit for reducing an input number with respect to a modulus, wherein the input number comprises input number portions of different significances, wherein the input number portions represent the input number with respect to a division number, wherein the modulus comprises modulus portions of different significances, and wherein the modulus portions represent the modulus with respect to the division number, the calculating unit comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the sequential calculator is formed to execute the following equation:

$$C=[A \cdot B_2 \bmod N) \cdot Z + A \cdot B_1 \bmod N] \cdot Z + A \cdot B_0 \bmod N$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation.

9. The device of claim 8, wherein the unit for providing is formed to comprise at least one register comprising a length less than a length of the whole multiplicand, but larger than or equal to a portion of the multiplicand, and wherein the sequential calculator is formed to load a portion of the multiplicand into the register during calculation.

10. The device of claim 8, wherein the unit for providing is formed to also divide the multiplier and the modulus into at least three portions each, and wherein the sequential calculator is formed to use both the portions of the multiplier and the modulus for one or more calculations.

11. The device of claim 8, wherein the sequential calculator is formed to comprise ten or less registers with a length at least as large as a length of a portion and smaller than a whole length of the modulus.

12. The device of claim 8, formed as configurable calculating unit, wherein the configurable calculating unit comprises a bit slice structure, wherein each bit slice comprises a calculating unit part and a register part, wherein the configurable calculating unit further comprises a register configuration unit formed to configure the calculating unit into a long mode or a short mode, wherein the calculating unit in the long mode comprises a first number of long registers, wherein the calculating unit in the short mode comprises a second number of short registers, wherein the second number is larger than the first number, and wherein a length of a short register is such that a portion of the multiplicand is storable in the short register.

13. The device of claim 8, wherein the sequential calculator is formed to first perform a modulus transform as pre-calculation, and to perform a modulus back-transform as post-calculation.

14. The device of claim 8, further comprising an external memory, wherein the external memory is formed to store the portions of the multiplier, the multiplicand and the modulus, wherein a most significant portion of the modulus is not stored in the external memory, but in a calculating unit-internal register.

15. The device of claim 14, formed to provide the result of the modular multiplication also in a number of portions, wherein the sequential calculator is further formed to store the portions of the result of the modular multiplication into the external memory instead of portions of equal significance of the multiplier after completion of a modular multiplication.

16. A method for reducing an input number with respect to a modulus with a calculating unit, wherein the input number comprises input number portions of different significances, wherein the input number portions represent the input number with respect to a division number, wherein the modulus comprises modulus portions of different significances, and wherein the modulus portions represent the modulus with respect to the division number, comprising:

estimating, by a unit for estimating, a result of an integer division of the input number by the modulus using a stored most significant portion of the input number, using a stored most significant portion of the modulus and using the division number;

storing, in a memory of a calculating unit, the estimated result or an estimated value derived from the estimated result; and calculating, by a reduction result calculator, a reduction result based on a result of a subtraction of a product of the modulus and the estimated result or the estimated value from the input number, wherein the unit for estimating, the memory or the reduction result calculator comprises a hardware implementation, wherein the step of estimating comprises evaluating the following equation:

$$(\tilde{Q}_0, \tilde{R}_0) := \text{MMD}(D_3, Z-N_2; N_2),$$

wherein $\tilde{Q}_0$ is a result of an integer division, $\tilde{R}_0$ is an integer remainder of the integer division, MMD is a Mult-Mod-Div operation, $D_3$ is the most significant portion of the input number, Z is the division number, and $N_2$ is the most significant portion of the modulus.

17. A method for calculating a result of a modular multiplication with a multiplier, a multiplicand and a modulus, comprising:

providing, by a unit for providing, the multiplicand in at least three portions, wherein each portion comprises a number of digits less than half the number of digits of the multiplicand, and wherein the at least three portions include all digits of the multiplicand; and sequentially calculating, by a sequential calculator, wherein the step of sequentially calculating is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in the step of sequentially calculating, a method for reducing an input number with respect to a modulus with a calculating unit is executed, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the number, using a stored most significant portion of the modulus and using the division number;

storing the estimated result or an estimated value derived from the estimated result in a memory of the calculating unit; and calculating a reduction result based on a result of a subtraction of a product of the modulus and the estimated result from the input number or based on a result of a subtraction of a product of the modulus and the estimated value from the input number, wherein the unit for providing or the sequential calculator comprises a hardware implementation, wherein the step of sequentially calculating comprises executing the following equation:

$$C=[A \cdot B_2 \bmod N] \cdot Z + A \cdot B_1 \bmod N] \cdot Z + A \cdot B_0 \bmod N$$

wherein C is the third intermediate result, A is the multiplier, $Z=2^i$, wherein i is a number of digits of the portions, $B_2$ is the most significant portion of the multiwand, $B_1$ is a less significant portion of the multiplicand, $B_0$ is the least significant portion of the multiplicand, N is the modulus, and mod indicates a modular reduction operation.

18. A non-transitory storage medium having stored thereon a computer program with a program code for performing a method for reducing an input number with respect to a modulus with a calculating unit, when the computer program runs on a computer, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the input number, using a stored most significant portion of the modulus and using the division number;

storing the estimated result or an estimated value derived from the estimated result in a memory of the calculating unit; and calculating a reduction result based on a result of a subtraction of a product of the modulus and the estimated result from the input number or based on a result of a subtraction of a product of the modulus and the estimated value from the input number, wherein the step of estimating comprises evaluating the following equation:

$$(\tilde{Q}_0, \tilde{R}_0) := \text{MMD}(D_3, Z-N_2; N_2),$$

wherein $\tilde{Q}_0$ is a result of an integer division, $\tilde{R}_0$ is an integer remainder of the integer division, MMD is a Mult-Mod-Div operation, $D_3$ is the most significant portion of the input number, Z is the division number, and $N_2$ is the most significant portion of the modulus.

19. A non-transitory storage medium having stored thereon a computer program with a program code for performing a method for calculating a result of a modular multiplication with a multiplier, a multiplicand and a modulus, when the computer program runs on a computer, the method comprising:

providing the multiplicand in at least three portions, wherein each portion comprises a number of digits less than half the number of digits of the multiplicand, and wherein the at least three portions include all digits of the multiplicand; and sequentially calculating, wherein the step of sequentially calculating is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in the step of sequentially calculating, a method for reducing an input number with respect to a modulus with a calculating unit is executed, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the input number, using a stored most significant portion of the modulus and using the division number;

storing the estimated result or an estimated value derived from the estimated result in a memory of the calculating unit; and calculating a reduction result based on a result of a subtraction of a product of the modulus and the estimated result from the input number or based on a result of a subtraction of a product of the modulus and the estimated value from the input number, wherein the step of sequentially calculating comprises executing the following equation:

$$C=[A \cdot B_2 \bmod N) \cdot Z + A \cdot B_1 \bmod N] \cdot Z + A \cdot B_0 \bmod N$$

wherein C is the third intermediate result, A is the multiplier, $Z=2^i$, wherein i is a number of digits of the portions, $B_2$ is the most significant portion of the multiplicand, $B_1$ is a less significant portion of the multiplicand, $B_0$ is the least significant portion of the multiplicand, N is the modulus, and mod indicates a modular reduction operation.

20. A calculating unit for reducing an input number with respect to a modulus, wherein the input number comprises input number portions of different significances, wherein the input number portions represent the input number with respect to a division number, wherein the modulus comprises modulus portions of different significances, and wherein the modulus portions represent the modulus with respect to the division number, comprising:

means for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and means for calculating a reduction result based on a result of a subtraction of a product of the modulus and the estimated result from the input number or based on a result of a subtraction of a product of the modulus and the estimated value from the input number, wherein the means for estimating is formed to evaluate the following equation:

$$(\tilde{Q}_0, \tilde{R}_0) := \mathrm{MMD}(D_3, Z-N_2; N_2),$$

wherein $\tilde{Q}_0$ is a result of an integer division, $\tilde{R}_0$ is an integer remainder of the integer division, MMD is a Mult-Mod-Div operation, $D_3$ is the most significant portion of the input number, Z is the division number, and $N_2$ is the most significant portion of the modulus.

21. A calculating unit for reducing an input number with respect to a modulus, wherein the input number comprises input number portions of different significances, the input number portions represent the input number with respect to a division number, the modulus comprises modulus portions of different significances, and the modulus portions represent the modulus with respect to the division number, comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the unit for estimating is formed to evaluate the following equations:

$$(Q_0, R_0) := \mathrm{MMD}(D_3, Z-N_2; N_2),$$

$$Q'_0 = Q_0 + D_3$$

wherein $Q_0$ is a result of an integer division, $R_0$ is a remainder of the integer division, MMD is a Mult-Mod-Div operation, $D_3$ is the most significant portion of the input number, Z is the division number, $Q'_0$ is the estimated value, and $N_2$ is the most significant portion of the modulus.

22. A calculating unit for reducing an input number with respect to a modulus, wherein the input number comprises input number portions of different significances, the input number portions represent the input number with respect to a division number, the modulus comprises modulus portions of different significances, and the modulus portions represent the modulus with respect to the division number, comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the unit for estimating is formed to calculate an estimated estimating error using an integer division of a sum of the remainder and a less significant portion of the input number, from which a result of an integer division of the estimated value multiplied by a less significant portion of the modulus by the most significant portion of the modulus is subtracted, wherein the unit for estimating the estimating error is formed to evaluate the following equations:

$$\tilde{\epsilon} = D_2 + \tilde{R}_0 - (\tilde{Q}_0 N_1) \mathrm{div}\, N_2,$$

$$D_2 = D_2 - \tilde{\epsilon} N_2,$$

$$Q'_0 = \tilde{Q}_0 + \tilde{\epsilon}$$

wherein $\tilde{\epsilon}$ is the estimated estimating error, $D_2$ is the less significant portion of the input number, $\tilde{R}_0$ is the remainder, $\tilde{Q}_0$ is the estimated result of the integer division, $Q'_0$ is the estimated value, $N_1$ is a less significant portion of the modulus, and $(\tilde{Q}_0 N_1)_1$ represents an operand of the integer division.

23. A calculating unit for reducing an input number with respect to a modulus, wherein the input number comprises input number portions of different significances, the input number portions represent the input number with respect to a division number, the modulus comprises modulus portions of different significances, and the modulus portions represent the modulus with respect to the division number, comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the unit for estimating is formed to calculate an estimated estimating error using an integer division of a sum of the remainder and a less significant portion of the input number, from which a result of an integer division of the estimated value multiplied by a less significant portion of the modulus by the most significant portion of the modulus is subtracted, wherein the unit for estimating the estimating error is formed to evaluate the following equations:

$$\tilde{\epsilon} = D_2 + R_0 - (Q'_0 N_1)_1 \text{ div } N_2,$$

$$D'_2 = D_2 + R_0$$

$$D''_2 = D'_2 \epsilon N_2,$$

$$Q''_0 = Q'_0 + \epsilon$$

wherein $\tilde{\epsilon}$ is the estimated estimating error, $D_2$ is a less significant portion of the input number, $R_0$ is the remainder, $Q_0$ is the estimated result of the integer division, $Q'_0$ is the estimated value plus the most significant portion of the input number, $N_1$ is a less significant portion of the modulus, and $(Q'_0 N_1)_1$ represents an operand of an integer division.

24. A calculating unit for reducing an input number with respect to a modulus, wherein the input number comprises input number portions of different significances, the input number portions represent the input number with respect to a division number, the modulus comprises modulus portions of different significances, and the modulus portions represent the modulus with respect to the division number, comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the reduction result calculator is formed to calculate the subtraction step by step starting from a least significant portion of the input number, wherein the reduction result calculator is formed to obtain the estimated value using a summation between the estimated value, the most significant portion of the input number and the estimated estimating error, and wherein the reduction result calculator comprises:

a unit for performing a first MMD operation according to the following equation:

$$U_1, U_0 = \text{MMD}(Q'_0, N_0; Z),$$

wherein $U_1$, $U_0$ are results of the first MMD operation, $Q''_0$ represents the modified estimated value, $N_0$ represents a least significant portion of the modulus, and Z is the division number, and wherein the reduction result calculator further comprises a unit for performing a first subtraction formed to evaluate the following equation:

$$(D_1 | D_0')_Z := (D_1 - U_1, D_0 - U_0)_Z,$$

wherein $D_0$ is a least significant portion of the input number, $D_1$ is a more significant portion of the input number, $D_0'$ is a least significant portion of a result of the subtraction, and $D_1'$ is a first more significant portion to be modified of the result of the subtraction.

25. The calculating unit of claim 24, wherein the reduction result calculator is formed to execute a treat carry function or a treat borrow function on subtraction results to take into account a propagation of a carry or a borrow.

26. The calculating unit of claim 24, wherein the reduction result calculator further comprises:

a unit for performing a second MMD operation formed to operate according to the following equation:

$$V_1, V_0 = \text{MMD}(Q''_0, N_1; Z),$$

wherein $V_1$, $V_0$ are results of the MMD operation, $Q''_0$ is the modified estimated value, $N_1$ is a more significant portion of the modulus, and Z is the division number, and a unit for performing a second subtraction, wherein the unit for performing the second subtraction is formed to operate according to the following equation:

$$(D_2''' | D_1'')_Z = (D_2'' - V_1, D_1' - V_0)_Z,$$

wherein $D_2''$ is equal to the sum of the second most significant portion of the input number and the remainder minus the most significant portion of the modulus multiplied by the estimated estimating error, wherein $D_1''$ is a less significant portion of the result of the subtraction, and wherein $D_2'''$ is a most significant portion of the subtraction.

27. A device for calculating a result of a modular multiplication with a multiplier, a multiplicand and a modulus, comprising:

a unit for providing the multiplicand in at least three portions, wherein each portion comprises a number of digits less than half the number of digits of the multiplicand, and wherein the at least three portions include all digits of the multiplicand; and a sequential calculator, wherein the sequential calculator is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein the sequential calculator comprises a calculating unit for reducing an input number with respect to a modulus, wherein the input number comprises input number portions of different significances, wherein the input number portions represent the input number with respect to a division number, wherein the modulus comprises modulus portions of different significances, and wherein the modulus portions represent the modulus with respect to the division number, the calculating unit comprising:

a unit for estimating a result of an integer division of the input number by the modulus using a stored most significant portion of the input number, using a stored most significant portion of the modulus and using the division number, and for storing the estimated result or an estimated value derived from the estimated result in a memory of the calculating unit; and a reduction result calculator configured for calculating a reduction result based on a result of a subtraction of a product of the modulus and the estimated result from the input number or based on a result of a subtraction of a product of the modulus and the estimated value from the input number, wherein the sequential calculator is formed to execute the following calculation:

$$C_1 := MMA_Z(A, B_2, 0; N) - N$$

$$C_2 := MMA_Z(A, B_1, C_1; N) - N$$

$$C_3 := MMA_Z(A, B_0, C_2; N),$$

wherein N is the modulus, A is the multiplier, $B_2$ is the most significant portion of the multiplicand, $B_1$ is a less significant portion of the multiplicand, $B_0$ is a least significant portion of the multiplicand, $C_1$ is the first intermediate result, $C_2$ is the second intermediate result, $C_3$ is the third intermediate result, and $MMA_Z$ represents a Mult-ModAdd operation with a respective portion of the multiplicand.

28. A method for reducing an input number with respect to a modulus with a calculating unit, wherein the input number comprises input number portions of different significances, wherein the input number portions represent the input number with respect to a division number, wherein the modulus comprises modulus portions of different significances, and wherein the modulus portions represent the modulus with respect to the division number, comprising:

estimating, by a unit for estimating, a result of an integer division of the input number by the modulus using a stored most significant portion of the input number, using a stored most significant portion of the modulus and using the division number;

storing, in a memory of a calculating unit, the estimated result or an estimated value derived from the estimated result; and calculating, by a reduction result calculator, a reduction result based on a result of a subtraction of a product of the modulus and the estimated result or the estimated value from the input number, wherein the unit for estimating, the memory or the reduction result calculator comprises a hardware implementation, wherein the step of estimating comprises evaluating the following equations:

$$(Q_0, R_0) := MMD(D_3, Z - N_2; N_2),$$

$$Q'_0 = Q_0 + D_3$$

wherein $Q_0$ is a result of an integer division, $R_0$ is a remainder of the integer division, MMD is a Mult-Mod-Div operation, $D_3$ is the most significant portion of the input number, Z is the division number, $Q'_0$ is the estimated value, and $N_2$ is the most significant portion of the modulus.

29. A method for reducing an input number with respect to a modulus with a calculating unit, wherein the input number comprises input number portions of different significances, wherein the input number portions represent the input number with respect to a division number, wherein the modulus comprises, modulus portions of different significances, and wherein the modulus portions represent the modulus with respect to the division number, comprising:

estimating, by a unit for estimating, a result of an integer division of the input number by the modulus using a stored most significant portion of the input number, using a stored most significant portion of the modulus and using the division number;

storing, in a memory of a calculating unit, the estimated result or an estimated value derived from the estimated result; and calculating, by a reduction result calculator, a reduction result based on a result of a subtraction of a product of the modulus and the estimated result or the estimated value from the input number, wherein the unit for estimating, the memory or the reduction result calculator comprises a hardware implementation, wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + \tilde{R}_0 - (\tilde{Q}_0 N_1)_1 \operatorname{div} N_2,$$

$$D_2 = D_2 - \tilde{\epsilon} N_2,$$

$$Q'_0 = \tilde{Q}_0 + \tilde{\epsilon}$$

wherein $\tilde{\epsilon}$ is the estimated estimating error, $D_2$ is the less significant portion of the input number, $\tilde{R}_0$ is the remainder, $\tilde{Q}_0$ is the estimated result of the integer division, $Q'_0$ is the estimated value, $N_1$ is a less significant portion of the modulus, and $(\tilde{Q}_0 N_1)_1$ represents an operand of the integer division.

30. A method for reducing an input number with respect to a modulus with a calculating unit, wherein the input number comprises input number portions of different significances, wherein the input number portions represent the input number with respect to a division number, wherein the modulus comprises modulus portions of different significances, and wherein the modulus portions represent the modulus with respect to the division number, comprising:

estimating, by a unit for estimating, a result of an integer division of the input number by the modulus using a stored most significant portion of the input number, using a stored most significant portion of the modulus and using the division number;

storing, in a memory of a calculating unit, the estimated result or an estimated value derived from the estimated result; and calculating, by a reduction result calculator, a reduction result based on a result of a subtraction of a product of the modulus and the estimated result or the estimated value from the input number, wherein the unit for estimating, the memory or the reduction result calculator comprises a hardware implementation, wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + R_0(Q_0'N_1)_1 \text{ div } N_2$$

$$D_2' = D_2 + R_0$$

$$D_2'' = D_2' - \epsilon N_2,$$

$$Q_0'' = Q_0' + \epsilon$$

wherein $\tilde{\epsilon}$ is the estimated estimating error, $D_2$ is a less significant portion of the input number, $R_0$ is the remainder, $Q_0$ is the estimated result of the integer division, $Q'_0$ is the estimated value plus the most significant portion of the input number, $N_1$ is a less significant portion of the modulus, and $(Q'_0 N_1)_1$ represents an operand of an integer division.

31. A method for reducing an input number with respect to a modulus with a calculating unit, wherein the input number comprises input number portions of different significances, wherein the input number portions represent the input number with respect to a division number, wherein the modulus comprises modulus portions of different significances, and wherein the modulus portions represent the modulus with respect to the division number, comprising:

estimating, by a unit for estimating, a result of an integer division of the input number by the modulus using a stored most significant portion of the input number, using a stored most significant portion of the modulus and using the division number;

storing, in a memory of a calculating unit, the estimated result or an estimated value derived from the estimated result; and calculating, by a reduction result calculator, a reduction result based on a result of a subtraction of a product of the modulus and the estimated result or the estimated value from the input number, wherein the unit for estimating, the memory or the reduction result calculator comprises a hardware implementation, wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + R_0 - (Q_0'N_1)_1 \text{ div } N_2,$$

$$D_2' = D_2 + R_0$$

$$D_2'' = D_2' - \epsilon N_2,$$

$$Q_0'' = Q_0' + \epsilon$$

wherein $\tilde{\epsilon}$ is the estimated estimating error, $D_2$ is a less significant portion of the input number, $R_0$ is the remainder, $Q_0$ is the estimated result of the integer division, $Q'_0$ is the estimated value plus the most significant portion of the input number, $N_1$ is a less significant portion of the modulus, and $(Q'_0 N_1)_1$ represents an operand of an integer division.

32. A method for calculating a result of a modular multiplication with a multiplier, a multiplicand and a modulus, comprising:

providing, by a unit for providing, the multiplicand in at least three portions, wherein each portion comprises a number of digits less than half the number of digits of the multiplicand, and wherein the at least three portions include all digits of the multiplicand; and sequentially calculating, by a sequential calculator, wherein the step of sequentially calculating is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in the step of sequentially calculating, a method for reducing an input number with respect to a modulus with a calculating unit is executed, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the number, using a stored most significant portion of the modulus and using the division number;

storing the estimated result or an estimated value derived from the estimated result in a memory of a calculating unit; and calculating a reduction result based on a result of a subtraction of a product of the modulus and the estimated result from the input number or based on a result of a subtraction of a product of the modulus and the estimated value from the input number, wherein the unit for providing or the sequential calculator comprises a hardware implementation, wherein the step of sequentially calculating comprises executing the following calculation:

$$C_1 := \text{MMA}_Z(A, B_2, 0; N) - N$$

$$C_2 := \text{MMA}_Z(A, B_1, C_1; N) - N$$

$$C_3 := \text{MMA}_Z(A, B_0, C_2; N),$$

wherein N is the modulus, A is the multiplier, $B_2$ is the most significant portion of the multiplicand, $B_1$ is a less significant portion of the multiplicand, $B_0$ is a least significant portion of the multiplicand, $C_1$ is the first intermediate result, $C_2$ is the second intermediate result, $C_3$ is the third intermediate result, and $MMA_z$ represents a Mult-ModAdd operation with a respective portion of the multiplicand.

33. A non-transitory storage medium having stored thereon a computer program with a program code for performing a method for reducing an input number with respect to a modulus with a calculating unit, when the computer program runs on a computer, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:
- estimating a result of an integer division of the input number by the modulus using a stored most significant portion of the input number, using a stored most significant portion of the modulus and using the division number;
- storing the estimated result or an estimated value derived from the estimated result in a memory of the calculating unit; and
- calculating a reduction result based on a result of a subtraction of a product of the modulus and the estimated result from the input number or based on a result of a subtraction of a product of the modulus and the estimated value from the input number, wherein the step of estimating comprises evaluating the following equations:

$$(Q_0, R_0) := MMD(D_3, Z-N_2; N_2),$$

$$Q'_0 = Q_0 + D_3$$

wherein $Q_0$ is a result of an integer division, $R_0$ is a remainder of the integer division, MMD is a Mult-Mod-Div operation, $D_3$ is the most significant portion of the input number, Z is the division number, $Q'_0$ is the estimated value, and $N_2$ is the most significant portion of the modulus.

34. A non-transitory storage medium having stored thereon a computer program with a program code for performing a method for reducing an input number with respect to a modulus with a calculating unit, when the computer program runs on a computer, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:
- estimating a result of an integer division of the input number by the modulus using a stored most significant portion of the input number, using a stored most significant portion of the modulus and using the division number;
- storing the estimated result or an estimated value derived from the estimated result in a memory of the calculating unit; and
- calculating a reduction result based on a result of a subtraction of a product of the modulus and the estimated result from the input number or based on a result of a subtraction of a product of the modulus and the estimated value from the input number wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + \tilde{R}_0 - (\tilde{Q}_0 N_1)_1 \operatorname{div} N_2,$$

$$D_2 = D_2 - \tilde{\epsilon} N_2,$$

$$Q_0' = \tilde{Q}_0 + \tilde{\epsilon}$$

wherein $\tilde{\epsilon}$ is the estimated estimating error, $D_2$ is the less significant portion of the input number, $\tilde{R}_0$ is the remainder, $\tilde{Q}_0$ is the estimated result of the integer division, $Q'_0$ is the estimated value, $N_1$ is a less significant portion of the modulus, and $(\tilde{Q}_0 N_1)_1$ represents an operand of the integer division.

35. A non-transitory storage medium having stored thereon a computer program with a program code for performing a method for reducing an input number with respect to a modulus with a calculating unit, when the computer program runs on a computer, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:
- estimating a result of an integer division of the input number by the modulus using a stored most significant portion of the input number, using a stored most significant portion of the modulus and using the division number;
- storing the estimated result or an estimated value derived from the estimated result in a memory of the calculating unit; and
- calculating a reduction result based on a result of a subtraction of a product of the modulus and the estimated result from the input number or based on a result of a subtraction of a product of the modulus and the estimated value from the input number wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + R_0 - (Q'_0 N_1)_1 \operatorname{div} N_2,$$

$$D'_2 := D_2 + R_0$$

$$D''_2 = D'_2 - \epsilon N_2,$$

$$Q''_0 = Q'_0 + \epsilon$$

wherein $\tilde{\epsilon}$ is the estimated estimating error, $D_2$ is a less significant portion of the input number, $R_0$ is the remainder, $Q_0$ is the estimated result of the integer division, $Q'_0$ is the estimated value plus the most significant portion of the input number, $N_1$ is a less significant portion of the modulus, and $(Q'_0 N_1)_1$ represents an operand of an integer division.

36. A non-transitory storage medium having stored thereon a computer program with a program code for performing a method for reducing an input number with respect to a modulus with a calculating unit, when the computer program runs on a computer, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the input number, using a stored most significant portion of the modulus and using the division number;

storing the estimated result or an estimated value derived from the estimated result in a memory of the calculating unit; and calculating a reduction result based on a result of a subtraction of a product of the modulus and the estimated result from the input number or based on a result of a subtraction of a product of the modulus and the estimated value from the input number wherein the step of estimating comprises calculating an estimated estimating error using an integer division of a sum of the remainder and a less significant portion of the input number, from which a result of an integer division of the estimated value multiplied by a less significant portion of the modulus by the most significant portion of the modulus is subtracted, wherein the step of estimating comprises evaluating the following equations:

$$\tilde{\epsilon} = D_2 + R_0 - (Q'_0 N_1)_1 \text{ div } N_2,$$

$$D'_2 = D_2 + R_0$$

$$D''_2 = D'_2 - \epsilon N_2,$$

$$Q''_0 = Q'_0 + \epsilon$$

wherein $\tilde{\epsilon}$ is the estimated estimating error, $D_2$ is a less significant portion of the input number, $R_0$ is the remainder, $Q_0$ is the estimated result of the integer division, $Q'_0$ is the estimated value plus the most significant portion of the input number, $N_1$ is a less significant portion of the modulus, and $(Q'_0 N_1)_1$ represents an operand of an integer division.

37. A non-transitory storage medium having stored thereon a computer program with a program code for performing a method for calculating a result of a modular multiplication with a multiplier, a multiplicand and a modulus, when the computer program runs on a computer, the method comprising:

providing the multiplicand in at least three portions, wherein each portion comprises a number of digits less than half the number of digits of the multiplicand, and wherein the at least three portions include all digits of the multiplicand; and sequentially calculating, wherein the step of sequentially calculating is formed to calculate a first intermediate result using a more significant portion of the multiplicand, to calculate a second intermediate result using a less significant portion of the multiplicand and the first intermediate result, and to calculate and store a third intermediate result using a still less significant portion of the multiplicand and the second intermediate result, wherein the third intermediate result represents the result of the modular multiplication, if the multiplicand is divided into exactly three portions, or wherein the result of the modular multiplication is derivable from the third intermediate result by a further sequential calculation, if the multiplicand is divided into more than three portions, wherein, in the step of sequentially calculating, a method for reducing an input number with respect to a modulus with a calculating unit is executed, wherein the input number comprises input number portions of different significances, wherein the input number portions represent the input number with respect to a division number, wherein the modulus comprises modulus portions of different significances, and wherein the modulus portions represent the modulus with respect to the division number, the method comprising:

estimating a result of an integer division of the input number by the modulus using a stored most significant portion of the input number, using a stored most significant portion of the modulus and using the division number;

storing the estimated result or an estimated value derived from the estimated result in a memory of the calculating unit; and calculating a reduction result based on a result of a subtraction of a product of the modulus and the estimated result from the input number or based on a result of a subtraction of a product of the modulus and the estimated value from the input number, wherein the step of sequentially calculating comprises executing the following calculation:

$$C_1 := MMA_Z(A, B_2, 0; N) - N$$

$$C_2 := MMA_Z(A, B_1, C_1; N) - N$$

$$C_3 := MMA_Z(A, B_0, C_2; N),$$

wherein N is the modulus, A is the multiplier, $B_2$ is the most significant portion of the multiplicand, $B_1$ is a less significant portion of the multiplicand, $B_0$ is a least significant portion of the multiplicand, $C_1$ is the first intermediate result, $C_2$ is the second intermediate result, $C_3$ is the third intermediate result, and $MMA_Z$ represents a MultModAdd operation with a respective portion of the multiplicand.

* * * * *